(12) United States Patent
Smith et al.

(10) Patent No.: US 11,290,324 B2
(45) Date of Patent: Mar. 29, 2022

(54) BLOCKCHAINS FOR SECURING IOT DEVICES

(71) Applicant: INTEL CORPORATION, Santa Clara, CA (US)

(72) Inventors: Ned M. Smith, Beaverton, OR (US); Keith Nolan, Mullingar (IE); Mark Kelly, Leixlip (IE); Michael Nolan, Maynooth (IE); John Brady, Celbridge (IE); Thiago Macieira, Hillsboro, OR (US); Zheng Zhang, Portland, OR (US); Glen J. Anderson, Beaverton, OR (US); Igor Muttik, Aylesbury (GB)

(73) Assignee: Intel Corporation, Santa Clara, CA (US)

( * ) Notice: Subject to any disclaimer, the term of this patent is extended or adjusted under 35 U.S.C. 154(b) by 360 days.

(21) Appl. No.: 16/466,982

(22) PCT Filed: Dec. 28, 2017

(86) PCT No.: PCT/US2017/068743
§ 371 (c)(1),
(2) Date: Jun. 5, 2019

(87) PCT Pub. No.: WO2018/126029
PCT Pub. Date: Jul. 5, 2018

(65) Prior Publication Data
US 2019/0349190 A1    Nov. 14, 2019

Related U.S. Application Data

(60) Provisional application No. 62/441,070, filed on Dec. 30, 2016.

(51) Int. Cl.
*G06F 16/182* (2019.01)
*H04L 41/0806* (2022.01)
(Continued)

(52) U.S. Cl.
CPC ...... *H04L 41/0806* (2013.01); *G06F 16/1824* (2019.01); *G06F 16/1834* (2019.01);
(Continued)

(58) Field of Classification Search
CPC combination set(s) only.
See application file for complete search history.

(56) References Cited

U.S. PATENT DOCUMENTS

| | | | |
|---|---|---|---|
| 6,058,383 A | 5/2000 | Narasimhalu et al. | |
| 8,996,459 B2 | 3/2015 | Arthursson et al. | |

(Continued)

FOREIGN PATENT DOCUMENTS

| | | | |
|---|---|---|---|
| EP | 2566204 A1 | 3/2013 | |
| WO | 0065800 A1 | 11/2000 | |

(Continued)

OTHER PUBLICATIONS

European Patent Office, "Communication under Rule 94(3) EPC", issued in connection with European Patent Application No. 17832873.8, dated Mar. 29, 2021, (5 pages).

(Continued)

*Primary Examiner* — Arvin Eskandarnia
(74) *Attorney, Agent, or Firm* — Hanley, Flight & Zimmerman, LLC

(57) ABSTRACT

A trusted communications environment includes a primary participant with a group creator and a distributed ledger, and a secondary participant with communication credentials. An Internet of Things (IoT) network includes a trusted execution environment with a chain history for a blockchain, a root-of-trust for chaining, and a root-of-trust for archives. An IoT network includes an IoT device with a communication system, an onboarding tool, a device discoverer, a trust builder, a shared domain creator, and a shared resource directory. An IoT network includes an IoT device with a (Continued)

communication system, a policy decision engine, a policy repository, a policy enforcement engine, and a peer monitor. An IoT network includes an IoT device with a host environment and a trusted reliability engine to apply a failover action if the host environment fails. An IoT network includes an IoT server including secure booter/measurer, trust anchor, authenticator, key manager, and key generator.

22 Claims, 36 Drawing Sheets

(51) Int. Cl.

| | | |
|---|---|---|
| H04L 67/10 | (2022.01) | |
| H04L 67/12 | (2022.01) | |
| H04W 4/70 | (2018.01) | |
| H04L 9/08 | (2006.01) | |
| H04L 9/32 | (2006.01) | |
| H04L 45/00 | (2022.01) | |
| H04L 67/104 | (2022.01) | |
| H04L 69/18 | (2022.01) | |
| H04W 4/08 | (2009.01) | |
| H04W 84/22 | (2009.01) | |
| H04L 41/12 | (2022.01) | |
| H04L 69/22 | (2022.01) | |
| H04L 61/4505 | (2022.01) | |
| H04L 61/5069 | (2022.01) | |
| H04L 67/1042 | (2022.01) | |
| H04L 67/1087 | (2022.01) | |
| H04L 67/562 | (2022.01) | |
| H04W 12/69 | (2021.01) | |
| H04W 84/18 | (2009.01) | |

(52) U.S. Cl.
CPC .......... *H04L 9/0825* (2013.01); *H04L 9/3239* (2013.01); *H04L 41/12* (2013.01); *H04L 45/20* (2013.01); *H04L 61/1505* (2013.01); *H04L 61/2069* (2013.01); *H04L 67/10* (2013.01); *H04L 67/104* (2013.01); *H04L 67/1046* (2013.01); *H04L 67/1093* (2013.01); *H04L 67/12* (2013.01); *H04L 67/2809* (2013.01); *H04L 69/18* (2013.01); *H04L 69/22* (2013.01); *H04W 4/08* (2013.01); *H04W 4/70* (2018.02); *H04W 12/69* (2021.01); *H04W 84/22* (2013.01); *H04L 2209/38* (2013.01); *H04L 2209/56* (2013.01); *H04W 84/18* (2013.01)

(56) References Cited

U.S. PATENT DOCUMENTS

| | | | |
|---|---|---|---|
| 2004/0081203 A1 | 4/2004 | Sodder et al. | |
| 2007/0233881 A1 | 10/2007 | Nochta et al. | |
| 2012/0210066 A1 | 8/2012 | Joshi et al. | |
| 2015/0156266 A1 | 6/2015 | Gupta | |
| 2015/0244690 A1 | 8/2015 | Mossbarger | |
| 2016/0182497 A1 | 6/2016 | Smith | |
| 2016/0191345 A1 | 6/2016 | Despotovic et al. | |
| 2016/0275461 A1 | 9/2016 | Sprague et al. | |
| 2018/0268386 A1* | 9/2018 | Wack | H04L 9/085 |
| 2021/0256511 A1* | 8/2021 | Peacemaker | G06Q 20/40 |

FOREIGN PATENT DOCUMENTS

| | | |
|---|---|---|
| WO | 2004073281 A2 | 8/2004 |
| WO | 2009141385 A2 | 11/2009 |
| WO | 2015126734 A1 | 8/2015 |
| WO | 2015130752 A1 | 9/2015 |
| WO | 2017066002 A1 | 4/2017 |
| WO | 2018125989 A2 | 7/2018 |
| WO | 2018126029 A2 | 7/2018 |
| WO | 2018126065 A1 | 7/2018 |
| WO | 2018126075 A1 | 7/2018 |
| WO | 2018126076 A1 | 7/2018 |
| WO | 2018126077 A1 | 7/2018 |

OTHER PUBLICATIONS

International Search Report for related PCT Application PCT/US2017068806 with a completion date of Mar. 14, 2018 and dated Mar. 21, 2018, 3 pages.

Kim et al.; "Increasing Web Server Throughput with Network Interface Data Caching"; Computer Systems Laboratory, Rice University Houston Texas; Operating Systems Review, vol. 36 No. 5; ACM Oct. 2002.

International Search Report for related PCT Application PCT/US2017068830 with a completion date of Mar. 14, 2018 and dated Mar. 22, 2018, 2 pages.

Ergen et al.; "MAC Protocol Engine for Sensor Networks" Global Telecommunications Conference Nov. 2009 GLOBECOM, Piscataway New Jersey. 17 pages.

International Search Report for related PCT Application PCT/US2017/068828 with a completion date of Mar. 22, 2018 and dated Mar. 29, 2018, 3 pages.

Hardjono et al.; "Cloud-Based Commissioning of Constrained Devices using Permissioned Blockchains" Proceedings of ACM IoT Privacy, Trust & Security—IoTPTS 2016 Xi'an, China, May 2016, 8 pages.

International Search Report for related PCT Application PCT/US2017/068743 with a completion date of Jun. 28, 2018 and dated Jul. 6, 2018, 6 pages.

Hardjono et al.; "Anonymous Identities for Permissioned Blockchains" (Draft v06C—Jan. 24, 2016—Please Do Not Distribute) 16 pages, retrieved from the internet on May 31, 2019 https://pdfs.semanticscholar.org/2ef6/d571f3d0a9927fbe29363a8038b0d148f881.pdf.

Hardjono et al.; "Verifiable Anonymous Identities and Access Control in Permissioned Blockchains" Draft Apr. 17, 2016, retrieved from the internet on May 31, 2019 https://arxiv.org/pdf/1903.04584.pdf 9 pages.

Antonopoulos, Andreas M. "Mastering Bitcoin: Unlocking Digital Cryptocurrencies" Chapter 9, Dec. 20, 2014 O'Reilly Publishing, Tokyo Japan.

International Search Report for related PCT Application PCT/US2017/068683 with a completion date of Jul. 1, 2018 and dated Jul. 7, 2018, 7 pages.

International Search Report for related PCT Application PCT/US2017/068832 with a completion date of Mar. 15, 2018 and dated May 17, 2018, 4 pages.

Fromknecht et al;:"A Decentralized Public Key Infrastructure with Identity Retention" Published in IACR Cryptology ePrint Archive Nov. 2014, 16 pages.

Fromknecht et al; "CertCoin:A NameCoin Based Decentralized Authentication System 6.857 Class Project" May 2014, retrieved from the Internet on Jun. 3, 2019 https://courses.csail.mit.edu/6.857/2014/files/19-fromknecht-velicann-yakoubov-certcoin.pdf 19 pages.

\* cited by examiner

200

300

400

(A)  (B)

2300

BLOCKCHAINS FOR SECURING IOT DEVICES

CROSS REFERENCE TO RELATED APPLICATIONS

Pursuant to 35 U.S.C. § 371, this application is the United States National Stage Application of International Patent Application No. PCT/US2017/068743, filed on Dec. 28, 2017, which claims the benefit of the filing date of U.S. Patent Provisional Application Ser. No. 62/441,070, by Ned M. Smith et al., entitled "THE INTERNET OF THINGS," filed Dec. 30, 2016, and which both are incorporated herein by reference.

This application is related to International Patent Application No. PCT/US2017/068806, filed on Dec. 28, 2017, which claims the benefit of the filing date of U.S. Patent Provisional Application Ser. No. 62/441,070, by Ned M. Smith et al., entitled "THE INTERNET OF THINGS," filed Dec. 30, 2016. This application is also related to the United States National Stage Application of International Patent Application No. PCT/US2017/068806, filed on Jun. 5, 2019.

This application is related to International Patent Application No. PCT/US2017/068828, filed on Dec. 28, 2017, which claims the benefit of the filing date of U.S. Patent Provisional Application Ser. No. 62/441,070, by Ned M. Smith et al., entitled "THE INTERNET OF THINGS," filed Dec. 30, 2016. This application is also related to the United States National Stage Application of International Patent Application No. PCT/US2017/068828, filed on Jun. 5, 2019.

This application is related to International Patent Application No. PCT/US2017/068830, filed on Dec. 28, 2017, which claims the benefit of the filing date of U.S. Patent Provisional Application Ser. No. 62/441,070, by Ned M. Smith et al., entitled "THE INTERNET OF THINGS," filed Dec. 30, 2016. This application is also related to the United States National Stage Application of International Patent Application No. PCT/US2017/068830, filed on Jun. 5, 2019.

This application is related to International Patent Application No. PCT/US2017/068832, filed on Dec. 28, 2017, which claims the benefit of the filing date of U.S. Patent Provisional Application Ser. No. 62/441,070, by Ned M. Smith et al., entitled "THE INTERNET OF THINGS," filed Dec. 30, 2016. This application is also related to the United States National Stage Application of International Patent Application No. PCT/US2017/068832, filed on Jun. 5, 2019.

This application is related to International Patent Application No. PCT/US2017/068683, filed on Dec. 28, 2017, which claims the benefit of the filing date of U.S. Patent Provisional Application Ser. No. 62/441,070, by Ned M. Smith et al., entitled "THE INTERNET OF THINGS," filed Dec. 30, 2016. This application is also related to the United States National Stage Application of International Patent Application No. PCT/US2017/068683, filed on Jun. 5, 2019.

TECHNICAL FIELD

The present techniques relate generally to Internet of Things (IoT) devices. More specifically the present techniques relate to devices that can perform remote sensing and actuation functions.

BACKGROUND

A current view of the Internet is the connection of clients, such as personal computers, tablets, smart phones, servers, digital photo-frames, and many other types of devices, to publicly-accessible data-centers hosted in server farms. However, this view represents a small portion of the overall usage of the globally-connected network. A very large number of connected resources currently exist, but are not publicly accessible. Examples include corporate networks, private organizational control networks, and monitoring networks spanning the globe, often using peer-to-peer relays for anonymity.

It has been estimated that the internet of things (IoT) may bring Internet connectivity to more than 15 billion devices by 2020. For organizations, IoT devices may provide opportunities for monitoring, tracking, or controlling other devices and items, including further IoT devices, other home and industrial devices, items in manufacturing and food production chains, and the like. The emergence of IoT networks has served as a catalyst for profound change in the evolution of the Internet. In the future, the Internet is likely to evolve from a primarily human-oriented utility to an infrastructure where humans may eventually be minority actors in an interconnected world of devices.

In this view, the Internet will become a communications system for devices, and networks of devices, to not only communicate with data centers, but with each other. The devices may form functional networks, or virtual devices, to perform functions, which may dissolve once the function is performed. Challenges exist in enabling reliable, secure, and identifiable devices that can form networks as needed to accomplish tasks.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The Internet-of-Things (IoT) is a system in which a large number of computing devices are interconnected to each other and to a communications network (e.g., the Internet) to provide a functionality, such as data acquisition and actuation, at very low levels in networks. Low levels indicate devices that may be located at or near the edges of networks, such as the last devices before the networks end. As used herein, an IoT device may include a device performing a function, such as sensing or control, among others, in communication with other IoT devices and a communications network. The IoT device may include an autonomous device or a semiautonomous configured to perform one or more functions. Often, IoT devices can be limited in memory, size, or functionality, allowing larger numbers to be deployed for a similar cost to a smaller number of larger devices. However, an IoT device may be a smart phone, laptop, tablet, PC, and/or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home devices, such as water distribution systems, electric power distribution systems, pipeline control systems, plant control systems, light switches, thermostats, locks, cameras, alarms, motion sensors, and the like. The IoT devices may be accessible through a controller, such as computers, servers, and other systems, for example, to control systems or access data. The controller and the IoT devices can be remotely located from one another.

The Internet can be configured to provide communications to a large number of IoT devices. Accordingly, as described herein, a number of innovations for the future Internet are designed to address the need for network layers, from central servers, through gateways, down to edge devices, to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity including a combination of wired and wireless technologies as depicted in FIGS. 1 and 2.

Figure 1:
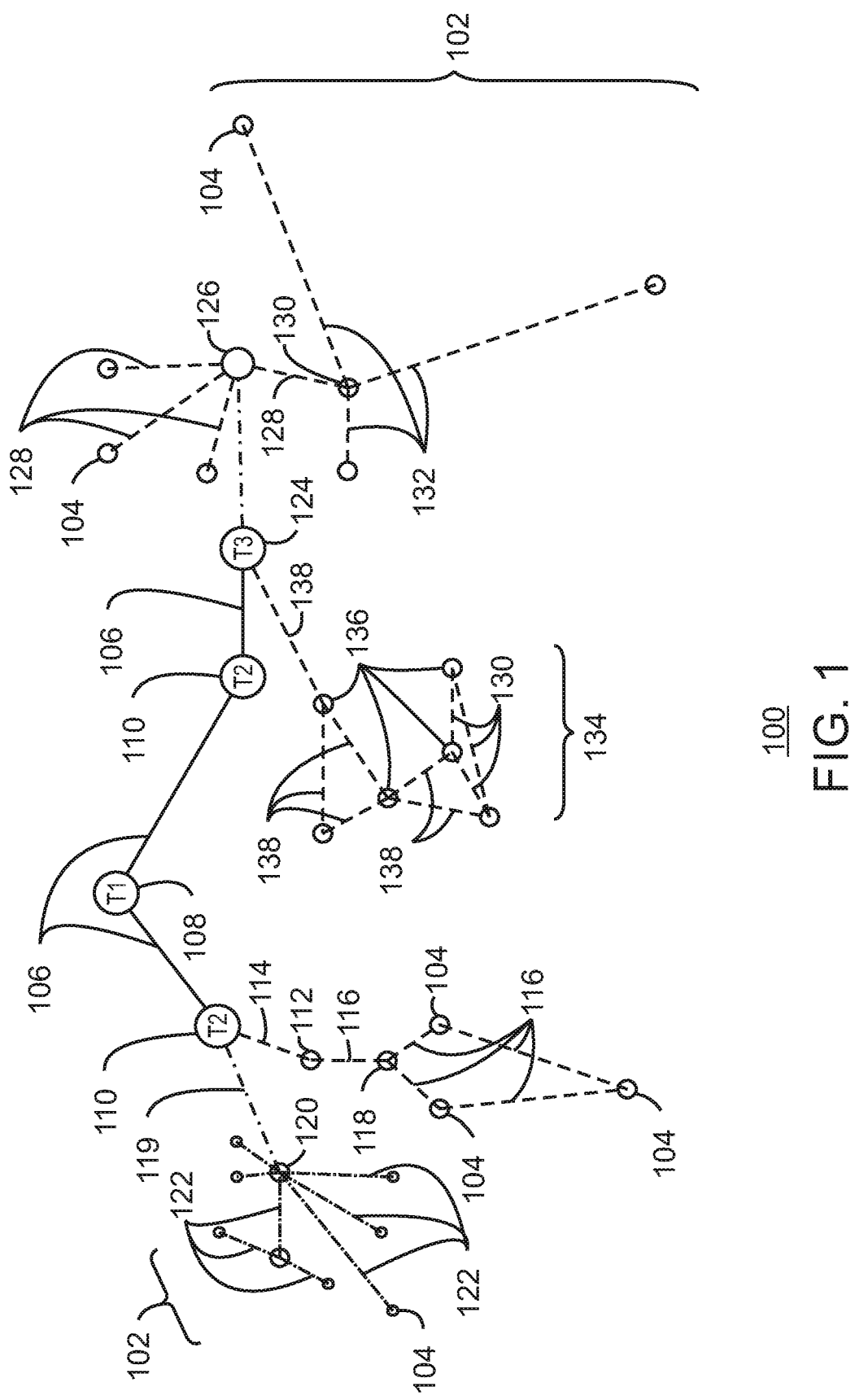
FIG. 1 is a drawing of interconnections that may be present in the Internet in accordance with some embodiments.
Figure 2:
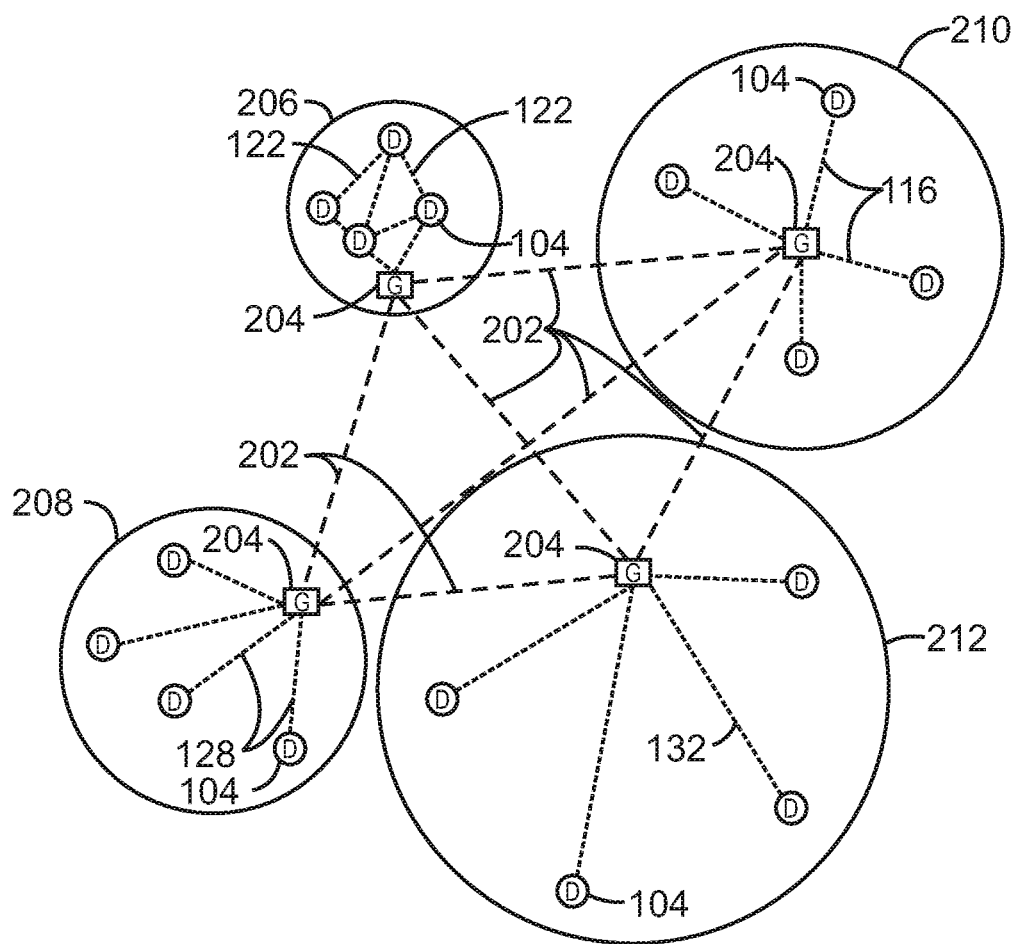
FIG. 2 is a drawing of a network topology for a number of internet-of-things (IoT) networks coupled through backbone links to gateways in accordance with some embodiments.

FIG. 1 is a drawing of interconnections that may be present between the Internet 100 and IoT networks in accordance with some embodiments. The interconnections may couple smaller networks 102, down to the individual IoT device 104, to the backbone 106 of the Internet 100. To simplify the drawing, not every device 104, or other object, is labeled.

In FIG. 1, top-level providers, which may be termed tier 1 ("T1") providers 108, are coupled by the backbone 106 of the Internet to other providers, such as secondary or tier 2 ("T2") providers 110. In some aspects, the backbone 106 can include optical fiber links. In one example, a T2 provider 110 may couple to a tower 112 of an LTE cellular network, for example, by further links, by microwave communications 114, or by other communications technologies. The tower 112 may couple to a mesh network including IoT devices 104 through an LTE communication link 116, for example, through a central node 118. The communications between the individual IoT devices 104 may also be based on LTE communication links 116.

In another example, a high-speed uplink 119 may couple a T2 provider 110 to a gateway 120. A number of IoT devices 104 may communicate with the gateway 120, and with each other through the gateway 120, for example, over Bluetooth low energy (BLE) links 122.

The backbone 106 may couple lower levels of service providers to the Internet, such as tier 3 ("T3") providers 124. A T3 provider 124 may be considered a general Internet service provider (ISP), for example, purchasing access to the backbone 106 from a T2 provider 110 and providing access to a corporate gateway 126 and other customers.

From the corporate gateway 126, a wireless local area network (WLAN) can be used to communicate with IoT devices 104 through Wi-Fi® links 128. A Wi-Fi link 128 may also be used to couple to a low power wide area (LPWA) gateway 130, which can communicate with IoT devices 104 over LPWA links 132, for example, compatible with the LoRaWan specification promulgated by the LoRa alliance.

The T3 provider 124 may also provide access to a mesh network 134 through a coordinator device 136 that communicates with the T3 provider 124 using any number of communications links, such as an LTE cellular link, an LPWA link, or a link 138 based on the IEEE 802.15.4 standard, such as Zigbee®. Other coordinator devices 136 may provide a chain of links that forms cluster tree of linked devices.

In some aspects, one or more IoT devices 104 include the appropriate transceiver for the communications with other devices. Further, one or more IoT devices 104 may include other radio, optical, or acoustic transceivers, as well as wired network interfaces, for communications using additional protocols and frequencies. In some aspects, one or more IoT devices 104 includes components described in regard to FIG. 7.

The technologies and networks may enable the growth of devices and networks. As the technologies grow, the network may be developed for self-management, functional evolution, and/or collaboration, without needing direct human intervention. Thus, the technologies may enable networks to function without centralized controlled systems. The technologies described herein may automate the network management and operation functions beyond current capabilities. Further, the approaches may provide the flexibility to have a centralized control operating without human intervention, a centralized control that is automated, or any combinations thereof.

FIG. 2 is a drawing of a network topology 200 that may be used for a number of internet-of-things (IoT) networks coupled through backbone links 202 to gateways 204 in accordance with some embodiments. Like numbered items are as described with respect to FIG. 1. Further, to simplify the drawing, not every device 104, or communications link 116, 122, 128, or 132 is labeled. The backbone links 202 may include any number of wired or wireless technologies, and may be part of a local area network (LAN), a wide area network (WAN), or the Internet.

Although the topologies in FIG. 2 are hub-and-spoke and the topologies in FIG. 1 are peer-to-peer, it may be observed that these are not in conflict, but that peer-to-peer nodes may behave as hub-and-spoke through gateways. It may also be observed in FIG. 2 that a sub-net topology may have multiple gateways, rendering it a hybrid topology rather than a purely hub-and-spoke topology rather than a strictly hub-and-spoke topology.

The network topology 200 may include any number of types of IoT networks, such as a mesh network 206 using Bluetooth Low Energy (BLE) links 122. Other IoT networks that may be present include a WLAN network 208, a cellular network 210, and an LPWA network 212. Each of these IoT networks may provide opportunities for new developments, as described herein.

For example, communications between IoT devices 104, such as over the backbone links 202, may be protected by a decentralized system for authentication, authorization, and accounting (AAA). In a decentralized AAA system, distributed payment, credit, audit, authorization, brokering, arbitration, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, and vibration, into the autonomous organizations. The integration of sensory systems may allow systematic and autonomous communication and coordination of service delivery against contractual service objectives, orchestration and quality of service (QoS) based swarming and fusion of resources.

The mesh network 206 may be enhanced by systems that perform inline data-to-information transforms. For example, self-forming chains of processing resources comprising a multi-link network may distribute the transformation of raw data to information in an efficient manner. This may allow such functionality as a first stage performing a first numerical operation, before passing the result to another stage, the next stage then performing another numerical operation, and passing that result on to another stage. The system may provide the ability to differentiate between assets and resources and the associated management of each. Furthermore, the proper components of infrastructure and resource based trust and service indices may be inserted to improve the data integrity, quality assurance, and deliver a metric of data confidence.

As described herein, the WLAN network 208 may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 210 may be enhanced by systems that offload data, extend communications to more remote devices, or both. The LPWA network 212 may include systems that perform non-Internet protocol (IP) to IP interconnections, addressing, and routing.

Figure 3:
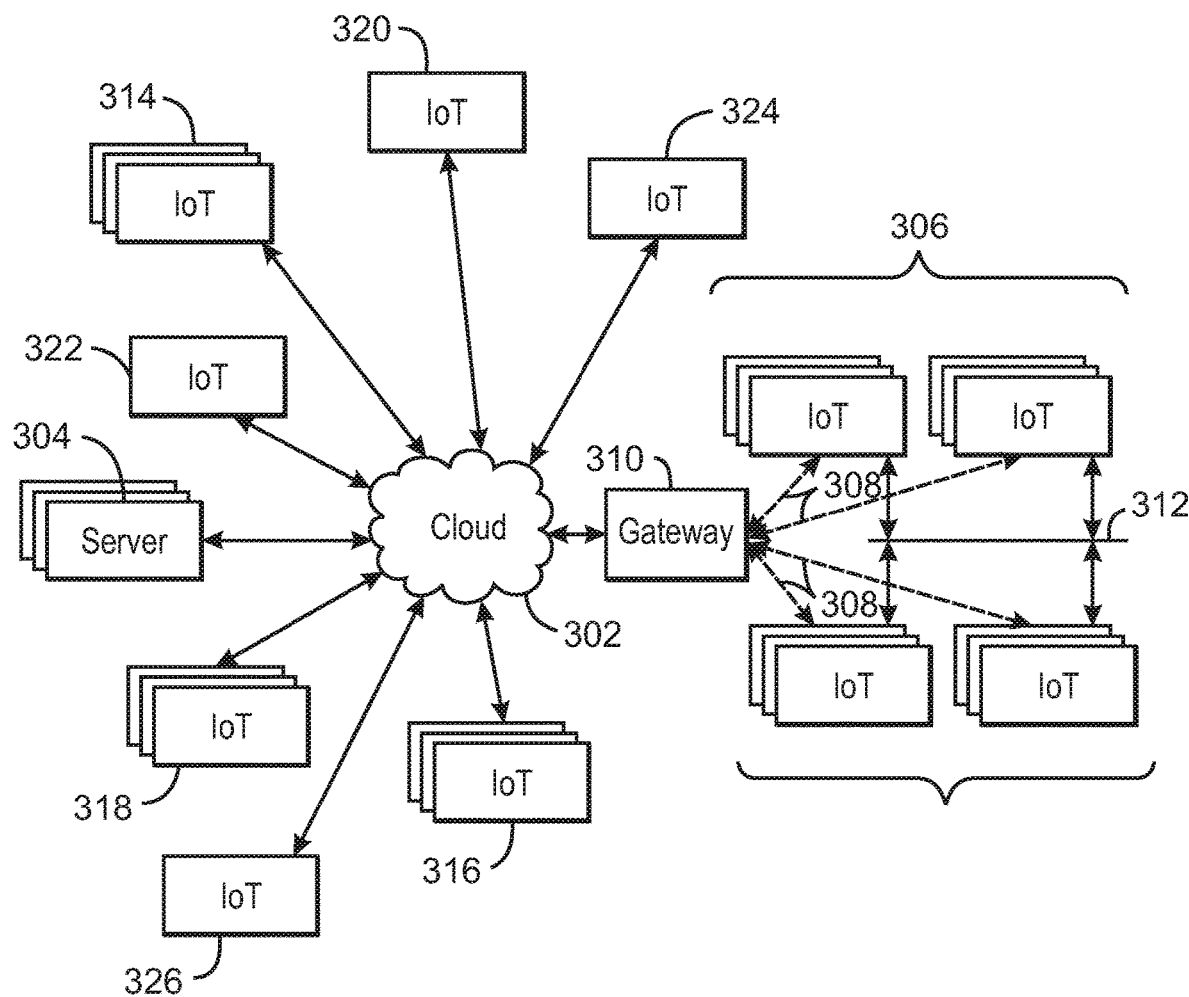
FIG. 3 is a drawing of a cloud computing network, or cloud, in communication with a number of IoT devices in accordance with some embodiments.

FIG. 3 is a drawing 300 of a cloud computing network, or cloud 302, in communication with a number of Internet of Things (IoT) devices in accordance with some embodiments. The cloud 302 may represent the Internet, or may be a local area network (LAN), or a wide area network (WAN), such as a proprietary network for a company. The IoT devices may include any number of different types of devices, grouped in various combinations. For example, a traffic control group 306 may include IoT devices along streets in a city. These IoT devices may include stoplights, traffic flow monitors, cameras, weather sensors, and the like. The traffic control group 306, or other subgroups, may be in communication with the cloud 302 through wireless links 308, such as LPWA links, and the like. Further, a wired or wireless sub-network 312 may allow the IoT devices to communicate with each other, such as through a local area network, a wireless local area network, and the like. The IoT devices may use another device, such as a gateway 310 to communicate with the cloud 302.

Other groups of IoT devices may include remote weather stations 314, local information terminals 316, alarm systems 318, automated teller machines 320, alarm panels 322, or moving vehicles, such as emergency vehicles 324 or other vehicles 326, among many others. Each of these IoT devices may be in communication with other IoT devices, with servers 304, or both.

As can be seen from FIG. 3, a large number of IoT devices may be communicating through the cloud 302. This may allow different IoT devices to request or provide information to other devices autonomously. For example, the traffic control group 306 may request a current weather forecast from a group of remote weather stations 314, which may provide the forecast without human intervention. Further, an emergency vehicle 324 may be alerted by an automated teller machine 320 that a burglary is in progress. As the emergency vehicle 324 proceeds towards the automated teller machine 320, it may access the traffic control group 306 to request clearance to the location, for example, by lights turning red to block cross traffic at an intersection in sufficient time for the emergency vehicle 324 to have unimpeded access to the intersection.

Clusters of IoT devices, such as the remote weather stations 314 or the traffic control group 306, may be equipped to communicate with other IoT devices as well as with the cloud 302. This may allow the IoT devices to form an ad-hoc network between the devices, allowing them to function as a single device, which may be termed a fog device. The fog device is discussed further with respect to FIG. 4.

Figure 4:
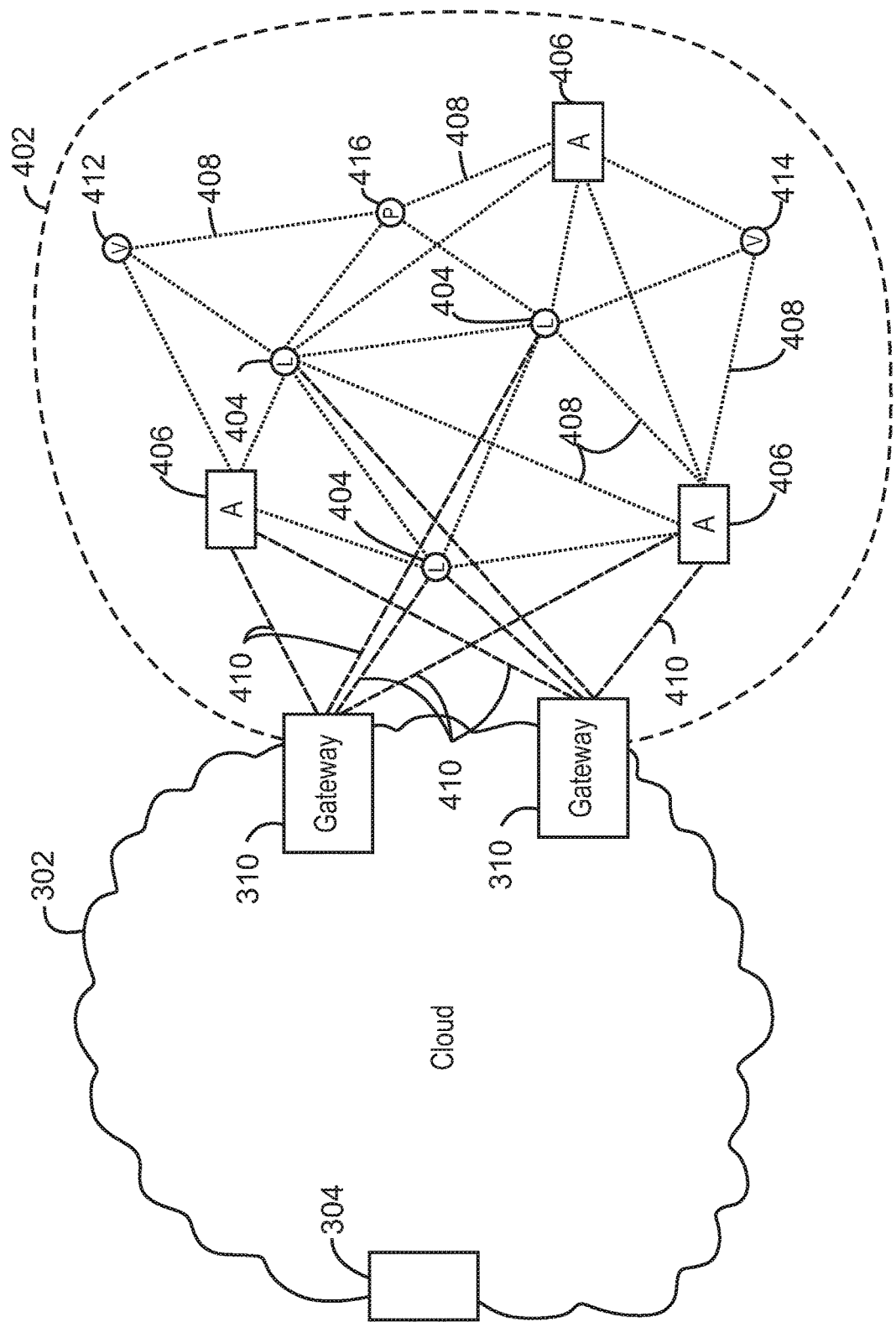
FIG. 4 is a drawing of a cloud computing network, or cloud, in communication with a mesh network of IoT devices, which may be termed a fog device, operating at the edge of the cloud in accordance with some embodiments.

FIG. 4 is a drawing 400 of a cloud computing network, or cloud 302, in communication with a mesh network of IoT devices, which may be termed a fog device 402, operating at the edge of the cloud 302 in accordance with some embodiments. Like numbered items are as described with respect to FIG. 3. As used herein, a fog device 402 is a cluster of devices that may be grouped to perform a specific function, such as traffic control, weather control, plant control, and the like.

In this example, the fog device 402 includes a group of IoT devices at a traffic intersection. The fog device 402 may be established in accordance with specifications released by the OpenFog Consortium (OFC), among others. These specifications allow the formation of a hierarchy of computing elements between the gateways 310 coupling the fog device 402 to the cloud 302 and to endpoint devices, such as traffic lights 404 and data aggregators 406 in this example. The fog device 402 can leverage the combined processing and network resources that the collective of IoT devices provides. Accordingly, a fog device 402 may be used for any number of applications including, for example, financial modeling, weather forecasting, traffic analyses, and the like.

For example, traffic flow through the intersection may be controlled by a plurality of traffic lights 404 (e.g., three traffic lights 404). Analysis of the traffic flow and control schemes may be implemented by aggregators 406 that are in communication with the traffic lights 404 and each other through a mesh network. Data may be uploaded to the cloud 302, and commands received from the cloud 302, through gateways 310 that are in communication with the traffic lights 404 and the aggregators 406 through the mesh network.

Any number of communications links may be used in the fog device 402. Shorter-range links 408, for example, compatible with IEEE 802.15.4 may provide local communications between IoT devices that are proximate to the intersection. Longer-range links 410, for example, compatible with LPWA standards, may provide communications between the IoT devices and the gateways 310. To simplify the diagram, not every communication link 408 or 410 is labeled with a reference number.

The fog device 402 may be considered to be a massively interconnected network wherein a number of IoT devices are in communications with each other, for example, by the communication links 408 and 410. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N.), among many others.

In some aspects, communications from one IoT device may be passed along the most convenient path to reach the gateways 310, for example, the path having the fewest number of intermediate hops, or the highest bandwidth, among others. In these networks, the number of interconnections provide substantial redundancy, allowing communications to be maintained, even with the loss of a number of IoT devices.

In some aspects, the fog device 402 can include temporary IoT devices. In other words, not all of the IoT devices may be permanent members of the fog device 402. For example, in the exemplary system 400, three transient IoT devices have joined the fog device 402, a first vehicle 412, a second vehicle 414, and a pedestrian 416. In these cases, the IoT device may be built into the vehicles 412 and 414, or may be an app on a smart phone carried by the pedestrian 416. Other IoT devices may also be present, such as IoT devices in bicycle computers, motorcycle computers, drones, and the like.

The fog device 402 formed from the IoT devices may be presented to clients in the cloud 302, such as the server 304, as a single device located at the edge of the cloud 302. In this example, the control communications to specific resources in the fog device 402 may occur without identifying any specific IoT device within the fog device 402. Accordingly, if one IoT device within the fog device 402 fails, other IoT devices in the fog device 402 may be able to discover and control a resource, such as an actuator, or other device attached to an IoT device. For example, the traffic lights 404 may be wired so as to allow any one of the traffic lights 404 to control lights for the other traffic lights 404. The aggregators 406 may also provide redundancy in the control of the traffic lights 404 and other functions of the fog device 402.

In some examples, the IoT devices may be configured using an imperative programming style, e.g., with each IoT device having a specific function and communication partners. However, the IoT devices forming the fog device 402 may be configured in a declarative programming style, allowing the IoT devices to reconfigure their operations and communications, such as to determine needed resources in response to conditions, queries, and device failures. This may be performed as transient IoT devices, such as the pedestrian 416, join the fog device 402.

As the pedestrian 416 is likely to travel more slowly than the vehicles 412 and 414, the fog device 402 may reconfigure itself to ensure that the pedestrian 416 has sufficient time to make it through the intersection. This may be performed by forming a temporary group of the vehicles 412 and 414 and the pedestrian 416 to control the traffic lights 404. If one or both of the vehicles 412 or 414 are autonomous, the temporary group may instruct the vehicles to slow down prior to the traffic lights 404. Further, if all of the vehicles at the intersection are autonomous, the need for traffic signals may be diminished since autonomous vehicles' collision avoidance systems may allow for highly inter-leaved traffic patterns that may be too complex for traffic lights to manage. However, traffic lights 404 may still be important for the pedestrian 416, cyclists, or non-autonomous vehicles.

As the transient devices 412, 414, and 416, leave the vicinity of the intersection of the fog device 402, the fog device 402 may reconfigure itself to eliminate those IoT devices from the network. As other transient IoT devices approach the intersection, the fog device 402 may reconfigure itself to include those devices.

The fog device 402 may include the traffic lights 404 for a number of intersections, such as along a street, along with all of the transient IoT devices along the street. The fog device 402 may then divide itself into functional units, such as the traffic lights 404 and other IoT devices proximate to a single intersection. This type of combination may enable the formation of larger IoT constructs, e.g., groups of IoT devices that perform a particular function, in the fog device 402.

For example, if an emergency vehicle joins the fog device 402, an emergency construct, or virtual device, may be created that includes all of the traffic lights 404 for the street, allowing control of the traffic flow patterns for the entire street. The emergency construct may instruct the traffic lights 404 along the street to stay red for opposing traffic and green for the emergency vehicle, expediting the passage of the emergency vehicle.

As illustrated by the fog device 402, the organic evolution of IoT networks is central to improving or maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

Blockchains may be used to decentralize identification as they may provide agreement between devices regarding names and identities that are in current use. As used herein, a blockchain is a distributed database of identity records that is made up of data structure blocks. Further, as used herein, the term blockchain may include any one or more of other distributed ledger systems. Other distributed ledger approaches include Ripple, Hyperledger, Multichain, Keyless Signature Infrastructure, and the like. Each data structure block is based on a transaction, where the issuance of a new name to a device, composite device, or virtual device is one example of a transaction.

Using blockchains for identification, impersonation may be detected by observing re-issuance of names and identities without a corresponding termination. Public blockchains may be most useful, as they can enable a diverse community of observers to detect misnaming, malicious naming, or failure of a naming infrastructure. Thus, trustworthy identity infrastructure may be central to trusting IoT networks.

Figure 5:
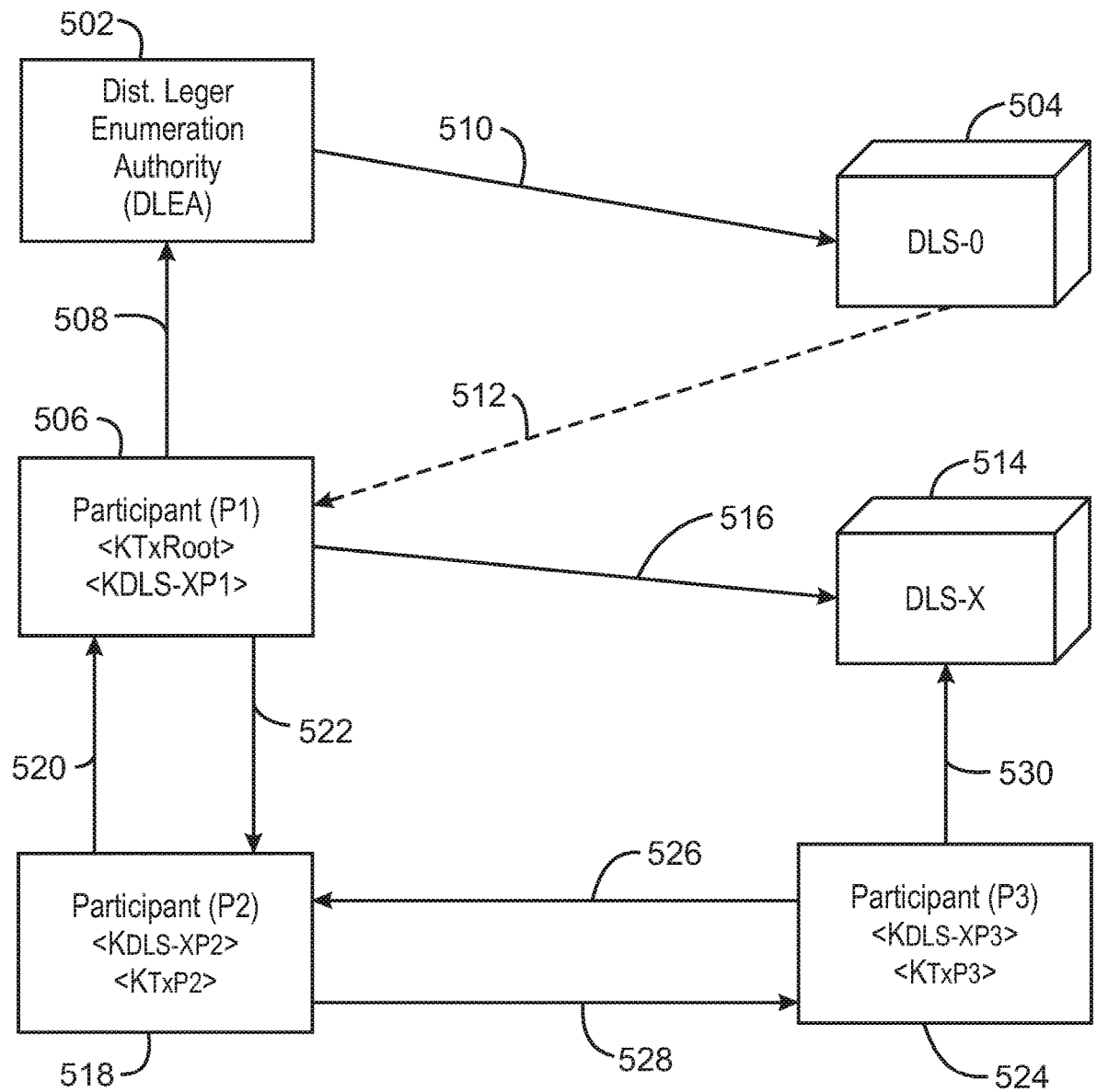
FIG. 5 is a schematic diagram of a semi-permissioned distributed ledger transaction in accordance with some embodiments.

FIG. 5 is a schematic diagram of enabling communications between devices using a semi-permissioned distributed ledger transaction 500 in accordance with some embodiments. As used herein, a semi-permissioned distributed-ledger system uses Enhanced Privacy Identification (EPID) keys to introduce transaction keys into the ledger. A namespace authority, termed a Distributed Ledger Enumeration Authority (DLEA) 502 allocates a unique number to an instance of a ledger. The DLEA 502 may be operated by the Internet Assigned Numbers Authority (IANA), a public agency, a private entity, or any entity that manages a number space by taking steps to avoid reuse of numbers in use.

It may be observed that the algorithm used by the DLEA 502 for assigning names/numbers may be distributed because the number space is sparse in relation to the assigned numbers in use. Thus, the possibility of collisions is small. Hence it is possible that multiple instances of the DLEA 502 could operate independently. Accordingly, the DLEA 502 may be hosted across geo-political boundaries where there isn't a need for a central controlling authority such as a government or the UN or a single large private organization. Further, the independence of distributed blockchains may not be compromised by a centralized naming authority.

The operational integrity of the DLEA 502 may be cross-checked using a public distributed ledger system that publishes DLEA numbers in use. This ledger, DLS-0 504 is assigned the value of zero '0' and is off limits for the DLEA 502 to assign. The proper behavior of the DLEA number assignment may be strengthened by implementing the number space allocation algorithm in a trusted execution environment (TEE) such as an Intel SGX enclave, an ARM TrustZone, or a hardware security module (HSM), among others. In these environments, the number assignment algorithm may be confirmed by the global community of experts. Thus, the DLEA 502 may be trusted, to a very high level, to perform the simple function of avoiding re-assigning an already assigned number.

A participant, for example, P1 506, may send a request 508 for an identifying number for communication transactions, e.g., DLS-X #, to the DLEA 502. The request may take the form [request DLS-X #, $K_{TxRoot}$] $K_{TxRoot}$, in which the information in the brackets is the message, and the number outside the brackets is the public key for P1 506, $K_{TxRoot}$, which indicates a signing of the message.

The DLEA 502 may assign a unique number to an instance of a semi-permissioned distributed ledger system (DLS), and post 510 the DLEA allocated number to DLS-0 504 along with the public key, $K_{TxRoot}$. DLS-0 504 is the public distributed ledger system (DLS) and is only writable by the DLEA 502, but is visible to all.

P1 506 may monitor 512 the ledger, DLS-0 504, to determine when the assignment of a new key, X, has been recorded. The assigned number, X, may be used by P1 506 as the root or starting key of a newly formed ledger, DLS-X 514. This may be performed by creating the ledger, DLS-X 514, by committing a message 516 to the new ledger DLS-X 514: $[K_{TxRoot}]K_{DLS-X}$; $[K_{DLS-X}, perm] K_{TxRoot}$; and $[K_{TxP2}] K_{TxRoot}$, where $K_{TxP2}$ is a new ledger transaction key.

The new ledger, DLS-X 514, may also be used to implement the EPID 'join' protocol that establishes EPID private keys for each new member of DLS-X 514. All subsequent use of EPID private keys may be verified using the public key, $K_{TxRoot}$, of the first transaction to the ledger, DLS-X 514. Any of the EPID private keys may introduce ledger transaction keys ($K_{Tx}$) to DLS-X 514 by signing the new TxK with the EPID key.

For example, another participant, P2 518 may send a join request 520 to the first participant, P1 506. The join request 520 may include the message: [JoinP DLS-X]$K_{Mfg2}$; $[K_{TxP2}] K_{TxP2}$. The second participant, P2 518, may have obtained the transaction key, $K_{TxP2}$, by accessing DLS-X 514. The second key, $K_{Mfg2}$, may be a manufacturer's EPID key, such as $K_{Mfg2}$, where the root $K_{Tx}$ is attested, or signed, by a manufacturer supplied EPID key of the format $K_{Mfg}$. The $K_{Mfg}$ attests that the trusted execution environment (TEE) containing the root TxK is sufficiently trustworthy. Likewise, a $K_{Mfg}$ in the TEE of the new participant device is used to attest that the temporal key used to protect the join request 520, e.g., $K_{TxP2}$, is legitimate and trustworthy.

If P1 506 authenticates the request, it may return a message 522 to P2 518 to finalize the join. The message 522 may include [[JoinI DLS-X]$K_{TxRoot}$]$K_{Mfg1}$, in which $K_{Mfg1}$ is the manufacturer's EPID for P1 506. The root $K_{Tx}$, $K_{TxRoot}$ is used to authenticate the join protocol response.

The devices P1 506 and P2 518 may exist at two different hierarchical levels. Thus a number of devices at the level of P2 518 may join with P1 506, for example, as a composite object and sub-objects as described herein. Similarly, other devices may join with P2 518 at a lower level, such as participant P3 524. To join, P3 524 may send a join protocol request 526 to P2 518 of the form [JoinP DLS-X]$K_{Mfg3}$; $[K_{TxP3}]K_{TxP3}$. If P2 518 authenticates the join protocol request 526, it may respond with a message 528 of the format: [[JoinI DLS-X]$K_{TxP2}$]$K_{Mfg2}$; [TxData, $K_{TxP3}$]$K_{TxP2}$. P3 524 may commit the transaction to the distributed ledger, DLS-X 514 by recording a signed message 530 of the format: [[TxData, $K_{TxP3}$]$K_{TxP2}$]$K_{DLS-XP3}$ in the ledger DLS-X 514.

Instead of using JoinP transactions P2 and P3 may be peer nodes in the blockchain (X). Accordingly, they may use the transaction keys (KT) to engage in commerce. For example, the message 528 may be buying a good or service and the message 526 may be selling the good or service. In this case, they only need KTx keys, and the technique is describing a blockchain transaction key behavior.

Further, blockchains generally don't have a KDLS key. That means the blockchains may not be able to enforce semi-permissioned transactions. For example, in message 528, P2 is buying a good or service, and P3 knows that P2 is a member of a club, for example, a commercial establishment, an online auction site, a casino club, and the like. Accordingly, P2 may get a discounted offer if the Seller, P3, is also part of the club, or if club-owned currency, such as gambling chips, are exchanged for different goods or services provided by the club members.

It may make sense to use EPID as a transaction key (KTx) in order to maintain several wallets for convenience. As used herein, a wallet may be a cryptographically protected electronic storage that holds a currency or a link to a credit account. In this example, P2 and P3 may be different wallets that each hold a share of a distributed wallet, for example, each other's distributed wallets.

Another case in which the EPID may be used as a transaction key is when P2 and P3 are each members of a group, such as a group of employees at a company or a group of people that represent a church or civic enterprise, where the various members can act as agents of the enterprise. From a blockchain perspective, it doesn't matter semantically whether the Tx key is an EPID key or other types of keys as long as the signature verifies the identities.

Figure 6:
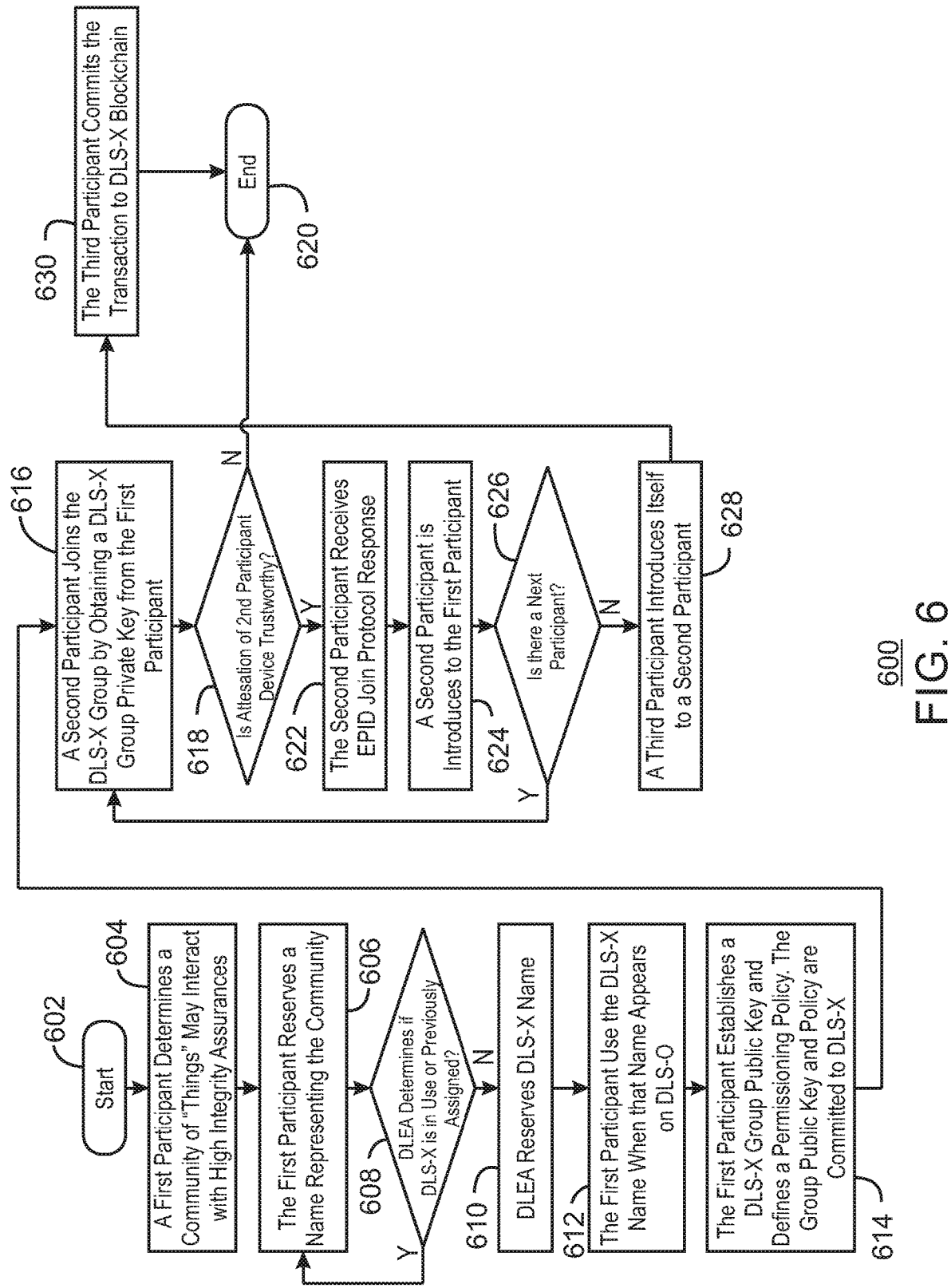
FIG. 6 is a process flow diagram of an example method for performing semi-permissioned transactions in accordance with some embodiments.

FIG. 6 is a process flow diagram of an example method 600 for performing semi-permissioned transactions in accordance with some embodiments. The method 600 of FIG. 6 may be implemented by the IoT device 700 described with respect to FIG. 7. The block 602 represents, for example, when a device is instructed to join with other devices. At block 604, a first participant determines that a community of things, such as the IoT devices forming a fog device, among others, may interact with high integrity assurances.

At block 606, the first participant reserves a name representing the community. This may be performed, for example, by sending a name, e.g., DLS-X, and a public key for the first participant to a DLEA. The name, e.g., DLS-X, may be a universally unique identifier (UUID), or other identification that has a very low likelihood of replication. The message may be signed by a private key for the first participant.

At block 608, the DLEA determines whether the name is in current use or has been previously assigned. If so, process flow returns to block 606 for the first participant to select a new name. If not, at block 610, the DLEA reserves the name, DLS-X, by committing it to a distributed ledger, DLS-0. The key used to authenticate the initial transaction to the DLEA may be committed to the ledger along with the name.

At block 612, the first participant may use the DLS-X name when that name appears on DLS-0. This may be determined by the first participant monitoring the DLS-0 ledger. At block 614, the first participant establishes a DLS-X group public key using EPID, and defines a permissioning policy. The group public key and policy are committed to the DLS-X ledger using the first participant's transaction key. The first participant's transaction may also be committed to the DLS-X using the EPID group private key.

At block 616, a second participant may join the DLS-X group by obtaining a DLS-X group private key from the first participant. The first participant may be acting as EPID group key issuer. The second participant may attest the trustworthiness of its device using a manufacturer's key, for example, a manufacturers EPID key. At block 618, a determination is made as to whether the attestation of the second device is trustworthy. If not, the method 600 ends at block 620.

If the attestation is trustworthy, at block 622, second participant receives EPID join protocol response allowing it to generate a second group private key under the EPID group public key for DLS-X. At block 624, a second participant self-signs its transaction key, delivers it to the first participant. First participant signs second participant's public key and commits the transaction to the ledger, DLS-X, thereby introducing the second participant to DLS-X. At block 626, a determination is made as to whether there is another participant. If so, process flow returns to block 616 to resume the next registration.

At block 628, a third participant may introduce itself to a second participant. This may be done by the third participant self-signing a third participant transaction key and sending it to the second participant. The second participant signs the third participant public transaction key and optionally includes transaction data and signs with its transaction key and DLS-X group key.

At block 630, the third participant commits the transaction to DLS-X. This may be performed by the third participant signing the second participant's transaction data using the third participant's DLS-X group private key before committing the transaction to the DLS-X blockchain. The second participant may also commit the transaction data to the DLS-X ledger using its DLS-X group private key. In this scenario, the third participant also signs his self-signed tx key with the third participant's DLS-X group key. The method 600 then ends at block 620.

Figure 7:
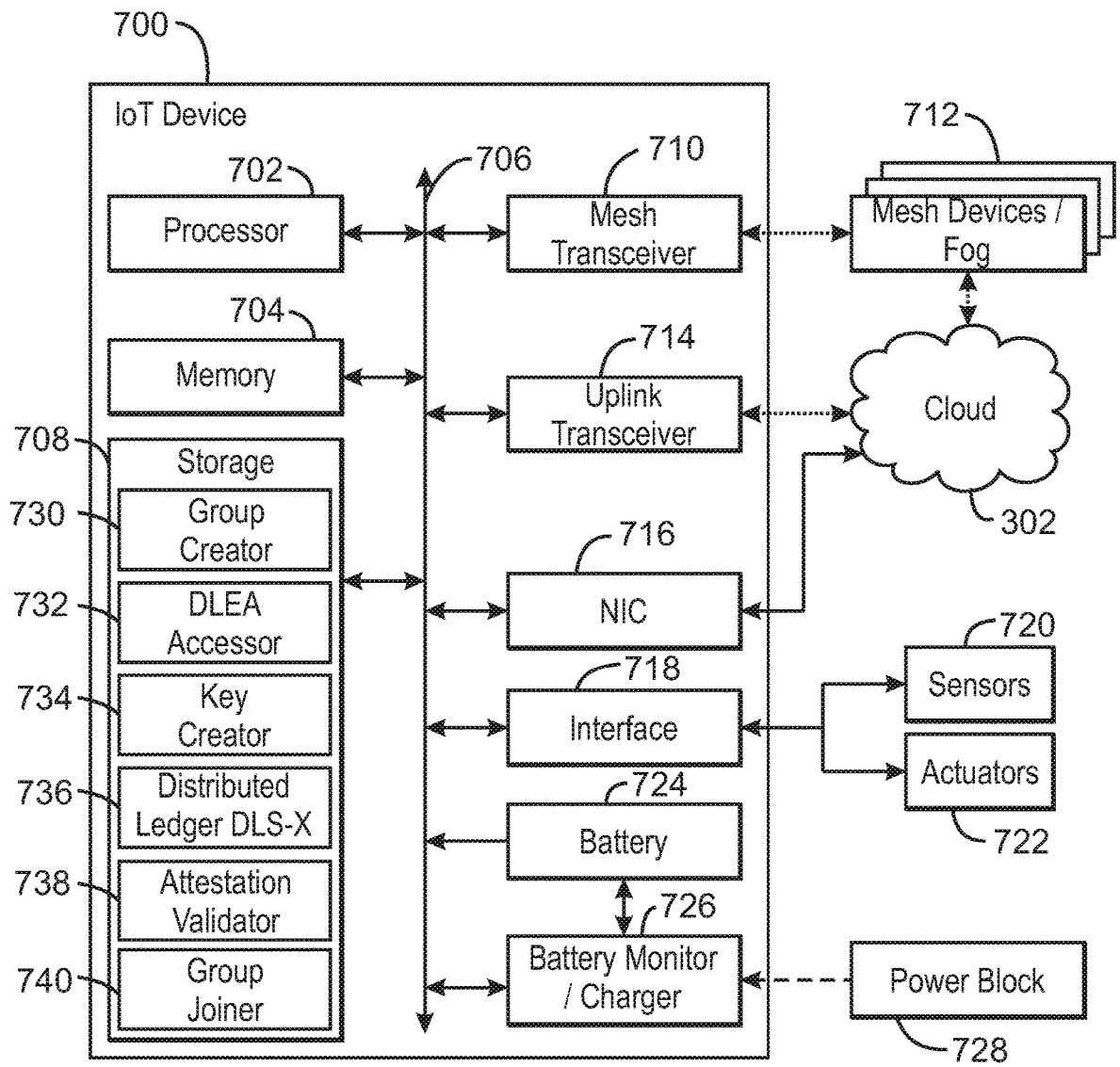
FIG. 7 is a block diagram of an example of components that may be present in an IoT device for creating coalition groups in accordance with some embodiments.

FIG. 7 is a block diagram of an example of components that may be present in an IoT device 700 for creating coalition groups in accordance with some embodiments. Like numbered items are as described with respect to FIG. 3. It can be noted that different components may be selected and used for the IoT device 700 than for other IoT devices discussed herein.

The IoT device 700 may include any combinations of the components shown in the example. The components may be implemented as ICs, portions thereof, discrete electronic devices, or other modules, logic, hardware, software, firmware, or a combination thereof adapted in the IoT device 700, or as components otherwise incorporated within a chassis of a larger system. The block diagram of FIG. 7 is intended to show a high level view of components of the IoT device 700. However, some of the components shown may be omitted, additional components may be present, and different arrangement of the components shown may occur in other implementations.

The IoT device 700 may include a processor 702, which may be a microprocessor, a multi-core processor, a multi-threaded processor, an ultra-low voltage processor, an embedded processor, or other known processing element. The processor 702 may be a part of a system on a chip (SoC) in which the processor 702 and other components are formed into a single integrated circuit, or a single package, such as the Edison™ or Galileo™ SoC boards from Intel. As an example, the processor 702 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

The processor 702 may communicate with a system memory 704 over a bus 706. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 708 may also be coupled to the processor 702 via the bus 706. To enable a thinner and lighter system design, the mass storage 708 may be implemented via a solid state drive (SSD). Other devices that may be used for the mass storage 708 include flash memory cards, such as SD cards, microSD cards, xD picture cards, and the like, and USB flash drives.

In low power implementations, the mass storage 708 may be on-die memory or registers associated with the processor 702. However, in some examples, the mass storage 708 may be implemented using a micro hard disk drive (HDD). Further, any number of new technologies may be used for the mass storage 708 in addition to, or instead of, the technologies described, such resistance change memories, phase change memories, holographic memories, or chemical memories, among others. For example, the IoT device 700 may incorporate the 3D XPOINT memories from Intel® and Micron®.

The components may communicate over the bus 706. The bus 706 may include any number of technologies, including industry standard architecture (ISA), extended ISA (EISA), peripheral component interconnect (PCI), peripheral component interconnect extended (PCIx), PCI express (PCIe), or any number of other technologies. The bus 706 may be a proprietary bus, for example, used in a SoC based system. Other bus systems may be included, such as an I$^2$C interface, I$^3$C interface, an SPI interface, point to point interfaces, and a power bus, among others.

The bus 706 may couple the processor 702 to a mesh transceiver 710, for communications with other mesh devices 712. The mesh transceiver 710 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 712. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The mesh transceiver 710 may communicate using multiple standards or radios for communications at different range. For example, the IoT device 700 may communicate with geographically proximate devices, e.g., within about 10 meters, using a local transceiver based on BLE, or another low power radio, to save power. More distant mesh devices 712, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The mesh transceiver 710 may be incorporated into an MCU as an address directly accessible by the chip, such as in the Curie® units available from Intel.

An uplink transceiver 714 may be included to communicate with devices in the cloud 302. The uplink transceiver 714 may be LPWA transceiver that follows the IEEE 802.15.4, IEEE 802.15.4g, IEEE 802.15.4e, IEEE 802.15.4k, or NB-IoT standards, among others. The IoT device 700 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 710 and uplink transceiver 714, as described herein. For example, the radio transceivers 710 and 712 may include an LTE or other cellular transceiver that uses spread spectrum (SPA/SAS) communications for implementing high-speed communications, such as for video transfers. Further, any number of other protocols may be used, such as Wi-Fi® networks for medium speed communications, such as still pictures, sensor readings, and provision of network communications.

The radio transceivers 710 and 712 may include radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), or Narrow Band IoT (NB-IoT), among others. It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High-speed Packet Access), HSDPA (High-Speed Downlink Packet Access), HSUPA (High-Speed Uplink Packet Access), HSPA+(High-speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver 714, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 716 may be included to provide a wired communication to the cloud 302 or to other devices, such as the mesh devices 712. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 716 may be included to allow connect to a second network, for example, a NIC 716 providing communications to the cloud over Ethernet, and a second NIC 716 providing communications to other devices over another type of network.

The bus 706 may couple the processor 702 to an interface 718 that is used to connect external devices. The external devices may include sensors 720, such as accelerometers, level sensors, flow sensors, temperature sensors, pressure sensors, barometric pressure sensors, and the like. The interface 718 may be used to connect the IoT device 700 to actuators 722, such as power switches, valve actuators, an audible sound generator, a visual warning device, and the like.

While not shown, various input/output (I/O) devices may be present within, or connected to, the IoT device 700. For example, a display may be included to show information, such as sensor readings or actuator position. An input device, such as a touch screen or keypad may be included to accept input.

A battery 724 may power the IoT device 700, although in examples in which the IoT device 700 is mounted in a fixed location, it may have a power supply coupled to an electrical grid. The battery 724 may be a lithium ion battery, a metal-air battery, such as a zinc-air battery, an aluminum-air battery, a lithium-air battery, a hybrid super-capacitor, and the like.

A battery monitor/charger 726 may be included in the IoT device 700 to track the state of charge (SoCh) of the battery 720. The battery monitor/charger 726 may be used to monitor other parameters of the battery 724 to provide failure predictions, such as the state of health (SoH) and the state of function (SoF) of the battery 724. The battery monitor/charger 726 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 726 may communicate the information on the battery 724 to the processor 702 over the bus 706. The battery monitor/charger 726 may also include an analog-to-digital (ADC) convertor that allows the processor 702 to directly monitor the voltage of the battery 726 or the current flow from the battery 724. The battery parameters may be used to determine actions that the IoT device 700 may perform, such as transmission frequency, mesh network operation, sensing frequency, and the like.

A power block 728, or other power supply coupled to a grid, may be coupled with the battery monitor/charger 726 to charge the battery 724. In some examples, the power block 728 may be replaced with a wireless power receiver to obtain the power wirelessly, for example, through a loop antenna in the IoT device 700. A wireless battery charging circuit, such as an LTC4020 chip from Linear Technologies of Milpitas, Calif., among others, may be included in the battery monitor/charger 726. The specific charging circuits chosen depend on the size of the battery 724, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others. In some examples, the power block 728 may be augmented or replaced with solar panels, a wind generator, a water generator, or other natural power systems.

The mass storage 708 may include a number of modules to implement the coalition group formation described herein. Although shown as code blocks in the mass storage 708, it may be understood that any of the modules may be fully or partially replaced with hardwired circuits, for example, built into an application specific integrated circuit (ASIC). The mass storage 708 may include a group creator 730 that determines if a group of objects can interact with high trust assurances.

As discussed herein, the assurances may be based attestation keys programmed into the IoT device 700, and other mesh devices 712 by manufacturers. The group creator 730 may create a name for the group. A DLEA accessor 732 may access a DLEA to determine if the name is available, or if the IoT device 700 will have to create another name. If the name is available, the DLEA will commit the name to a distributed ledger, DLS-0. The DLEA accessor 704 may monitor DLS-0 to determine if the name was committed. A key creator 734 may create a key based on name created by the group creator 730, for example, using an EPID server. The key creator 734 may commit the key to a local distributed ledger, DLS 736. DLS 736 may exist in the IoT device 700, or may exist in another mesh device 712. An attestation validator 738 may be included to determine if a join request from another device is valid. If so, a group joiner 740 may send out a join message with the group key.

Figure 8:
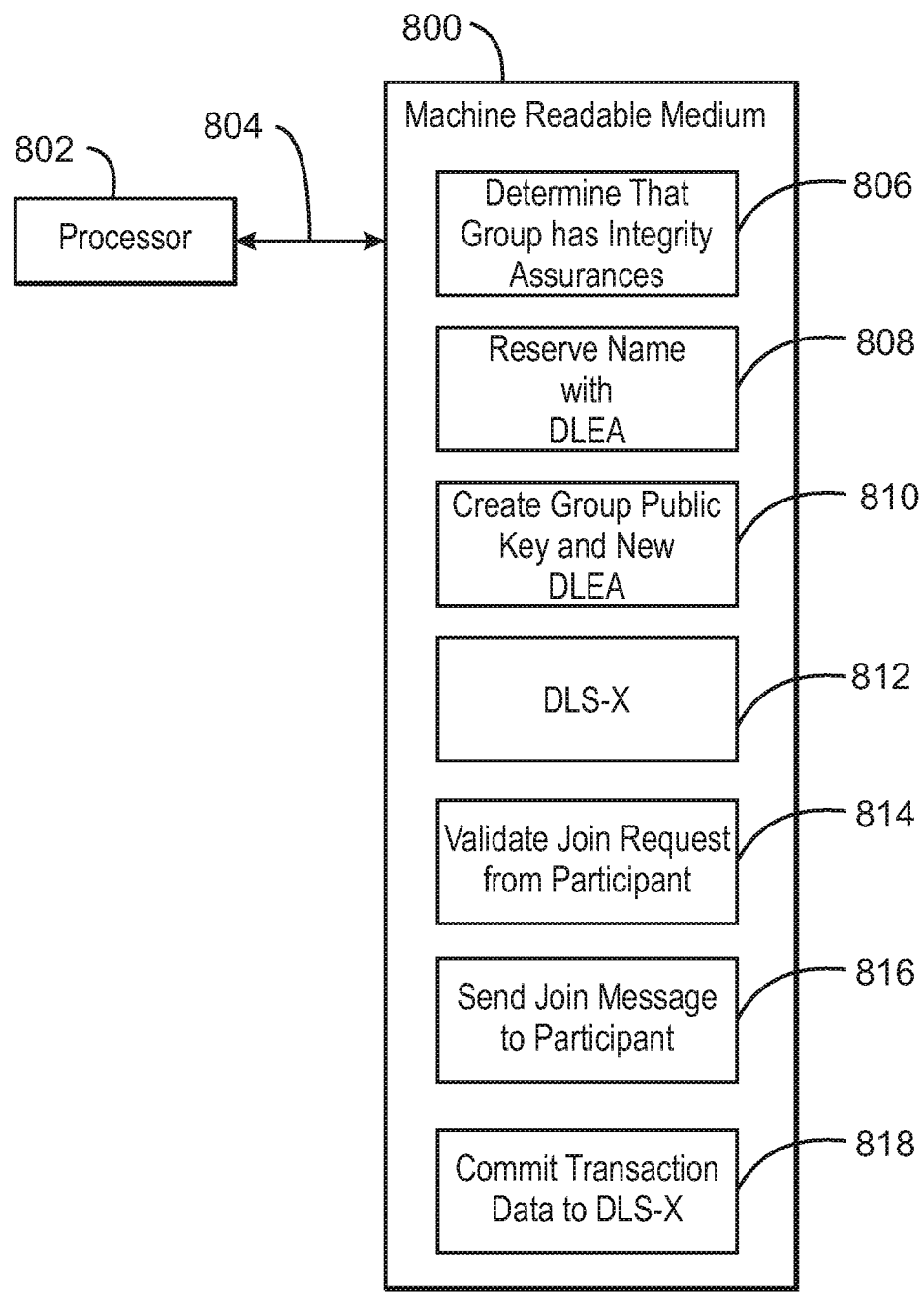
FIG. 8 is a block diagram of a non-transitory, machine readable medium including code to direct a processor to securely communicate in groups in accordance with some embodiments.

FIG. 8 is a block diagram of a non-transitory, machine readable medium 800 including code to direct a processor 802 to securely communicate in groups in accordance with some embodiments. The processor 802 may access the non-transitory, machine readable medium 800 over a bus 804. The processor 802 and bus 804 may be selected as described with respect to the processor 702 and bus 706 of FIG. 7. The non-transitory, machine readable medium 800 may include devices described for the mass storage 708 of FIG. 7 or may include optical disks, thumb drives, or any number of other hardware devices.

FIG. 8 is a block diagram of an exemplary non-transitory, machine readable medium 800 including code to direct a processor 802 to determine that a group may communicate with high integrity in accordance with some embodiments. The processor 802 may access the non-transitory, machine readable medium 800 over a bus 804. The processor 802 and bus 804 may be selected as described with respect to the processor 702 and bus 706 of FIG. 7. The non-transitory, machine readable medium 800 may include devices described for the mass storage 708 of FIG. 7 or may include optical disks, thumb drives, or any number of other hardware devices.

The non-transitory, machine readable medium 800 may include code 806 to direct the processor 802 to determine that a group may communicate with high integrity. Code 808 may be included to direct the processor 802 to generate a name for the group, and reserve the name with a Distributed Ledger Enumeration Authority (DLEA). Code 810 may be included to direct the processor 802 to create other keys from the registered name and commit the information to a new distribute ledger, DLS-X 812.

Code 814 may be included to direct the processor 802 to validate a join request for the group from IoT devices, composite objects, or both. The join request may include attestation information, such as a manufacturer's key provided to a requesting device. Code 816 may be included to direct the processor 802 to issue credentials to the requestor, such as an EPID. Code 818 may be included to direct the processor 802 to commit transaction data to the distributed ledger, DLS-X, using a private key, a public key, or a combination of both.

In addition to secure communications, security during booting may be useful to protect the network from intrusion. While a secure boot may be implemented in a less constrained system, including larger IoT devices, using a trusted execution module (TEM), or other hardware device, this may be more challenging for more resource-constrained IoT devices.

Figure 9:
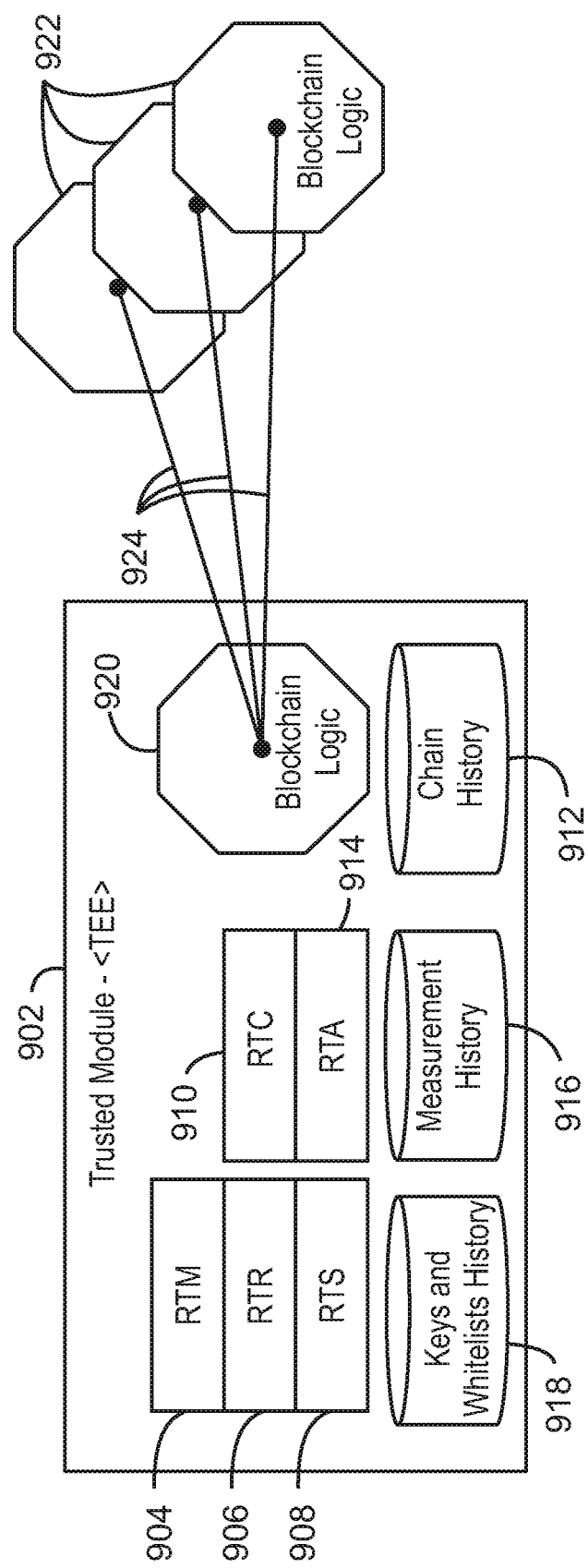
FIG. 9 is a schematic diagram of the use of a trusted execution environment (TEE) to securely boot a device in an IoT environment in accordance with some embodiments.

FIG. 9 is a schematic diagram 900 of the use of a trusted execution environment (TEE) to securely boot a device in an IoT environment in accordance with some embodiments. Trusted computing is primarily concerned with the ability of a device to attest to trustworthy attributes of a computing device. Attributes typically affecting trust include a trusted or secure boot.

Trusted boot instruments the boot sequence with measurement operations that compute a hash of the next code block to be loaded and executed. Measurements are stored in secure storage, such as a trusted module (TEE) 902. In an IoT device, the trusted module 902 may be a separate device or may be a protected memory region that is encrypted or otherwise not generally accessible to the processor or general operating code of the IoT device. A secure boot is an extension to a trusted boot environment which adds the checking of measurements against a whitelist of permitted processes. Typically, the boot sequence is altered if actual and whitelist measurements do not agree, for example, by booting into a non-secure environment and informing other devices of this.

Once the trusted boot is complete, it may provide the TEE for secure execution. If code is loaded into, or is statically bound, to a hardened execution environment, such as the TEE, the operations performed may resist some attacks. A hardened execution environment may include any number of hardware enhanced security systems, such as a trusted platform module (TPM) to create the TEE. The hardening techniques may include Software Guard Extensions (SGX) from Intel®, TrustZone® from ARM®, hardware security modules (HSMs) such as a TPM, smart cards, or virtualization, among others.

The TEE may also provide an environment for secure update. Secure boot checks code authenticity at load time. Secure update uses code signing to ensure integrity and authenticity, such as with the Authenticode™ technology from Microsoft. A manifest structure may be used to manage association of code hash values and signatures over hash values as part of the install image. Technologies for installation image packages include the Itsy Package Management System (IPKG), Debian Linux installation files (DEB), RPM package manager files (RPM), and Clear Linux Bundles, among others.

The TEE may provide secure storage for both temporal and long term storage of security relevant data. Data types include keys, whitelists, blacklists, measurements, audit logs, passwords, biometrics, certificates and policies. Hardening techniques include isolation, anti-tampering, encryption and obfuscation.

Attestation may be a part of the secure environment. Attestation, as described herein, is a reporting function tied to a secure execution or secure storage function in which the device or platform self-reports its trust properties. It details the hardening techniques and assurances that are applied to the secure function in question. The attestation function itself must be a secure function where hardening and assurances exceed the level of quality of the function over which it is reporting.

Trusted computing challenges may increase in an IoT setting due to several factors. For example, IoT devices may be constrained by size, functionality, and economics. Security hardening often comes as a trade-off to these costs. Inclusion of trusted computing building blocks may be missing or incomplete on cost constrained devices.

Further, IoT networks may distribute functionality over multiple devices, which results in a greater dependency on network building blocks. Consequently, network behaviors may be more problematic as the network becomes a larger ingredient of the overall computing fabric. Undesirable behaviors may be amplified as network complexity and scale increases.

IoT networks may often include devices and application from a number of vendors, value-added-resellers, integrators, suppliers and analysts. Each of these players may create systems that have to cooperate to ensure interfaces, structures, computing environments and operations procedures fit together properly—without introducing unexpected and undesired behavior.

In some aspects, to address these issues, IoT networks may have a distribution of trust across multiple devices. Distribution is one way to address diminished reliability, availability and safety that centralization brings. Distribution also scatters decision processes as the natural central control points dissolve.

In some aspects, trusted computing attestation in IoT networks may be improved with the use of blockchain technology. Trusted computing concepts define a set of trust roots that perform a function fundamental to security where the proper and expected behavior of root functionality is implicitly trusted to work as expected. The trusted computing group (TCG), for example, in the trusted module 902, may include several trust roots.

A root of trust for measurement (RTM) 904 is a function that measures and may verify the first loadable object in a system. A root of trust for reporting (RTR) 906 is a function that attests to values in the root of trust for storage (RTS) 908 and to the computing environment that implements the RTM 904, RTR 906, and RTS 908. The attestation function may be recursively defined within the RTR 906. The root of trust for storage (RTS) 908 is the function that stores values produced and consumed by the RTM 904 and RTR 906.

Blockchain roots-of-trust may be used in IoT network environments to increase security by distributing the security functions. Distributed trust in IoT networks using blockchain may add two additional roots-of-trust for the blockchain. A root of trust for chaining (RTC) 910 is a function that exposes a blockchain resource to local trusted computing roots, such as the RTR 906. The RTC 910 and RTR 906 can work together to commit attested attributes to a blockchain, for example, by saving the attested attributes to a chain history 912. The trust properties of blockchains are highly desirable because they employ distribution as a mechanism for guaranteeing expected behavior using threshold consensus protocols.

A root of trust for archival function (RTA) 914 adds an availability component to the other roots. A constrained IoT device may not have the resources to maintain a history of measurements 916 and measurement logs spanning multiple reboots. Further, it may not be capable of storing expansive whitelists 918 that describe past or anticipated configurations. Trusted computing inquiry may require searching historical context. The RTA 914 adds archival capability to RTC nodes that may not maintain the full block history.

The system described herein may be used with blockchain logic 920 that works with blockchain logic 922 in other devices to maintain the chain history 912. This may include, for example, propagating 924 the chain history 912 of the blockchain to other devices. In other devices, the chain history 912 may be compared to local copies to make sure that the changes made are authorized. If a majority of devices agrees that the change was not authorized, the blockchain logic 920 reverts the chain history 912 to the previous history.

Figure 10:
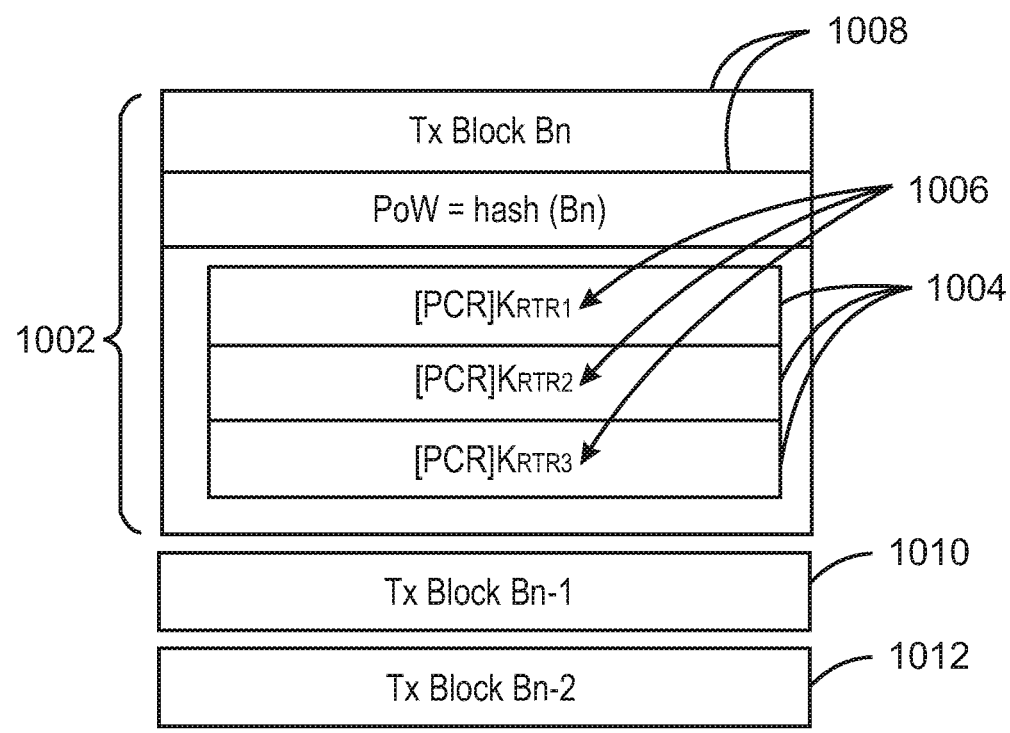
FIG. 10 is a block diagram of a blockchain block holding boot integrity transactions in accordance with some embodiments.

FIG. 10 is a block diagram 1000 of a blockchain block 1002 holding boot integrity transactions in accordance with some embodiments. Referring also to FIG. 9, the blockchain block 1002 forms a single record in the chain history 912 or other distributed ledger system. The RTC 910 constructs a block including measurements 1004 in platform configuration registers (PCR). The PCR may be memory locations in a protected region, in a specific hardware device, or both.

In some aspects, the sample rate for the measurements used for the blockchain block 1002 may be more granular than rate at which measurements are saved to the PCR, for example, PCR extends. However, every PCR extend may trigger a transaction that is added to a block. PCR values are signed by an attestation signing key 1006 that may differ from the block-signing key. In essence, the RTR 906 is attesting to the blockchain its current integrity state. The RTC 910 is attesting that the PCRs have not been overwritten by undetected system resets.

The block diagram 1000 can also indicate the presence of previous blockchain blocks 1010 and 1012. Although not shown in this figure, these blocks 1010 and 1012 may hold other boot integrity transactions, or may hold information on composite objects, object types, coalition group compositions, secure transaction data, or any number of other items to support the security of an IoT network.

Figure 11:
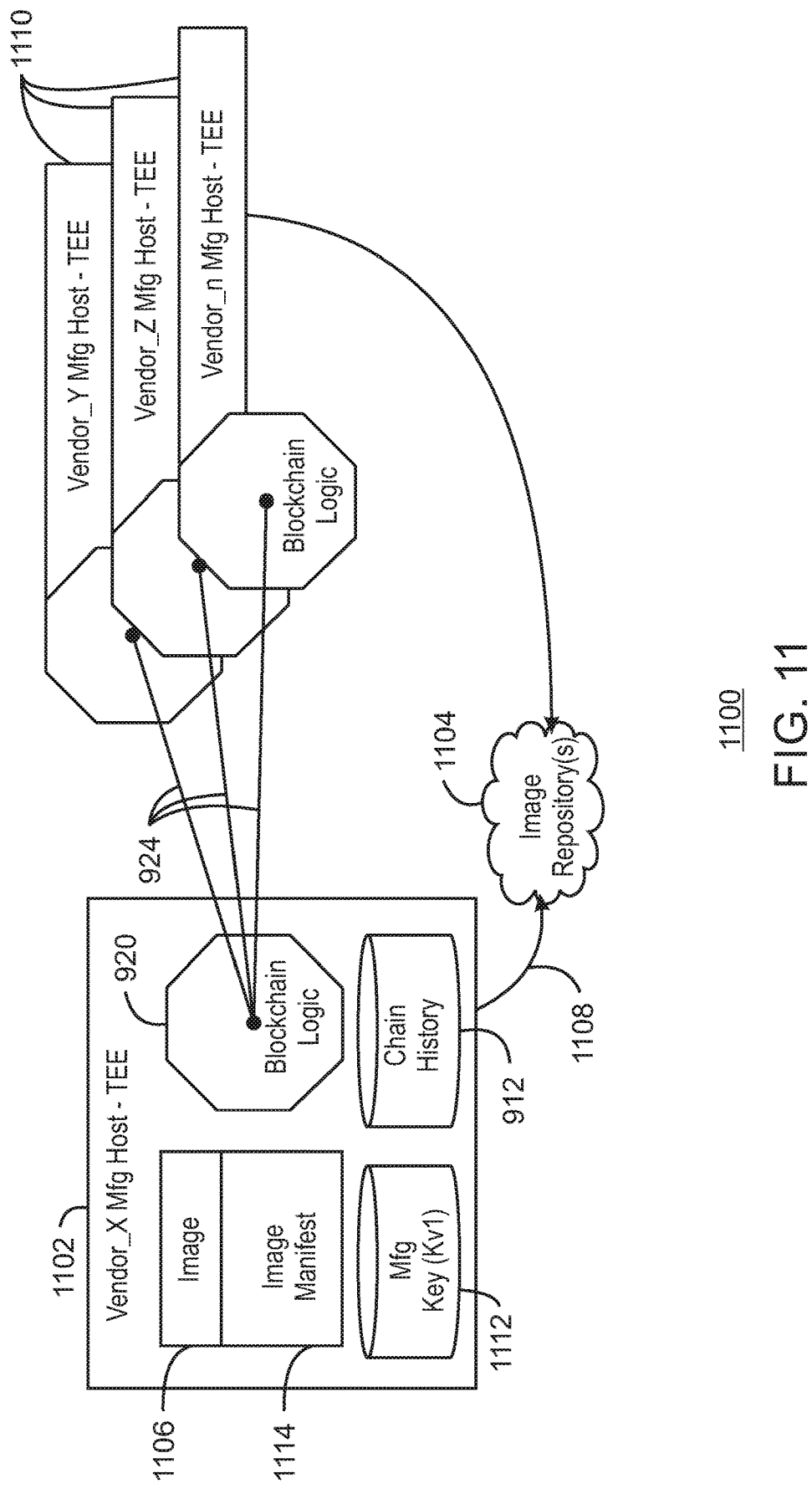
FIG. 11 is a schematic diagram of the use of a whitelist image collection with a blockchain in accordance with some embodiments.

FIG. 11 is a schematic diagram 1100 of the use of a whitelist image collection with a blockchain in accordance with some embodiments. Like numbered items are as described with respect to FIG. 9. A boot process is taking place on a first IoT device 1102. An image repository 1104 may be accessed to obtain a whitelist image 1106, for example, using communications 1108 that are encrypted with a manufacturer's key 1112 programmed into the system. In some examples, they may be accessed from a chain history 912 or blockchain instead of, or in addition to, the image repository 1104. The images in the image repository 1104 may have been stored by other, similar, IoT devices 1110 such that a reference count can be maintained. Since each device may sign their blockchain transaction that records boot integrity reports, the reference count can distinguish between re-boot activity from the same device vs. activity from different devices.

Measurements are taken as the IoT device 1102 boots, for example, by calculating a hash code of the next software to be run in the boot sequence. The measurements may be compared to whitelist values, for example, in the whitelist image 1106 to ensure integrity. An image manifest 1114 may be used to validate origination of the whitelist value. The manifest 1114 may include white list hash values that can be compared with a dynamically obtained hash of the image 1106.

Construction of whitelists in IoT networks is challenging because of the rate at which the population of images changes, for example, as the image repository 1104 grows, the greater the likelihood that devices in a deployment depend on the repository for finding reference images selected for inclusion in a whitelist. Unless there is a data de-duplication function and a trusted delete function in the network, the number of images monotonically increases because there may be an IoT device referencing the image in the repository. The blockchain history is a way to inform the Image Repository regarding the popularity of devices referencing its images. Devices that are no longer in service would not show up in the history 912 hence would not be reference counted by the image repository. The image repository 1104 may maintain a "heat map" revealing the devices that perform boot integrity checking. A strategy obsoleting older devices no longer in deployment may be to remove their image 1106 from the image repository 1104, and block whitelist referencing. This approach may be tuned to select a rate of decommissioning that correlates to a rate of growth that new images are created.

Figure 12:
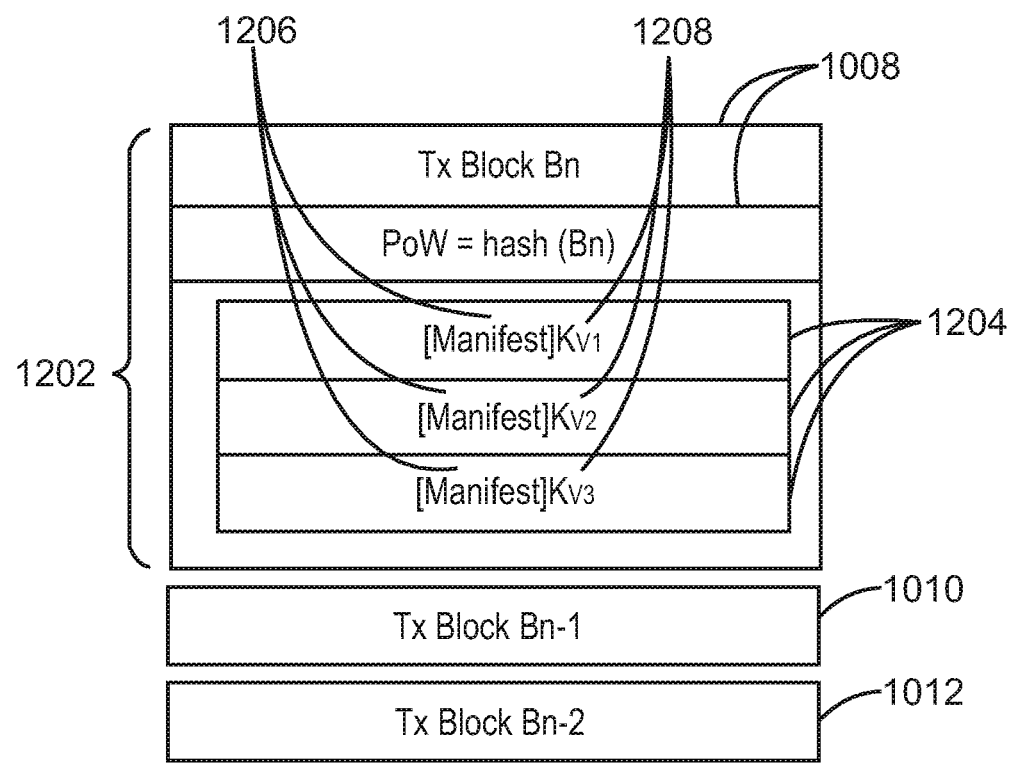
FIG. 12 is a drawing of a blockchain block with integrity transactions for whitelist images in accordance with some embodiments.

FIG. 12 is a drawing of a blockchain block 1202 with integrity transactions for whitelist images in accordance with some embodiments. To implement the blockchain block, vendors, makers and code generation factories may incorporate blockchain capabilities in their production process. Each whitelist image may be signed using a manifest structure 1204 that includes the manifest 1206. The developer or factory generating the image may sign it using a manufacturer's key 1208, which may be an EPID key, to establish which entity manufactured the image. Signed manifests 1204 are added to the blockchain block 1202 and committed to the chain history 912 (FIG. 9) of the blockchain using an appropriate transaction key, as described herein.

Figure 13:
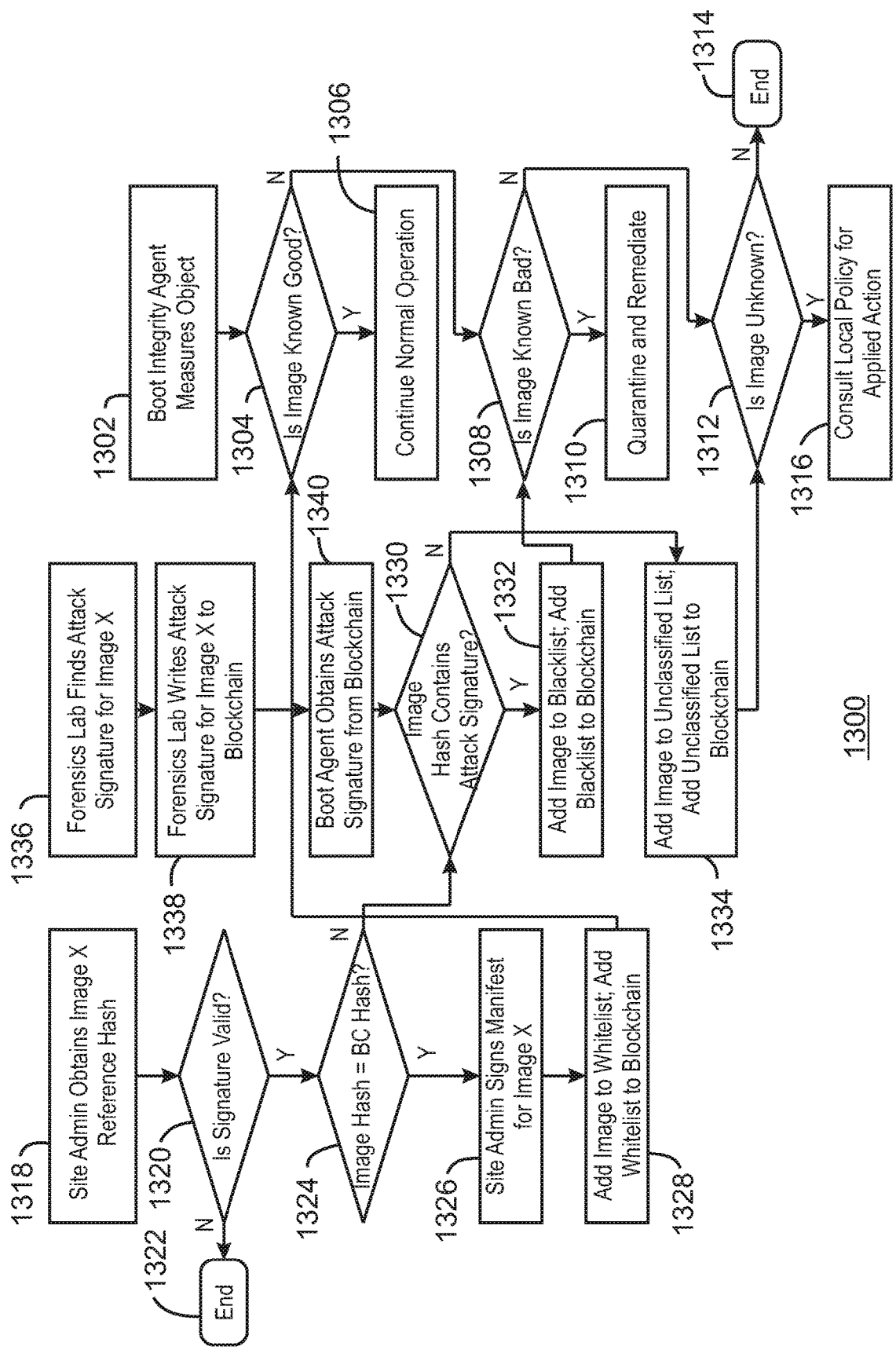
FIG. 13 is a process flow diagram of an example method for a secure boot process flow using blockchain roots-of-trust in accordance with some embodiments.

FIG. 13 is a process flow diagram of an example method 1300 for a secure boot process flow using blockchain roots-of-trust in accordance with some embodiments. The method 1300 of FIG. 13 may be implemented by the IoT device 1400 described with respect to FIG. 14. The block 1302 represents, for example, when a boot integrity agent measures an object. As discussed herein, this may be performed by calculating a hash code of the next code to be booted, creating an image of the code. At block 1304, a determination is made as to whether the image is known to be good. If so, the method 1300 ends at block 1306 when the IoT device continues normal operations. If not, at block 1308, a determination is made as to whether the image is known to be bad. If so, the method 1300 ends at block 1310 with the quarantine of the code and remediation of the issue.

If the image is not known to be bad at block 1308, process flow proceeds to block 1312, where a determination is made as to whether the image is unknown. If not, the method 1300 may end at block 1314, for example, with the status being listed as not trusted. If so, the method 1300 may end at block 1316 where a local policy is consulted to determine the action to be applied.

To obtain an image for use in the comparison at block 1304, at block 1318, a site administrator may obtain a reference hash, for example, from a cloud repository. The hash may be obtained from other sources, including other IoT devices, manufacturers, and the like. At block 1322, a determination is made as to whether the signature on the hash is valid. If not, the method 1300 ends at block 1322. At block 1324, a determination is made as to whether the image hash is equal to the blockchain (BC) hash. If so, at block 1326, the site administrator signs the manifest for the image. At block 1328, the image is added to the whitelist and the whitelist is committed to the blockchain for access by the boot code. The whitelist image may then be used in the comparison at block 1304, for example, by an IoT device accessing the whitelist in the blockchain or in an image repository.

If the image hash does not match the BC hash at block 1324, at block 1330, a determination is made as to whether the image hash contains an attack signature. If so, at block 1332, the image may be added to a blacklist, and the blacklist may be committed to the blockchain. The blacklist image may then be used in the comparison at block 1308, for example, by an IoT device accessing the blacklist in the blockchain or in an image repository.

If at block 1330, the image hash does not match a known attack signature, at block 1334, the image may be added to an unclassified list. The unclassified list may then be added to the blockchain. The unclassified image may then be used in the comparison at block 1312, for example, by an IoT device accessing the unclassified list in the blockchain or in an image repository.

The attack signatures can be identified by any number of techniques. For example, at block 1336, a forensics lab may identify the attack and generate the attack signature for the image. As used herein, a forensics lab may be a commercial security service that identifies malware, viruses, and other problematic code in circulation. At block 1338, the forensics lab may write the attack signature for the image to the blockchain. In some examples, the site administrator may obtain the attack signature from a commercial forensics lab, and write the attack signature to the blockchain. At block 1340, the attack signature may be obtained from the blockchain for use at block 1330.

As described herein, the secure boot process may be extended to include using a blockchain to obtain and validate reference measurements, formulate a whitelist, blacklist, or an unclassified list that may be used to evaluate local measurements. Secure boot enforcement occurs normally. Thus, the blockchain may provide information for enforcement points for network quarantine, which may place firewall restrictions on the flow of packets to or from devices when a known bad or unknown configuration is found. Further, the blockchain may inform software update servers that may seek to obtain reference measurements from a reliable source.

Figure 14:
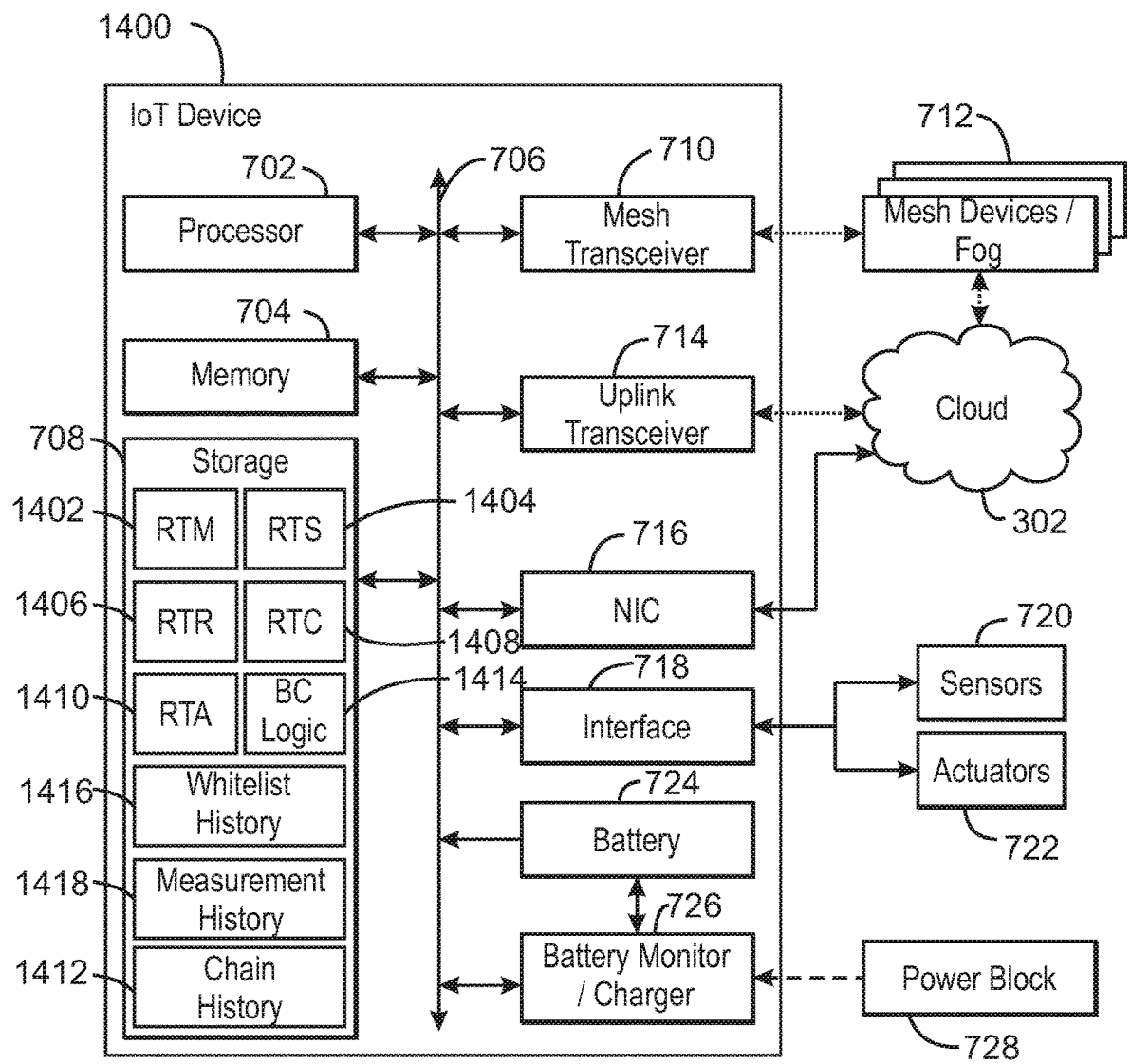
FIG. 14 is a block diagram of an example of components that may be present in an IoT device for creating coalition groups in accordance with some embodiments.

FIG. 14 is a block diagram of an example of components that may be present in an IoT device 1400 for secure booting in accordance with some embodiments. Like numbered items are as described with respect to FIGS. 3 and 7. It can be noted that different components may be selected and used for the IoT device 1400 than for those selected for the IoT device 700 discussed with respect to FIG. 7, and other IoT devices discussed herein.

The mass storage 708 may include a number of modules to implement the coalition group formation described herein. Although shown as code blocks in the mass storage 708, it may be understood that any of the modules may be fully or partially replaced with hardwired circuits, for example, built into an application specific integrated circuit (ASIC).

The mass storage 708 may include a root-of-trust measurer (RTM) 1402 that measures and may verify the first loadable object in a system. A root-of-trust storage manager (RTS) 1404 may store values produced and consumed by other security systems, such as the RTM 1402 and a root-of-trust reporter (RTR) 1406. The RTR 1406 may attests to values in the root of trust for storage (RTS) 908 and to the environment that implements the RTM 904, RTR 906, and RTS 908. A root of trust archiver (RTA) 1410 may add archival capability to RTC nodes that may not have the capabilities to maintain a full chain history 1412.

Various historical databases may be maintained in the IoT device 1400, or may be accessed on other mesh devices 712. For example, blockchain logic 1414 may maintain a chain history 1412 that includes the blocks of the blockchain. Further, the blockchain logic 1414 may push changes to other mesh devices 712, or accept and validate changes made in the blockchain by other mesh devices 712. A whitelist history 1416 may hold the whitelist, and changes made to the whitelist items, for example, before the changes are committed to the chain history 1412. Further, the whitelist history 1416 may hold other lists and changes, such as the blacklist, and the unclassified list. A measurement history 1418 may hold current and past measurements made during the boot process, for example, for comparison to the images.

Figure 15:
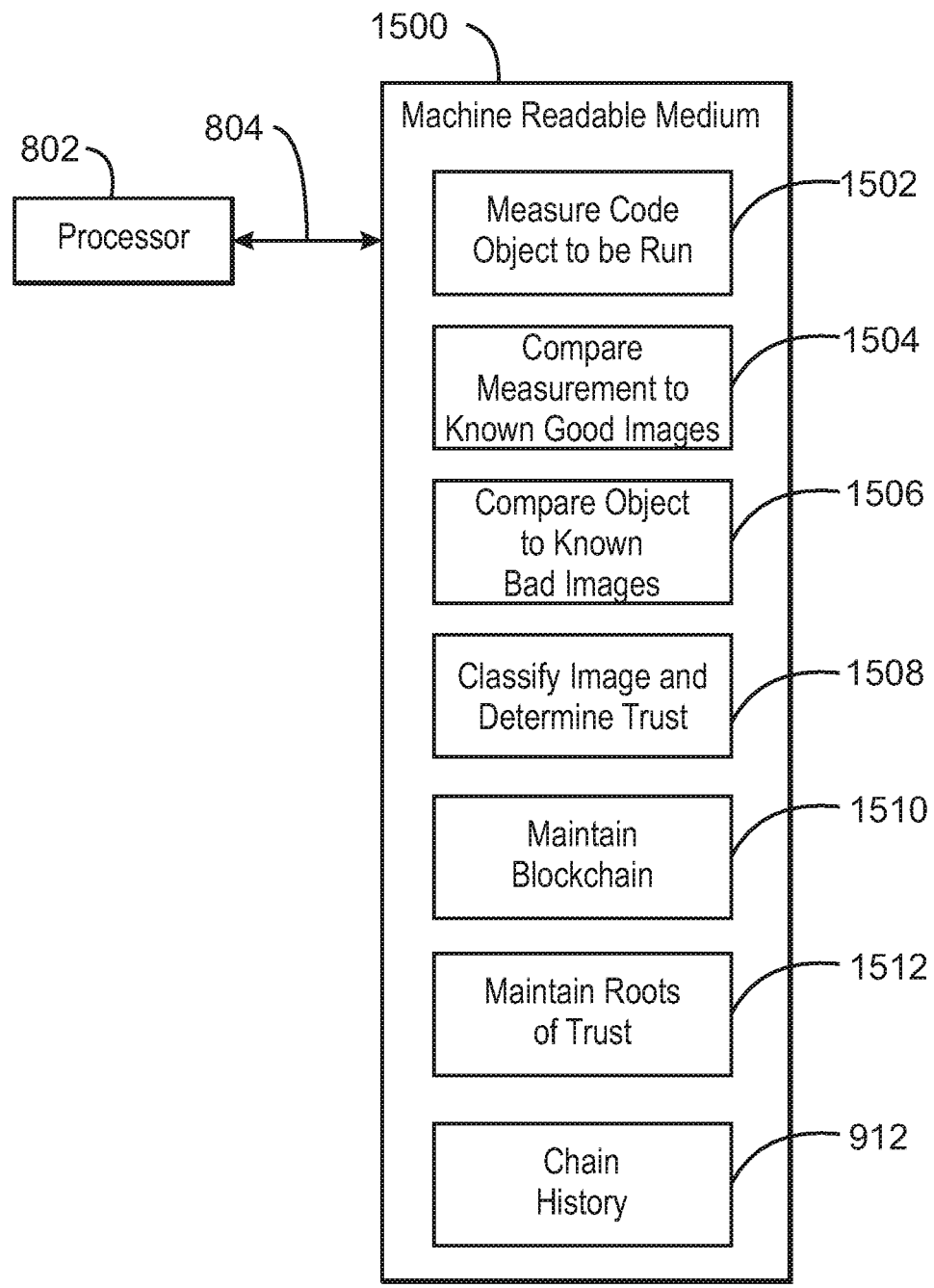
FIG. 15 is a block diagram of a non-transitory, machine readable medium including code to direct a processor to securely communicate in groups in accordance with some embodiments.

FIG. 15 is a block diagram of an exemplary non-transitory, machine readable medium 1500 including code to direct a processor 802 to securely boot in accordance with some embodiments. The processor 802 may access the non-transitory, machine readable medium 1500 over a bus 804. The processor 802 and bus 804 may be selected as described with respect to the processor 702 and bus 706 of FIG. 7. The non-transitory, machine readable medium 1500 may include devices described for the mass storage 708 of FIG. 7 or may include optical disks, thumb drives, or any number of other hardware devices.

The non-transitory, machine readable medium 1500 may include code 1502 to direct the processor 802 to measure a code object before running the code object. Code 1504 may be included to direct the processor 802 to compare the measurement to a list of know good images. Code 1506 may be included to direct the processor 802 to compare the object to a list of known bad images. Code 1508 may be included to direct the processor 802 to classify the image and determine a trust level, for example, allowing the processor to boot into a trusted execution environment, allowing the processor to boot into an untrusted environment, or blocking a boot and alerting a site administrator. Code 1510 may be included to direct the processor 802 to maintain a blockchain, for example, committing transaction to a chain history, forwarding transaction changes to other IoT devices, or validating changes from other IoT devices, among others. Code 1512 may be included to maintain roots-of-trust, for example, as described with respect to FIG. 9 for the RTM 904, the RTR 906, the RTS 908, the RTC 910, and the RTA 914. The machine readable medium 1500 may also store the blockchain, such as the chain history 912, described with respect to FIG. 9.

Figure 16:
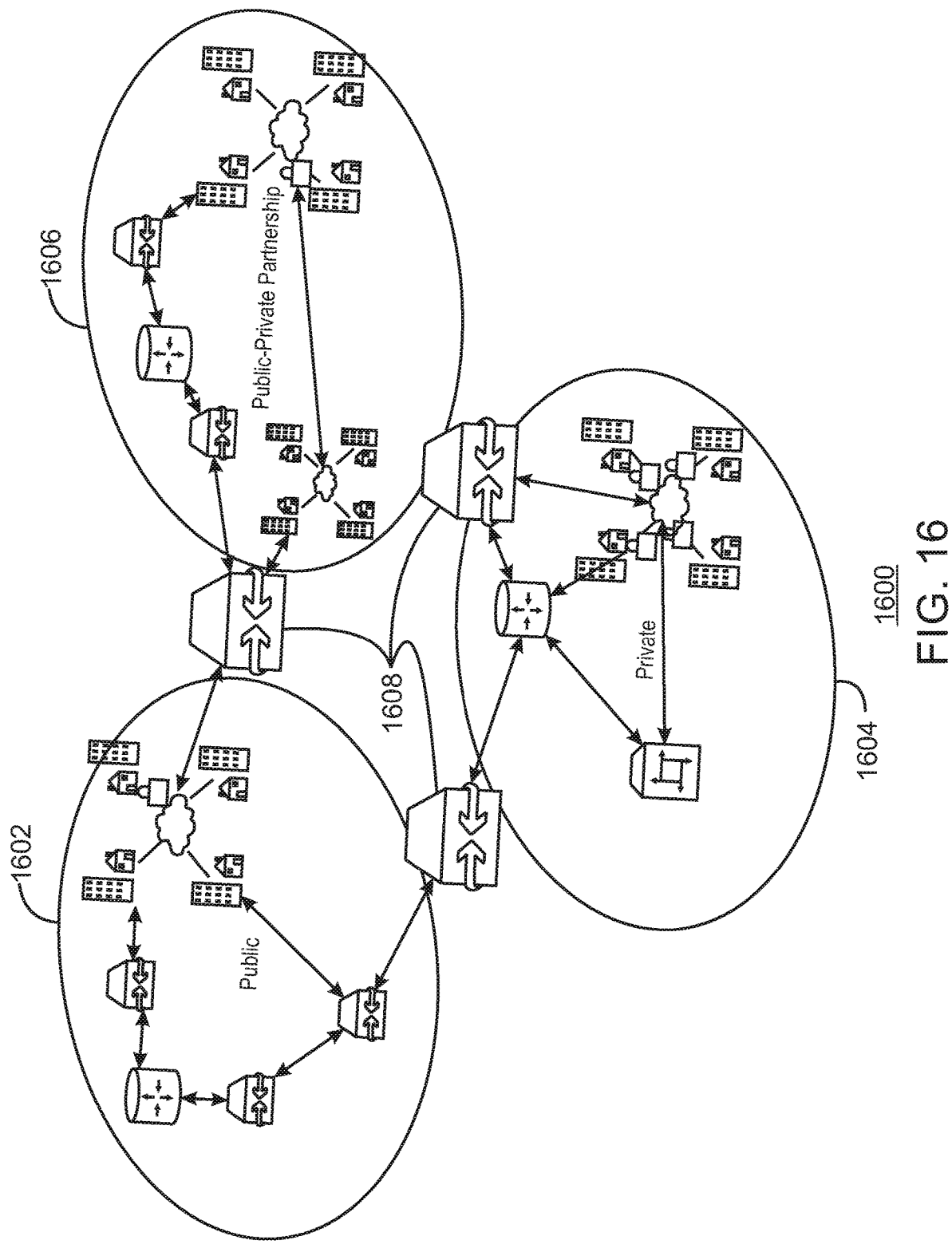
FIG. 16 is a schematic drawing illustrating interoperability across public domains, private domains, and public-private domains in accordance with some embodiments.

FIG. 16 is a schematic drawing 1602 illustrating interoperability across public domains 1602, private domains 1604, and public-private domains 1606 in accordance with some embodiments. The network topology may be in a continuous state of change, making any attempt at permanent maps impossible. Accordingly, IoT devices may use the backbone resources, such as domain name servers (DNS) to send packets between domains. The packets may be routed between the domains 1602, 1604, and 1606 through the Internet backbone, shown as routers 1608.

In some aspects, the routers 1608 provide the edge connections that couple the domains to one another. As described herein, any number of services may be provided at the edges of the domains 1602, 1604, and 1606 to enhance the interconnectivity. For example, interconnections between the public domain 1602 and the private domains 1604 may provide opportunities for micropayments for domain access, explicit permission and tracking for domain access, and the separation of public and private traffic, among others. Similarly, interconnections between the public domain 1602 and the public-private domain 1606 may provide opportunities for services such as time-based leases, resource marketplaces, and distributed identity servers, among others. Interconnections between the private domains 1604 and the public-private domains 1606 may provide opportunities for inline service interconnects, behavior based threat analysis, and proof-of-provenance, among others.

Figure 17:
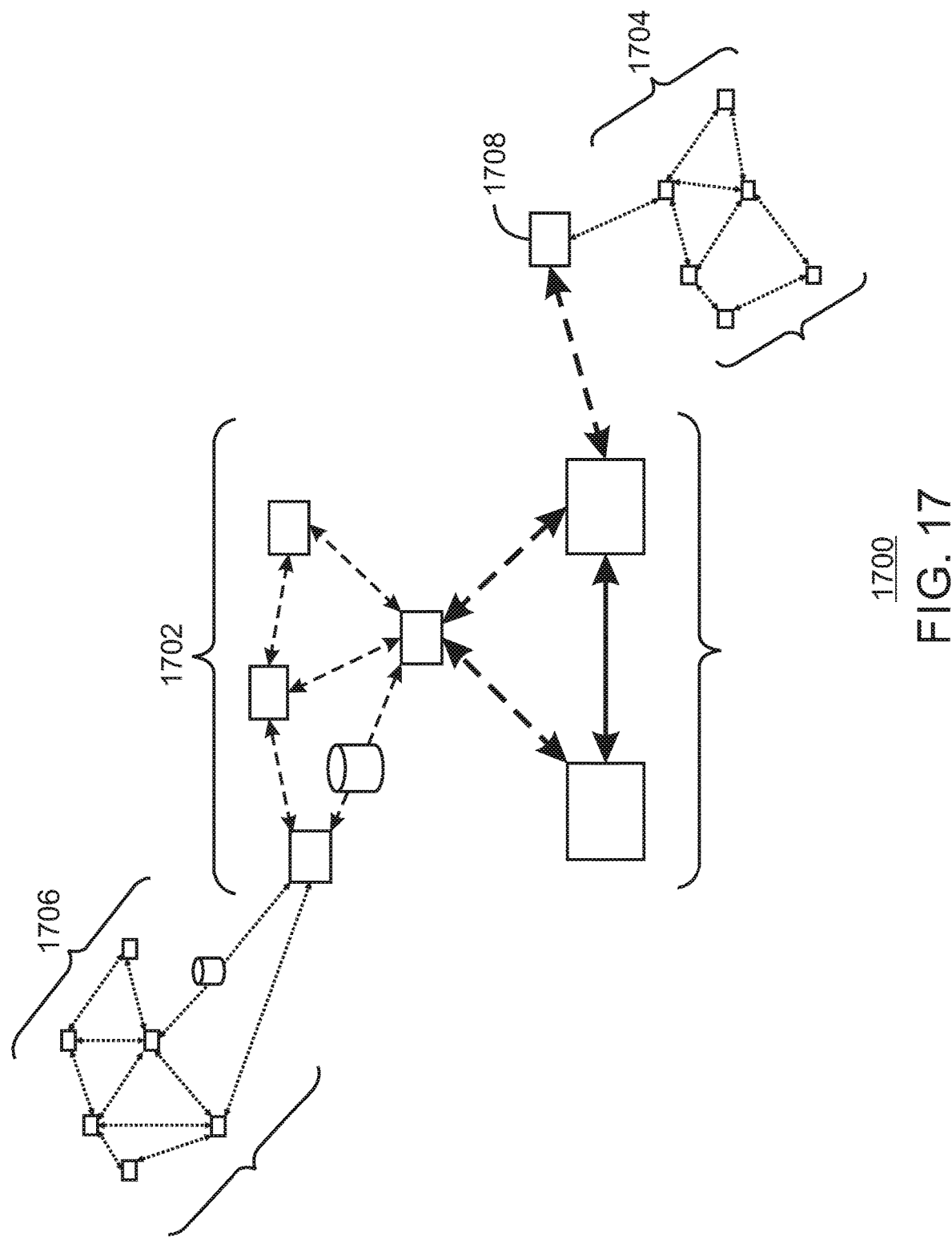
FIG. 17 is a schematic drawing of interoperability across a heterogeneous network of wired networks and wireless networks in accordance with some embodiments.

FIG. 17 is a schematic drawing of interoperability across a heterogeneous 1700 network of wired networks 1702 and wireless networks 1704 and 1706 in accordance with some embodiments. The wireless networks 1704 and 1706 may be communicatively coupled by devices in the wired network 1702. This provides opportunities for efficiency improvements in communications between devices in the wireless networks 1704 and 1706, as well as improvements in communications between devices in a wireless network 1704 or 1706 and a device in the wired network 1702. For example, edge device 1708 coupling a first wireless network 1704 to the wired network 1702 may provide a data to information transform to reduce the size of the payload. Further, the edge device 1708 may have a permissioning system that allows packets from the first wireless network 1704 to pass, while blocking unpermitted packets from transferring. The permissioning system may include systems to make micropayments to allow the information to move across the wired network 1702. As an example, the first wireless network 1704 may be a ground moisture sensor array on an agricultural site. The reporting frequency may depend on the rate of change, which may increase costs due to the need to purchase bandwidth to match the highest reporting rate. Thus, a micropayment system may lower costs by allowing transactions to paid for on an as-needed basis.

IoT networks may be considered a collection of devices forming a fog device. The individual devices may connect via a variety of network transport, session, and application layer communication paths. An owner of the IoT network, such as a user, organization, or group has a common interest and participation in the IoT network. The owner may determine that devices belong to an organization because the owner manages, legally owns, or orchestrates collaboration among the various devices.

A device may be onboarded into an IoT network so as to allow an owner to take ownership of the device, thereby registering it with the owner as an owned device. As used herein, onboarding indicates that activities to join a device, such as the exchange of join requests, and verification of identities, and the creation of device resources, have taken place. A device may in turn acknowledge ownership in the domain by recording the owner/domain information in device resources. A device may allow or have multiple owners. In some examples, the devices may exist in multiple domains, complicating the recognition of the devices by each other.

Figure 18:
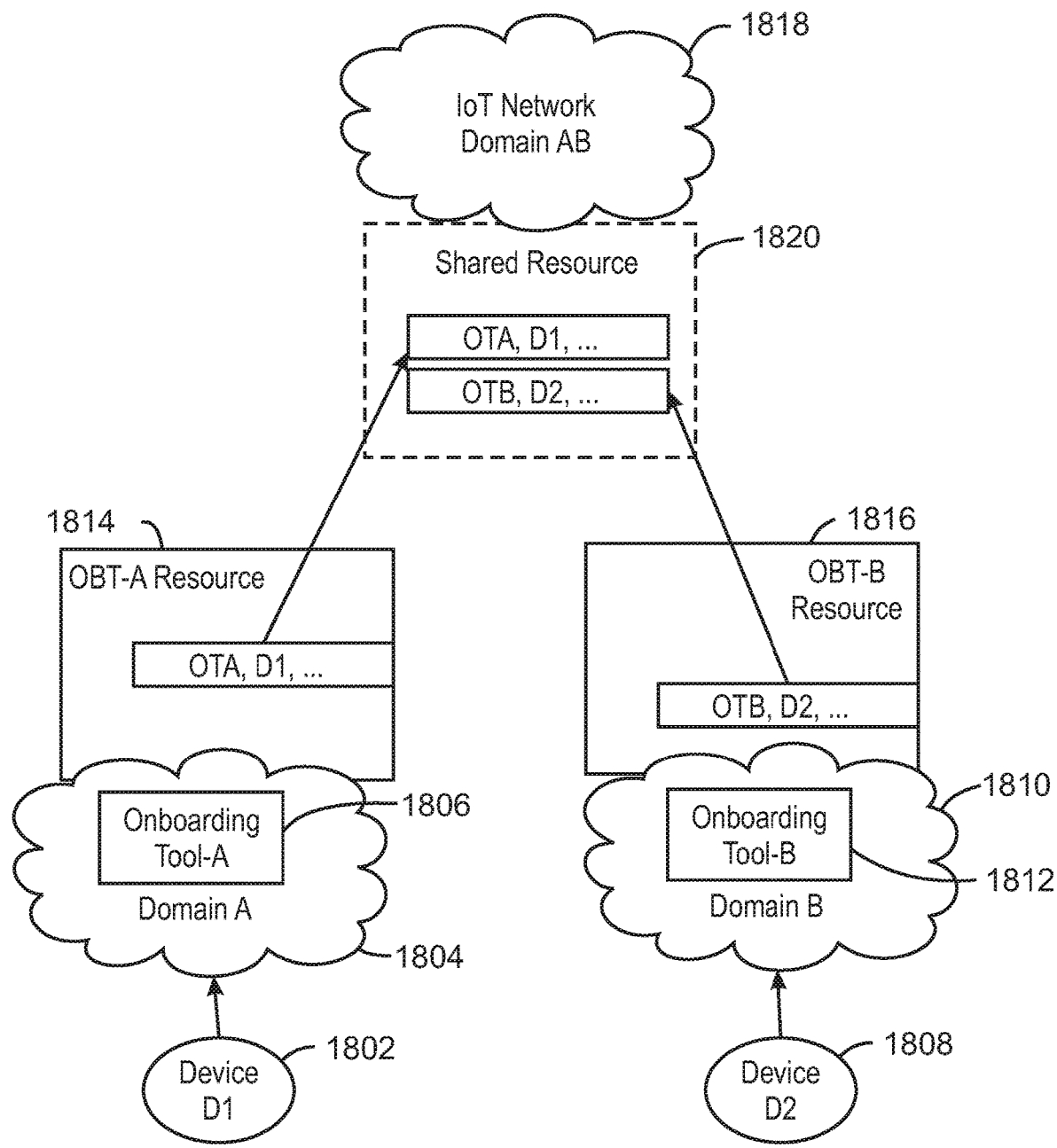
FIG. 18 is a schematic diagram of devices that are onboarded by different domains being incorporated by a shared domain created to allow the devices to participate as components of a new domain in accordance with some embodiments.

FIG. 18 is a schematic diagram 1800 of devices that are onboarded by different domains being incorporated by a shared domain created to allow the devices to participate as components of a new domain in accordance with some embodiments. In the schematic diagram 1800, a first device 1802 is onboarded into a first domain A 1804 by an onboarding tool (OBTA) 1806. A second device 1808 is onboarded into a second domain B 1810 by a second onboarding tool (OBTB) 1812. In this example, the devices 1802 and 1808 may regard themselves as members of domains A 1804 and B 1810 respectively.

Interactions between devices D1 1802 and D2 1808 may be permitted under the security levels, for example, if the domains are part of a family, but may not be permitted, in some cases, because the disparate OBTA 1806 and OBTB 1812 establish a division between the resources 1814 or 1816 in the networks. Thus, the OBTA 1806 for domain A 1804 may not recognize or trust a device onboarded in a foreign domain B 1810. This could be due to, for example, the respective onboarding tools not sharing a common resource 1814 or 1816 containing onboarded, and, therefore, trusted devices 1802 and 1808.

In the techniques described herein, when trust is established between the onboarding tools 1806 and 1812 in the respective domains 1804 and 1810, a new domain 1818 may be created that has a shared resource 1820. The shared resource 1820 may include information from resources 1814 or 1816 in the individual parent domains 1804 and 1810. This is discussed further with respect to FIG. 19.

Figure 19:
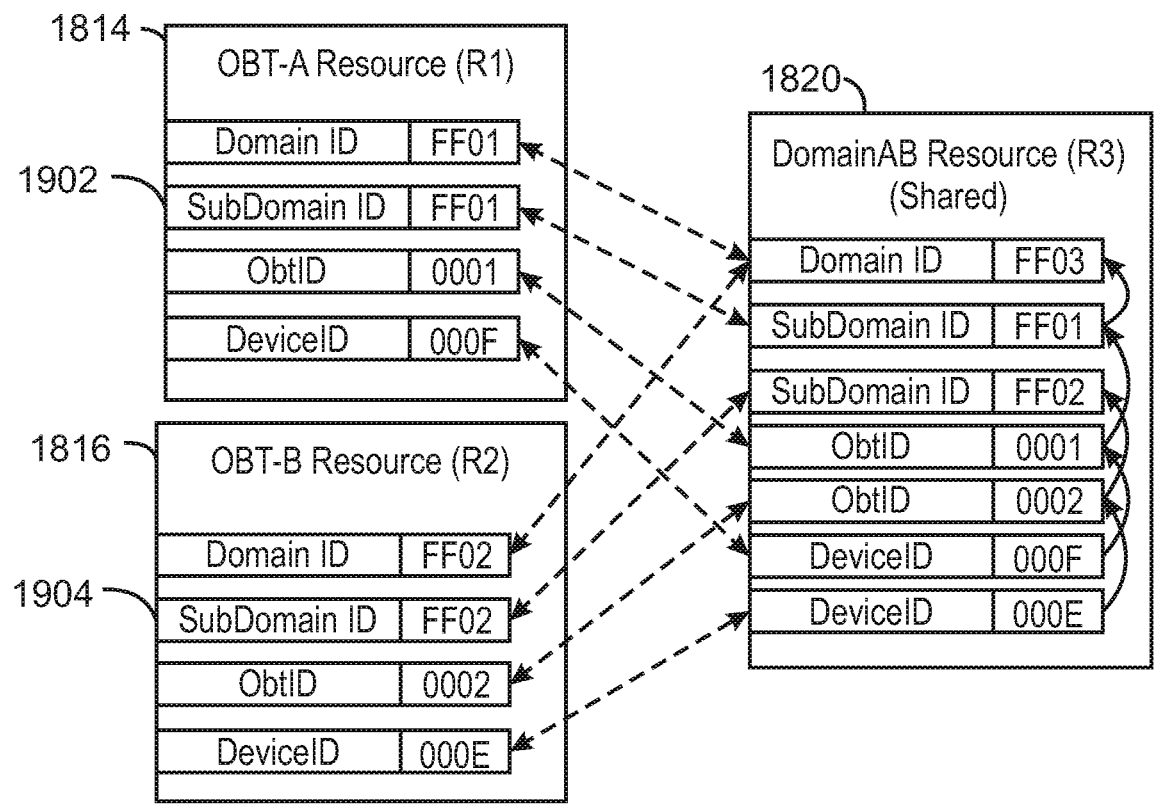
FIG. 19 is a schematic diagram of the creation of a shared resource to allow a device to participate across domains in accordance with some embodiments.

FIG. 19 is a schematic diagram 1900 of an exemplary creation of a shared resource to allow a device to participate across domains in accordance with some embodiments. Like numbered items are as described with respect to FIG. 18. As described in FIG. 18, discovering local onboarding resources R1 1812 and R2 1816 in another domain results in the creation of a shared resource, R3 1820, such that records contained in R1 1814 are stored in R3 1820, allowing access by the onboarding tool, OBTB 1812, in domain B 1810. Similarly, records contained in R2 1816 are stored in R3 1820, and may be accessed by the onboarding tool, OBTA 1814, in domain A 1804. Furthermore, the shared resource R3 1820 may resolve naming conflicts, for example, when a presumed domain name by OBTA 1806 is the same as a presumed domain name by OBTB 1812, among other conflicts.

The techniques find or create a new domain ID for the union of the domains 1804 and 1810, for example, a new UUID, such that the shared resource R3 1820 synchronizes a DomainID in a local resource R1 1814 and R2 1816. A subdomain ID 1902 in R1 1814 may differ from a subdomain ID 1904 in R2 RP16 such that each subdomain respectively becomes a subdomain of the newly formed domain 1818. The shared resource R3 1820 synchronizes with the respective local resources, R1 1814 and R2 1816, to populate the merged resource showing the multiple subdomain IDs.

The onboarding tools OBT-A 1806 and OBT-B 1812 similarly are synchronized with the shared resource 1820 establishing each as members of a common domain 1818. Similarly, devices D1 1802 and D2 1808 are synchronized with the shared resource 1820 establishing each as a member of the same common domain 1818 but may retain, respectively, membership in the respective sub-domain 1804 or 1810 that originally onboarded the device 1802 or 1808.

Figure 20:
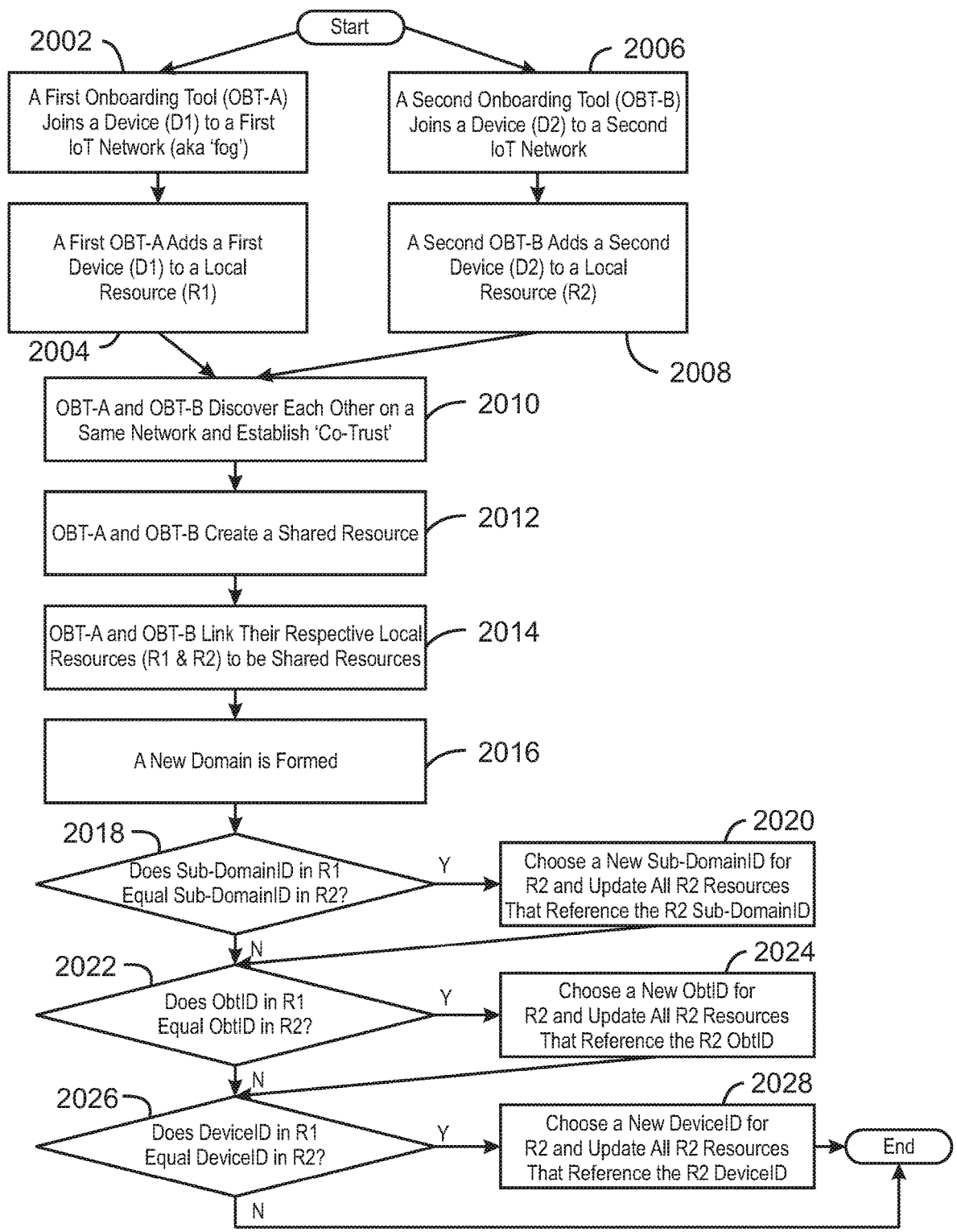
FIG. 20 is a process flow diagram of an example method for establishing a combined IoT domain including shared resources in accordance with some embodiments.

FIG. 20 is a process flow diagram of an exemplary method 2000 for establishing a combined IoT domain including shared resources in accordance with some embodiments. The method 2000 of FIG. 20 may be implemented by the IoT device 2100 described with respect to FIG. 21. As used herein, the shared resources may include virtualized resources, storage resources, communication resources, onboarding resources, service provider resources, and the like. The resources may exist at the domain level, the sub-domain level, or the device level. The block 2002 represents, for example, when a first onboarding tool joins a first device to a first network domain. At block 2004, the first onboarding tool adds the device to a local resource, for example, as a member or owned device.

At block 2006, a second onboarding tool adds a second device to a second network domain. At block 2008, the second onboarding tool adds the device a local resource, for example, as a member or owned device.

At block 2010, the onboarding tools discover each other on a network and establish trust between them. This may be performed by, for example, mutual attestation, individual pairing, through an administrative console, or by a blockchain, as described herein.

At block 2012, the onboarding tools create a shared resource, where they are shareholders in the resource. At block 2014, the onboarding tools link their respective resources to the shared resource. As a result, the resources of the first device are accessible to the second onboarding tool, and the resources of the second device are accessible to the first on-boarding tool. At block 2016, a new domain is formed that is based on the union of the two device domains. The Domain ID for the new domain is recorded in the shared resource.

At block 2018, a determination is made as to whether the subdomain ID in the first domain is the same as or similar to the subdomain ID in the second domain. If so, at block 2020 a new subdomain ID is chosen for the subdomain ID in the second resource, and all resources accessing that subdomain ID are updated with the new name.

At block 2022, a determination is made as to whether the OBT ID, or onboarding tool ID, in the first domain is equal to the OBT ID in the second domain. If so, at block 2024 a new OBT ID is chosen for the OBT ID in the second resource, and all resources accessing that OBT ID are updated with the new name.

At block 2026, a determination is made as to whether the device ID in the first domain is equal to the device ID in the second domain. If so, at block 2028 a new device ID is chosen for the device ID in the second resource, and all resources accessing that device ID are updated with the new name.

Although the method is shown for two devices and domains, any number of devices that need to be incorporated from overlapping domains may be used. For example, two domains with multiple devices may be joined by a shared domain created by onboarding tools in both domains. In another example, devices in three or more domains may be joined by a shared domain.

Figure 21:
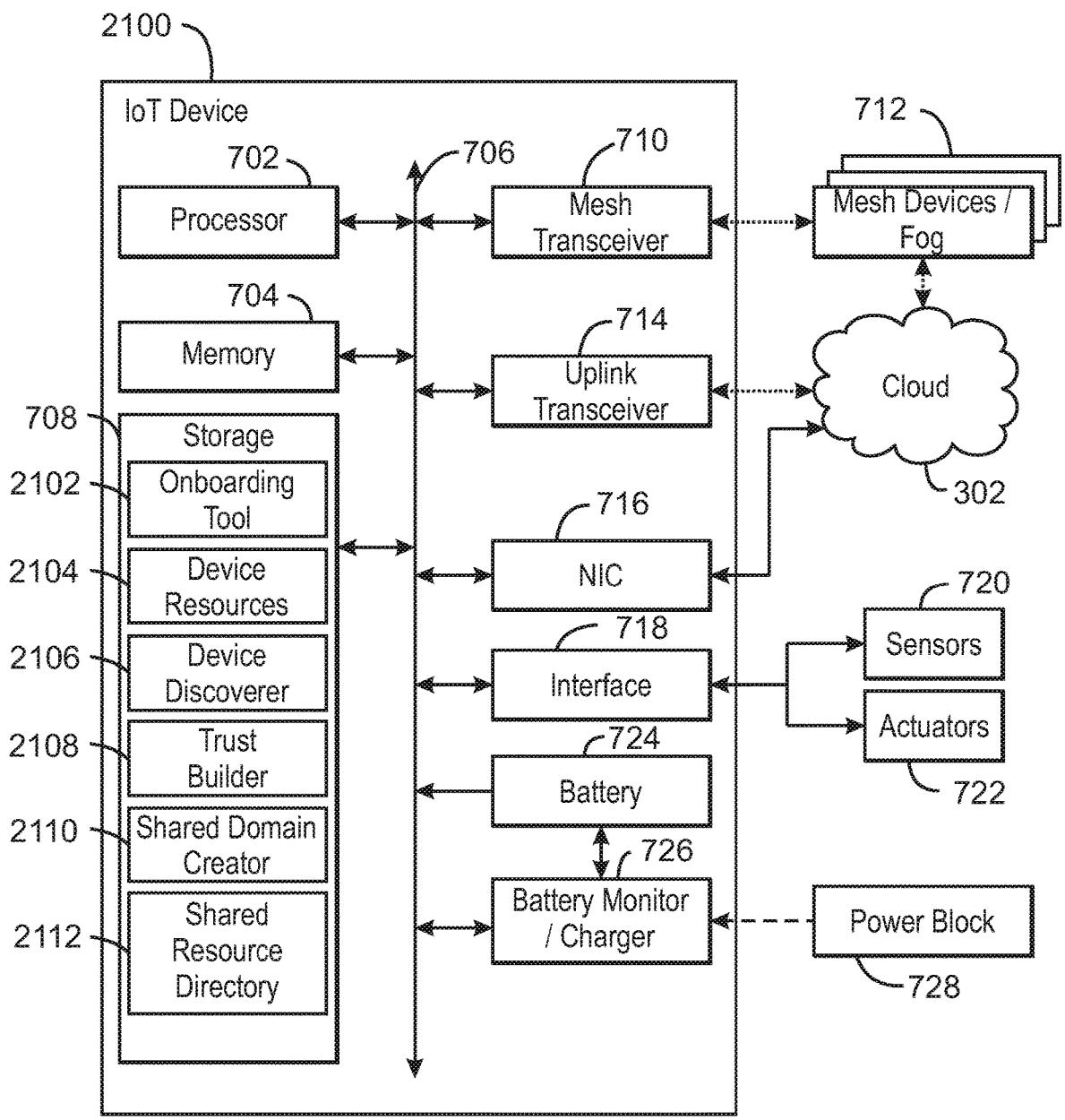
FIG. 21 is a block diagram of an example of components that may be present in an IoT device for creating shared resources in accordance with some embodiments.

FIG. 21 is a block diagram of an example of components that may be present in an IoT device 2100 for creating shared resources in accordance with some embodiments. Like numbered items are as described with respect to FIGS. 3 and 7. It can be noted that different components may be selected and used for the IoT device 2100 than for those selected for the IoT device 702 discussed with respect to FIG. 7, and other IoT devices discussed herein.

The mass storage 708 may include a number of modules to implement the cross domain sharing of resources described herein. Although shown as code blocks in the mass storage 708, it may be understood that any of the modules may be fully or partially replaced with hardwired circuits, for example, built into an application specific integrated circuit (ASIC).

The mass storage 708 may include an onboarding tool 2102 that joins devices to the domain of the IoT device 2100, and creates a store of device resources 2104 for the devices. A device discover 2106 may identify devices in other domains that may be used as part of a fog device with devices in the current domain. The device discoverer 2106 may use information provided by an orchestrator to discover other devices, as described herein. A trust builder 2108 may use various techniques to establish trust between the onboarding tool 2102, and an onboarding tool in another domain. The trust builder 2108 may exchange attestation information, identification keys, or may use an assigned trust certificate from an administrator workstation. In some examples, the trust builder 2108 may use a blockchain root-of-trust, as described herein.

A shared domain creator 2110 may work to assist the onboarding tool in working with onboarding tools from the other domains to create a shared domain. The shared domain may include a shared resource directory 2112 that is accessible to all of the onboarding tools across the different domains, or is mirrored in each of the IoT devices hosting onboarding tools.

Figure 22:
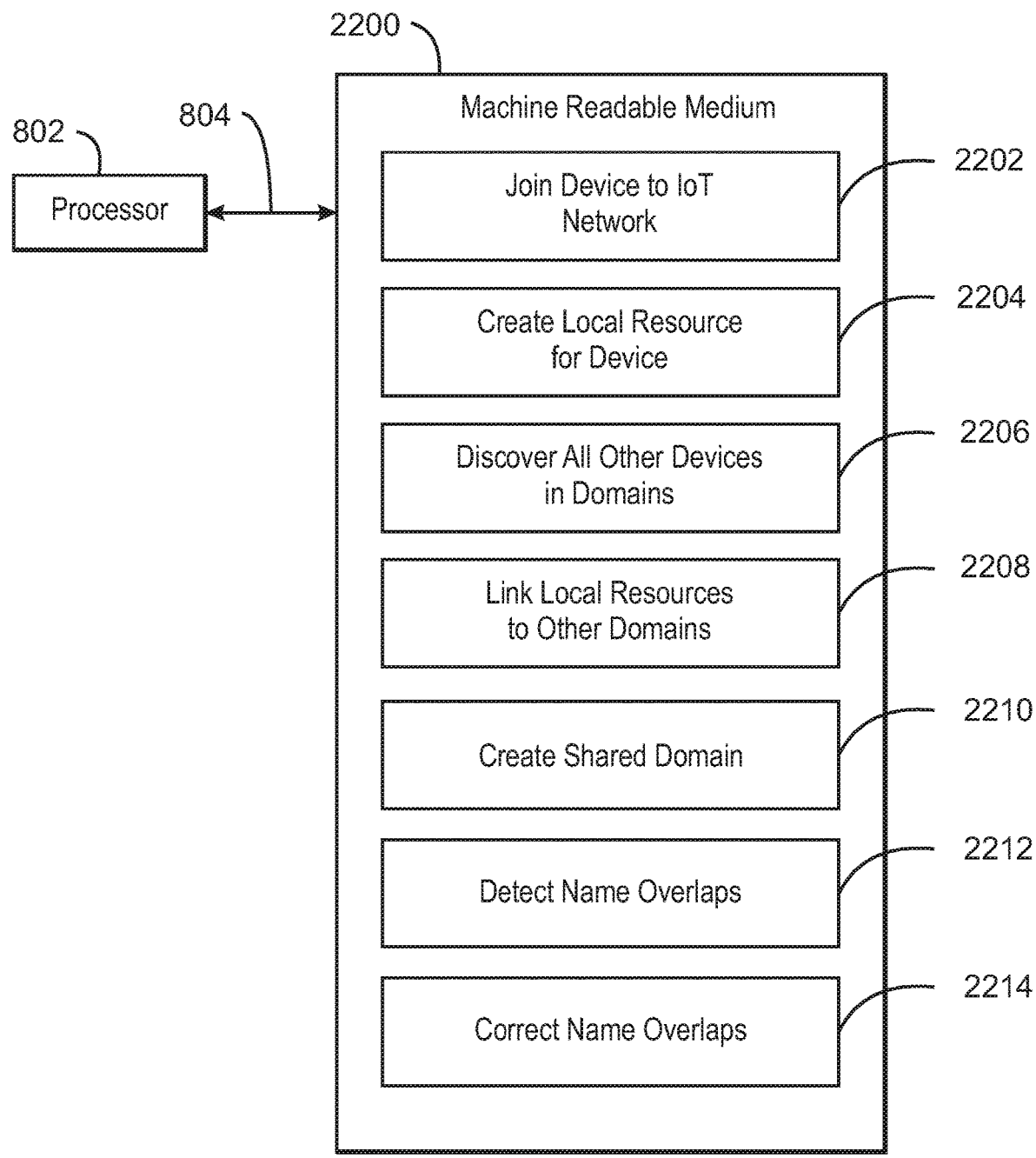
FIG. 22 is a block diagram of a non-transitory, machine readable medium including code to direct a processor to establish shared resources across domains in accordance with some embodiments.

FIG. 22 is a block diagram of a non-transitory, machine readable medium 2200 including code to direct a processor 802 to establish shared resources across domains in accordance with some embodiments. The processor 802 may access the non-transitory, machine readable medium 2200 over a bus 804. The processor 802 and bus 804 may be implemented in a manner similar to the processor 802 and bus 804 described with respect to FIG. 8. The non-transitory, machine readable medium 2200 may include devices described for the mass storage 708 of FIG. 7 or may include optical disks, thumb drives, or any number of other hardware devices.

The non-transitory, machine readable medium 2200 may include code 2202 to direct the processor 802 to join a device to a domain. Code 2204 may be included to direct the processor 802 to create local resources for the device in the domain. Code 2206 may be included to direct the processor 802 to discover relevant devices in other domains, including, for example, onboarding tools in those domains. Code 2208 may be included to direct the processor 802 to link resources for local devices to resources in other domains. Code 2210 may be included to direct the processor 802 to create a shared domain that holds the shared resources for all of the devices. Code 2212 may be included to direct the processor 802 to determine if there are any name, or ID, overlaps between domains, onboarding tools, and devices. Code 2214 may be included to direct the processor 802 to correct the name overlaps by renaming domains, onboarding tools, or devices that were last to join, and propagating the new names to all relevant resources.

The networking communication and authentication systems described above provide a number of aspects for implementing IoT networks for particular applications. In one example, a distributed network may be used to implement traceability of end products, such as food stuffs, pharmaceuticals, or industrial product.

For any lifecycle tracing system, there is the question of how the players in the system will establish trust that the system is behaving according to an expected behavior model versus something that is outside the model. The challenge is that the entity that defines good behavior may not be trustworthy. To that end, provincial trust, e.g. device-to-device, and institutional trust mechanisms, e.g., controlled by central authorities, have weaknesses. However, infrastructural trust may be a more reliable form of trust enforcement and that blockchain is a technology for implementing infrastructural trust. Therefore, the incorporation of devices in other domains, as described with respect to FIG. 18 may allow the formation of devices from groups of IoT devices, and the establishment of trust between those devices. This may be performed using various systems to establish trust, such as the blockchain roots-of-trust discussed with respect to FIG. 5.

In cases where a 'record key' is used, a method is provided for establishing trust properties of the record key. As the use of IoT to develop a traceability system that touches many industries, including new industries that have not yet been established, the framework, such as the blockchain trust described herein, may be useful for developing trust in the traceability system.

Policies are defined as a set of rules to manage and control access to network resources. A policy may include a set of events, conditions, actions, subjects and targets. A policy aggregates the events, conditions, actions, subjects and targets into a policy structure that directs a device or network to respond to conditions that arise.

However, for IoT mesh networks, such as in the different stages of the production process in the example above, the propagation of policies may need to be addressed. Further, the use of widely distributed IoT networks may increase the relevance of policies, such as policies to protect the security of data, to change the data collected, or to increase the accessibility of that data.

Figure 23:
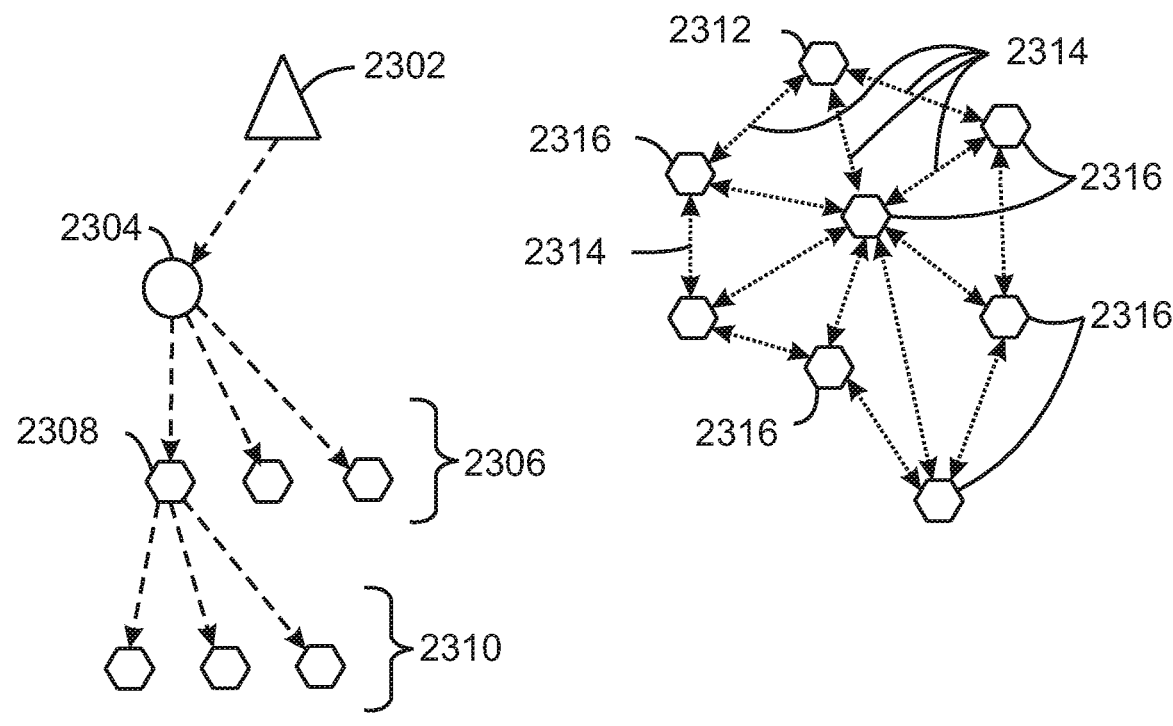
FIG. 23(A) is a schematic drawing of the hierarchical policy management system used in many current computer networks in accordance with some embodiments.
FIG. 23(B) is a schematic drawing of policy management in a peer-to-peer (P2P) network, such as an IoT mesh network in accordance with some embodiments.

FIG. 23(A) is a schematic drawing of a hierarchical policy management system 2300 used in computer networks in accordance with some embodiments. An approach for the real time management of device policies is a hierarchical broadcast architecture. This may be replaced with a publication-subscription model based on bloom filters, as described herein. The typical flow is from a central system, such as a centralized cloud server 2302, which propagates policies to subunits, such as a gateway 2304. The gateway 2304 may then propagate the policy to a lower level 2306, including IoT endpoint devices 2606. One of the IoT endpoint devices 2308 may then propagate the policies to a lower level 2310, for example, to sensor devices or other units.

In the hierarchical policy management system 2300, the individual devices are directly addressable. By its nature the deployment of policies in this architecture may require the administrator to explicitly know the address of all the targeted nodes and how to replace defective nodes, or policies. In addition, devices may often store a limited number of policies in the local memory due to resource constraints and replace the policies when additional policies are implemented.

As described herein, a distributed policy-based management framework may be implemented to store, locate, access, and execute policies in a network. This framework may use a peer-to-peer (P2P) policy storage and deployment mechanism to utilize available memory, for example, in the IoT mesh network. This may result in a policy system that helps with respect to node failure, and single points of failure.

FIG. 23(B) is a schematic drawing of policy management in a peer-to-peer (P2P) network, such as an IoT mesh network in accordance with some embodiments. In the P2P network, a coordinator 2312, such as a gateway, distributes policies 2314 to neighbors, such as coupled nodes 2316, which may be the nearest neighbors. These neighbors may then pass the policy along to other coupled nodes 2316.

As the IoT mesh network scales and becomes heterogeneous in nature, large numbers of policies may need to be defined and continuously amended to help ensure the IoT mesh network satisfies operational objectives. Autonomic network management, such as distributed policy management, may automate and distribute the decision making processes involved in optimizing network operations. This may enable administrators to focus less on low-level device configuration processes. Incorporating policies into an autonomic management system may involve methods and algorithms for policy translation, code generation, conflict analysis and policy enforcement.

Figure 24:
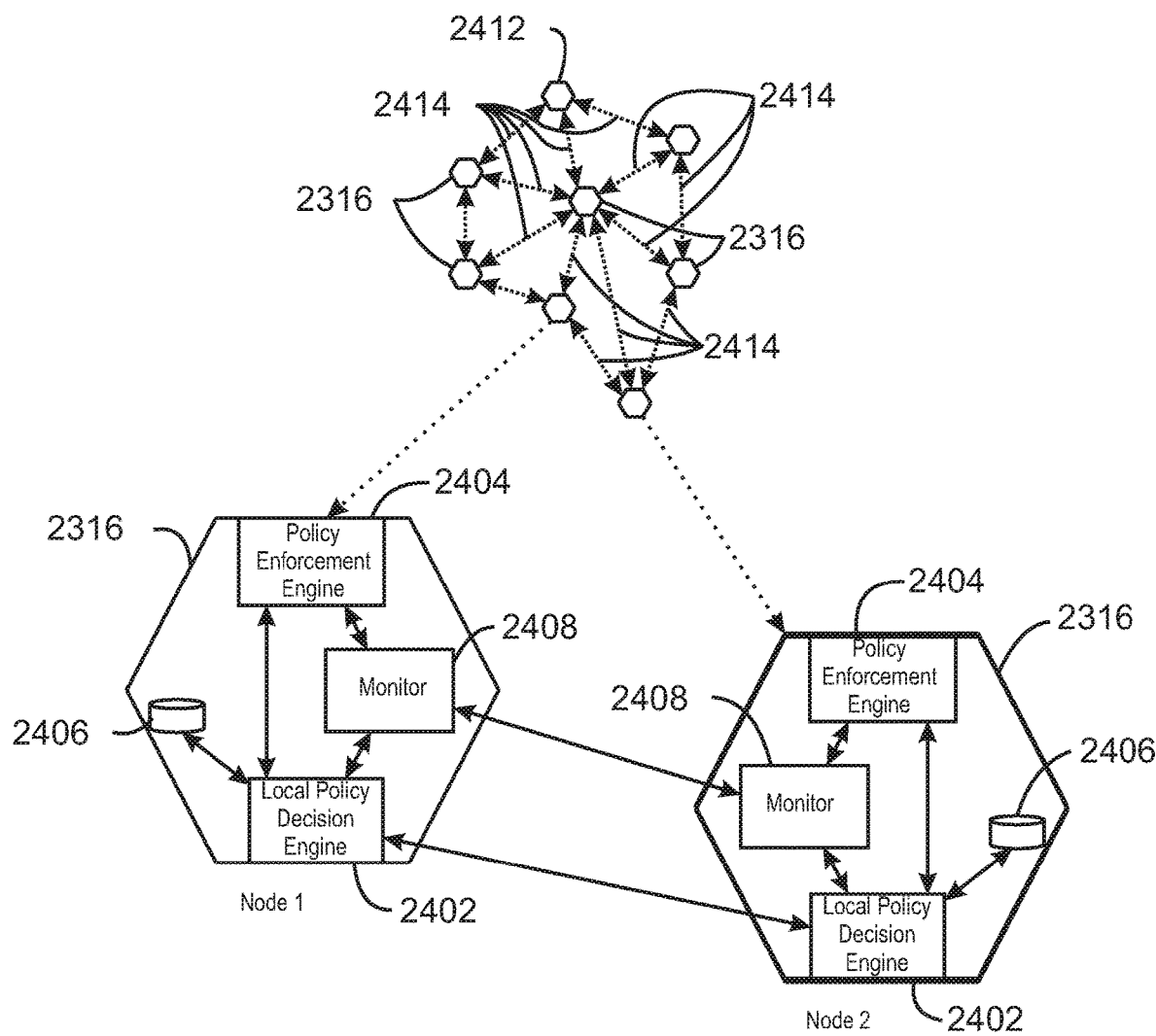
FIG. 24 is a schematic diagram of systems in nodes to implement a distributed policy management system in accordance with some embodiments.

FIG. 24 is a schematic diagram of systems in nodes 2316 to implement a distributed policy management system 2400 in accordance with some embodiments. Like numbered items are as discussed with respect to FIG. 23. Each of the nodes 2316 may implement a policy decision engine 2402, a policy enforcement engine 2404, a policy repository 2406, and a monitor 2408. The policy repository 2406 stores the policies for the node 2316, which may not require a high storage capacity. The policy decision engine 2402 makes decisions on which policies are going to be enforced that are passed to the policy enforcement engine 2404. The decisions may be based on the policies stored in the policy repository 2406 as well as on state information reported by the monitor 2408. The policy decision engine 2402 interacts with other nodes 2316 in order to distribute policies to non-configured nodes. In a non-configured node, the policy decision engine 2402 may communicate with other nodes 2316 to access policies.

The policy enforcement engine 2404 implements policy decisions provided by the local policy decision engine 2402. The local policy enforcement engine 2404 also collects information about its state, network traffic, transmission errors and information reported to it from the monitor 2408.

The monitor 2408 interfaces to the local policy enforcement engine 2404 and to monitors 2408 in other nodes 2316. The monitor 2408 collects information at specific intervals and stores it in a database, for example in the local policy repository 2406. Examples of information that may be collected by the monitor 2408 include current device configuration, capabilities and functions supported by each node. Other information that can be collected by the monitor 2408 includes information about the services which are being offered, node requirements for the network, resource availability estimation, triggered events, and the like.

Figure 25:
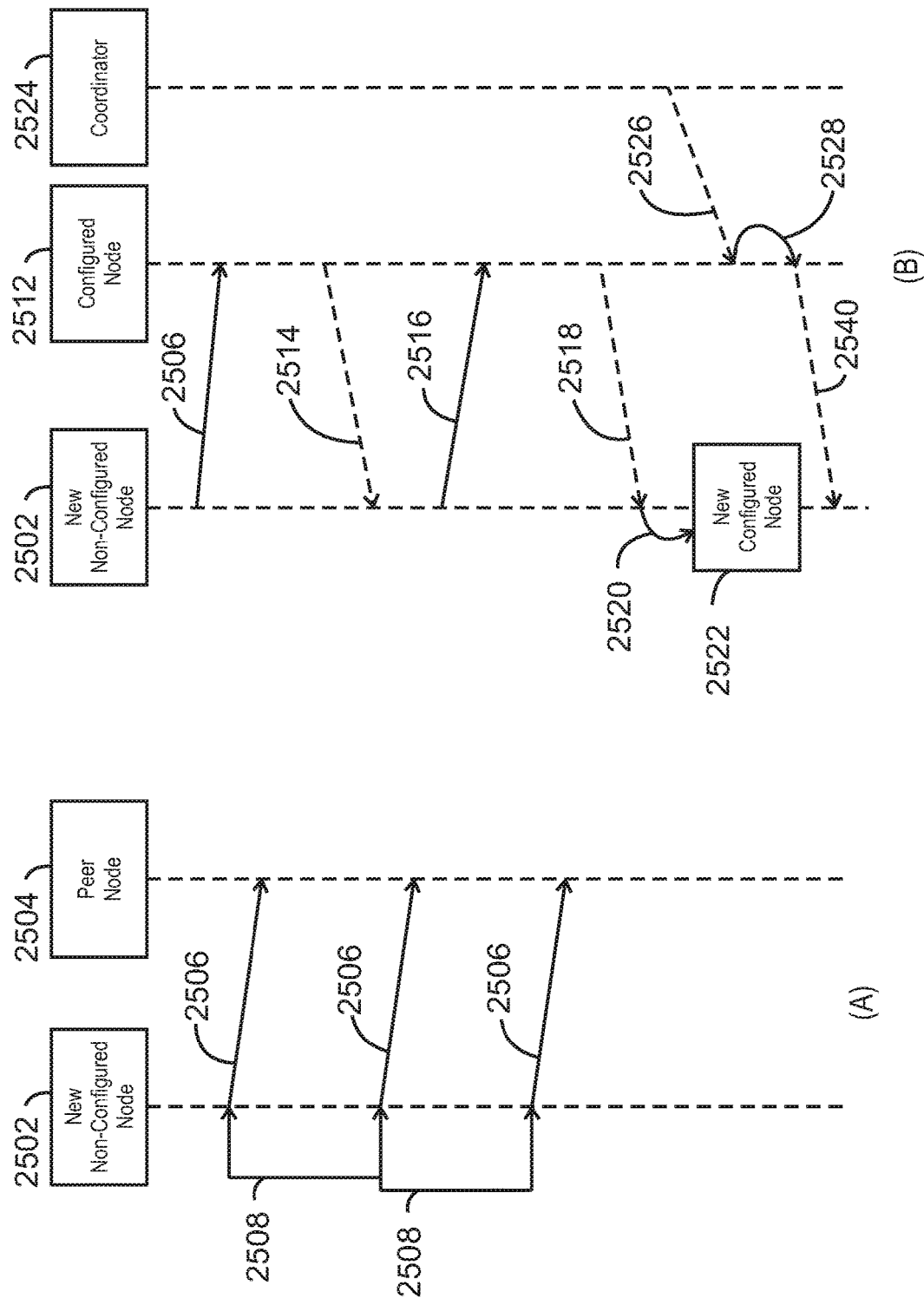
FIG. 25(A) is a ladder diagram of an example method of a new non-configured node attempting to discover policies on a network, for example, from a peer node in accordance with some embodiments.
FIG. 25(B) is a ladder diagram of an example method of a new non-configured node discovering policies from a configured node in accordance with some embodiments.

FIG. 25(A) is a ladder diagram of an example method 2500 of a new non-configured node 2502 attempting to discover policies on a network, for example, from a peer node 2504 in accordance with some embodiments. The method 2500 of FIG. 25(A) may be implemented by the IoT device 2800 described with respect to FIG. 28. When the new non-configured node 2502 joins the network it initiates a policy discovery action. It may broadcast a discover message 2506 to a peer node 2504 and wait until a discover timeout timer 2508 expires. If it does not receive any response, it re-sends the discover message 2506.

The roles of a coordinating node, configured nodes and new non-configured nodes may be modeled using a pub-sub notification system using bloom filters, as described herein. In this example, a bloom filter 'router' node may serve as a coordinator node to help ensure that new non-configured nodes can find existing configured nodes. Existing configured nodes are publishers of the policy objects they currently implement. New non-configured nodes may subscribe to the policy objects of the configured nodes. Changes or updates to configured nodes' policy objects may generate a cascade of notification traffic that may permeate the network.

FIG. 25(B) is a ladder diagram of an example method 2510 of a new non-configured node 2502 discovering policies from a configured node 2512 in accordance with some embodiments. The method 2510 of FIG. 25(B) may be implemented by the IoT device 2800 described with respect to FIG. 28. The configured node 2512 has a high level policy that satisfies an objective of the network. In one example, the high level policy may include how devices in the network are to handle communications to balance quality of service with power reserve. Any number of other policies may be implemented. The new non-configured node 2502 sends a discover message 2506 to the configured node 2512. The configured node 2512 responds with an offer message 2514.

Upon receiving the offer message 2514, the non-configured node 2502 checks the message. If the offer is accepted, it sends an accept message 2516 as a response. Otherwise, a reject message is sent back to the configured node 2512.

Upon receiving the accept message 2516, the configured node 2512 sends an InitPolicy message 2518 to the non-configured node 2502. The InitPolicy message 2518 incorporates the policies to be sent to the non-configured node 2502. The non-configured node 2502 processes the policy objects, installs the policies, and updates 2520 its state to a configured node 2522.

An updated policy may be dispatched, for example, from a coordinator 2524, in an update message 2526 that is received by a configured node 2512. The configured node 2512 may perform an update 2528 to the policy in force following validation and policy integrity checks.

The validation check may determine whether the policy conflicts with a current objective. For example, a policy directing all devices to conserve power may be dispatched to all the nodes in a network. As described herein, this may be described in terms of a pub-sub system, in which a power management policy is enumerated and subscribed to as the pub-sub "topic". For example, a policy direction that says to operate at power level 4 may be published to subscribers of the power management topic. An efficient bloom filter based message delivery system will help ensure subscribers of the power management topic will be notified of the policy change.

If the policy object implies a security or safety critical function then receipt of the topic notification message may be followed by opening a secure session to a policy decision point where the node may authenticate and establish end-to-end security credentials before acting on the notification. However, the nodes may already be actively implementing a policy which requires the devices to maintain a particular quality of service (QoS). The implementation of the power conserving policy could conflict with the QoS policy. Therefore, the new policy may be rejected.

If the policy does fail a validation check, the update may perform a partial replacement of the policy in force. A partial replacement may involve the calculation of a differential between the current policy in force and the updated policy. The partial update can potentially reduce the impact of a complete policy change by only modifying the affected policy parameters or conditions. This is discussed further with respect to FIG. 26.

The update message 2526 may also involve a concatenation of policies. This is especially applicable in distributed and dispersed network environments where a base level policy is augmented by additional policy rules received from neighboring nodes. This is discussed further with respect to FIG. 27.

If a configured node 2512 has updated or replaced a policy, a conflict alert message 2540 may be sent to another configured node 2522 to alert it to the policy conflict. Policy conflict analysis processes must be efficient and scalable to cope with the dynamic nature and size of such communications networks. A policy selection process for policy conflict analysis may maintain a history of previous policy comparisons in a tree based data structure to reduce the number of comparisons required in subsequent iterations.

Figure 26:
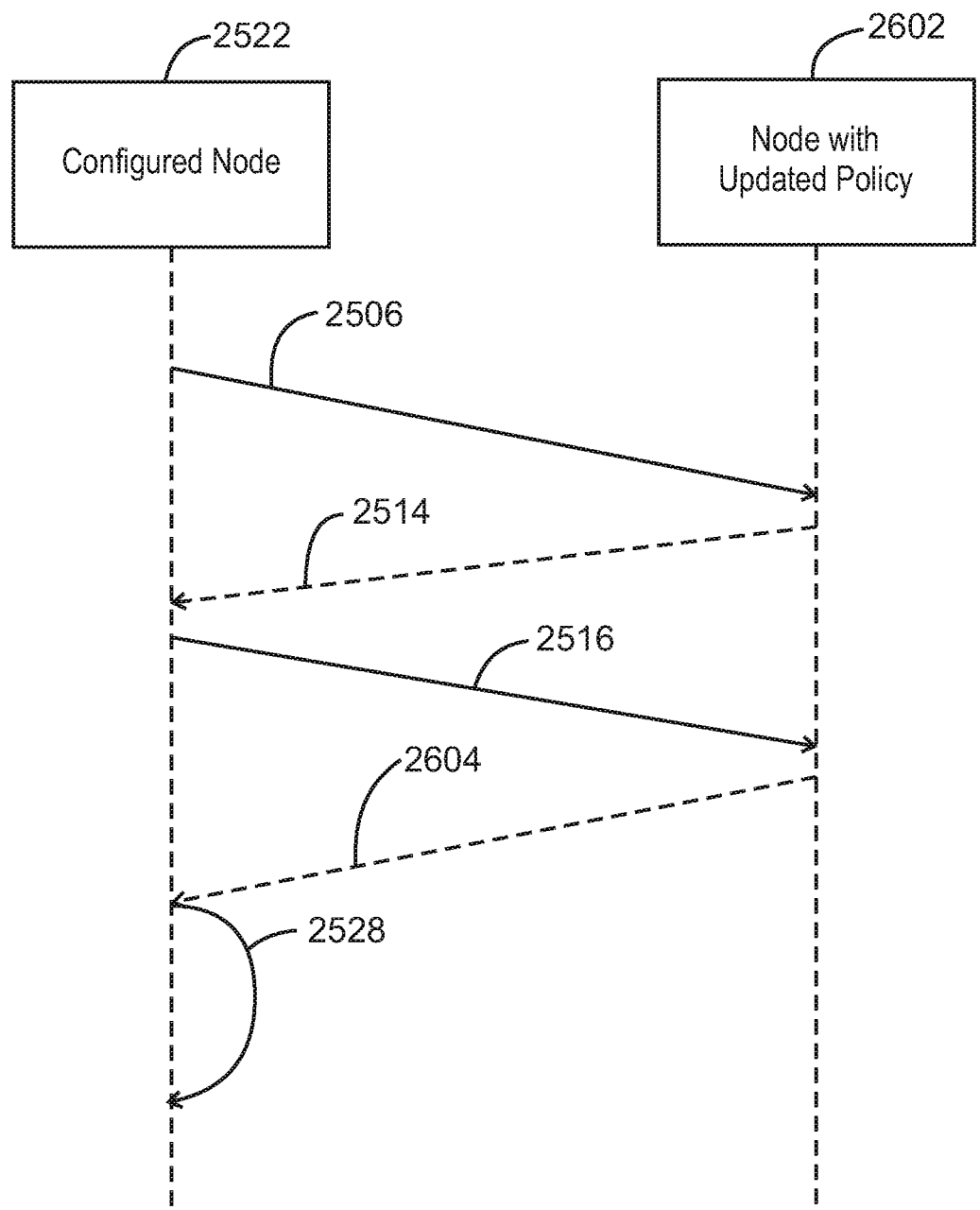
FIG. 26 is a ladder diagram of an example method of a configured node communicating with a node having an updated policy to update the policies of the configured node in accordance with some embodiments.

FIG. 26 is a ladder diagram of an example method 2600 of a configured node 2522 communicating with a node 2602 having an updated policy to update the policies of the configured node 2522 in accordance with some embodiments. The method 2600 of FIG. 26 may be implemented by the IoT device 2800 described with respect to FIG. 28. Like numbered items are as described with respect to FIG. 25. This may occur, for example, when the configured node 2522 receives a conflict alert message 2540 from the other node 2602. The configured node 2522 may send a discover message 2506 to the updated node 2602.

The updated node 2602 may reply with an offer message 2514 that alerts the configured node 2522 to the policy update. The configured node 2522 may then reply with an accept message 2516 to indicate to the updated node 2602 that it may send the updated policy. The updated policy may then be sent in an update message 2604 from the updated node 2602 to the configured node 2522. After validation and policy integrity checks the configured node 2522 may then perform 2528 a complete or partial replacement of a policy in force.

To determine if only a partial replacement is needed, a method may be implemented to calculate a delta between the policies. For example, a comparison may be made between individual rules in the new policy and the old policy to determine if rules have been added, removed, or modified, such as by the change of a parameter value for the rule. In a bloom filter model, the different tenants of a policy are representable as notifications in the bloom filter. Changes in policy decision are propagated to policy enforcement points, who are the subscribers to PDPs which are the publishers. The same efficiency aspects afforded by bloom filter notification messaging, as described herein, may be leveraged to implement distributed policy management.

As the number of IoT devices scales, appropriate delta technology will be integral to a distributed policy management system. A smaller file size for a delta file may lower the update file size that is distributed over the network, taking less time, and causing less network congestion. As policy updates may be varied in terms of priority, complexity, and size, sending only the changes may generate smaller files.

These files would effectively encapsulate the difference (or delta) between the currently policy and the new policy, for example, by selecting an adaptive delta compression technique based on the requirements or desires of the client.

Policy updates may also take into account limitations of the hardware on the client-side. For example, in various IoT mesh networks, such as automotive Electronic Control Units (ECUs), embedded modules, and Machine-to-Machine (M2M) devices used in utilities, manufacturing, and logistics, devices may be constrained. A compressed file that is sent out can only be reconstructed according to the capacity of the hardware. It may be limited by CPU, memory and storage. If the receiving device doesn't have the resources to implement a policy change, then the sender may need to anticipate this. These restrictions may vary from device to device so an adjustable and adaptive system may need to be able to compress accordingly.

The ability to incorporate historical information into the selection process may be performed by a two phase approach in the conflict analysis algorithm. The first phase of the algorithm initializes a relationship pattern matrix between a candidate policy and a deployed policy, the second phase matches this pattern against a conflict signature. Some solutions compare candidate policies against all deployed policies sequentially. However, the exemplary approach described herein may reuse the patterns already discovered from previous iterations of the algorithm to reduce the number of comparisons. Performance improvements may be made using this approach, but the degree of this improvement may depend on the nature of the relationships between deployed policies.

The policies may be tiered. For example, a policy may have a flag that requires it be implemented without hypothesis checking. Conversely, a node could suggest a policy compromise in the event that it could not implement a policy. This could be conducted in a closed loop system. An example may be a policy that requests that the IoT devices increase transmission intervals from every 5 minutes to every 5 hours. If implemented this policy could breach the QoS requirements for the device. The device may offer a transmission rate of every hour.

It may be appreciated that a set of policies representing the available parameters controllable by a site policy may be modeled using a set of policy object identifiers, each corresponding to a notification message further representable by a bloom filter, as described herein. An existing notification delivery capability based on bloom filters may be leveraged to deliver notifications corresponding to policy changes imposed by a network administrative entity. When a policy change notification is received, the node may open a secure connection to a policy server to obtain further direction regarding policy enforcement point adjustments.

Non-file base policies may be implemented for enhanced security. Further, non-file based systems could be used for storing polices in devices lacking storage outside of RAM. According to some aspects, when a device receives a policy, the policy isn't stored, instead certain parameters are, for example, updated in RAM and implemented on the fly. Further, policy parameters may be stored in ROM. In a secure lightweight device, the execution of the policies may be performed from ROM with some parameters read from RAM. Thus, a ROM may act as the kernel with all other features operating in RAM.

Figure 27:
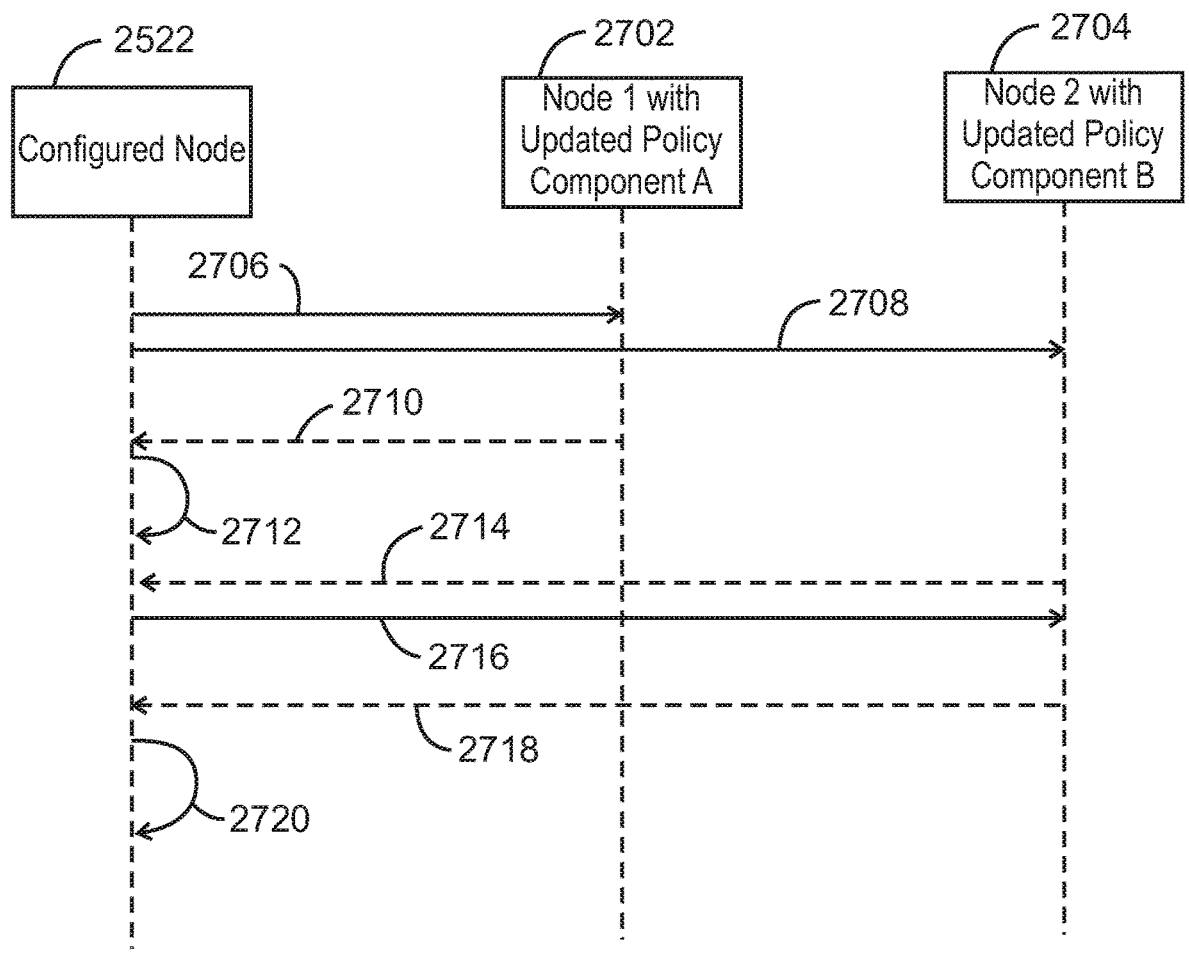
FIG. 27 is a ladder diagram of an example method showing the concatenation of policies obtained from different nodes by the configured node in accordance with some embodiments.

FIG. 27 is a ladder diagram 2700 of an example method for the concatenation of policies obtained from different nodes by the configured node in accordance with some embodiments. The method 2700 of FIG. 27 may be implemented by the IoT device 2800 described with respect to FIG. 28. Like numbered items are as described with respect to FIG. 25. In this example a first node 2702 has updated policy component A, while a second node 2704 has updated policy component B. The configured node 2522 may have received a conflict alert message 2540 indicating that it needs to update policies in the configured node 2522. The configured node 2522 sends a first discovery message 2706 to the first node 2702. The configured node also sends a second discover message 2708 to the second node 2704. In response, the first node 2702 sends a policy update message 2710 to the configured node 2522. The policy update message 2710 includes policy component A, which the configured node 2522 appends 2712 to the current policy.

The second node 2704 sends an offer message 2714 to the configured node 2522, letting the configured node 2522 know that the second node 2704 has policy component B. The configured node 2522 sends an acceptance message 2716 to the second node 2704, letting it know that it accepts the update. The second node 2704 then sends a policy update message 2718, which includes policy component B, which the configured node 2522 appends 2720 to the current policy. This results in a policy configuration for the configured node 2522 that is a combination of the policy components from the various other nodes, as shown in Table 3.

If a bloom filter structure is used for policy distribution, the policy object may associate a policy object identifier (OID) with line items in the policy structure where each policy OID may correspond to a bit in a bloom filter. In this example, every node implementing a set of OIDs may subscribe to the bloom filter covering an OID. Consequently, the same notification system that implements pub-sub routing may be leveraged to implement a distributed policy enforcement method.

TABLE 3

Policies in the configured node

| POLICY |
| --- |
| Base Level |
|    Policy component from node 1 |
|    Policy component from node 2 |
|    . . . |
|    Policy component from node N |

The nodes in a mesh network are not limited to implementing all of the same policies, or all in the same way. For example, a node that is experiencing a low battery may implement a policy to conserve battery power, while other nodes not sharing this limitation may continue with policies that maintain a QoS.

Figure 28:
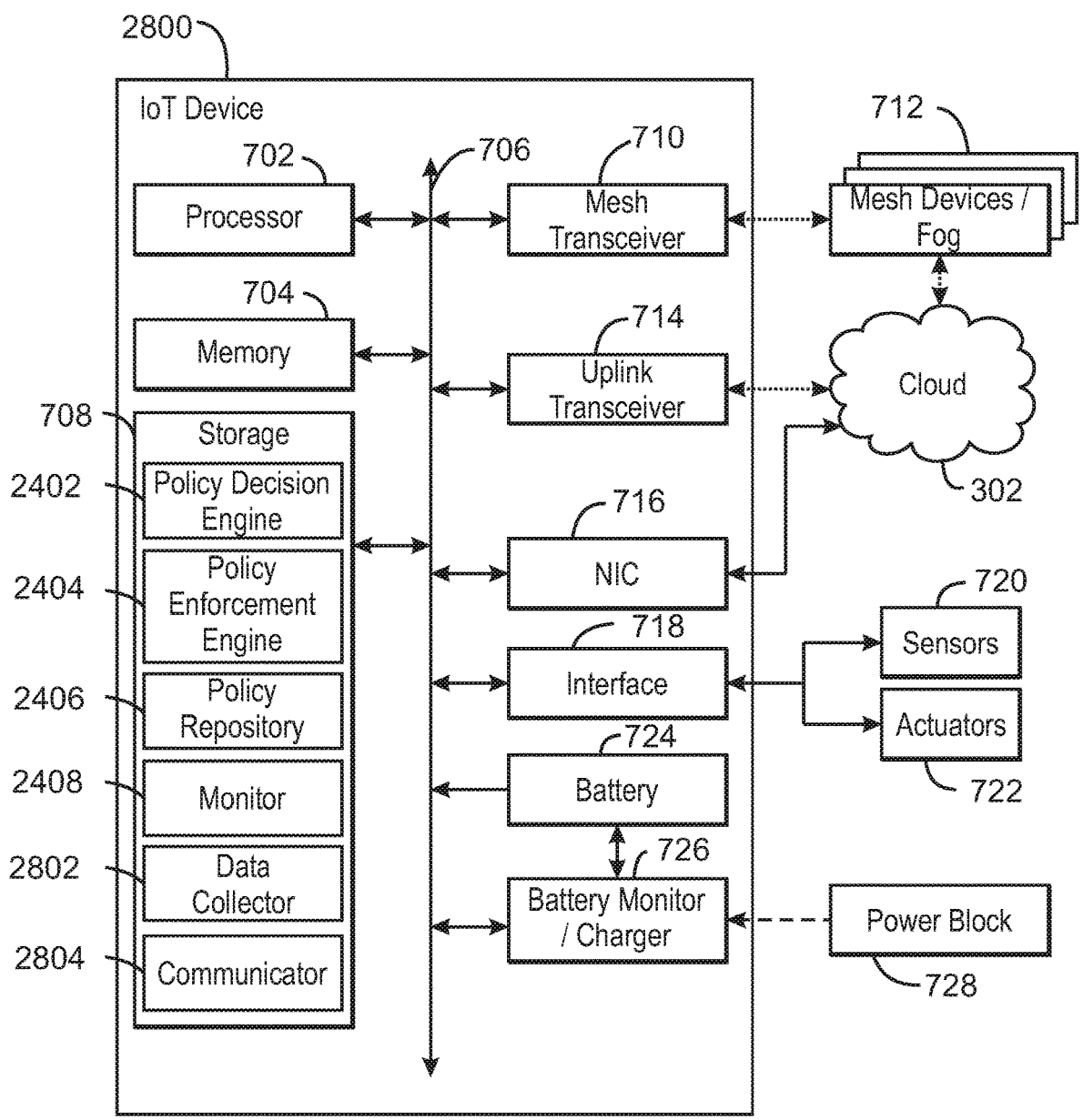
FIG. 28 is a block diagram of an example of components that may be present in an IoT device for the distributed management of policies in accordance with some embodiments.

FIG. 28 is a block diagram of an example of components that may be present in an IoT device 2800 for the distributed management of policies in accordance with some embodiments. Like numbered items are as described with respect to FIGS. 3, 7, and 24. It can be noted that different components may be selected and used for the IoT device 2800 than for those selected for the IoT device 700 discussed with respect to FIG. 7, and other IoT devices discussed herein.

The mass storage 708 may include a number of modules to implement the coalition group formation described herein. Although shown as code blocks in the mass storage 708, it may be understood that any of the modules may be fully or partially replaced with hardwired circuits, for example, built into an application specific integrated circuit (ASIC).

The mass storage 708 may include a policy decision engine 2402 to determine which policies are going to be enforced. A policy enforcement engine 2404 implements the policy decisions. A policy repository 2406 stores the policies for the IoT device 2800. The monitor 2408 communicates with monitors in other nodes in the mesh network 712, and collects information including, for example, the device configuration, capabilities, and functions supported by the nodes.

A data collector 2802 may collect data from the sensors 720 through the interface 718. A communicator 2804 may transfer the data collected from the data collector 2802 or from other units such as the monitor 2408 or the local policy decision engine 2402, to other devices in the mesh 712 or in the cloud 302.

Figure 29:
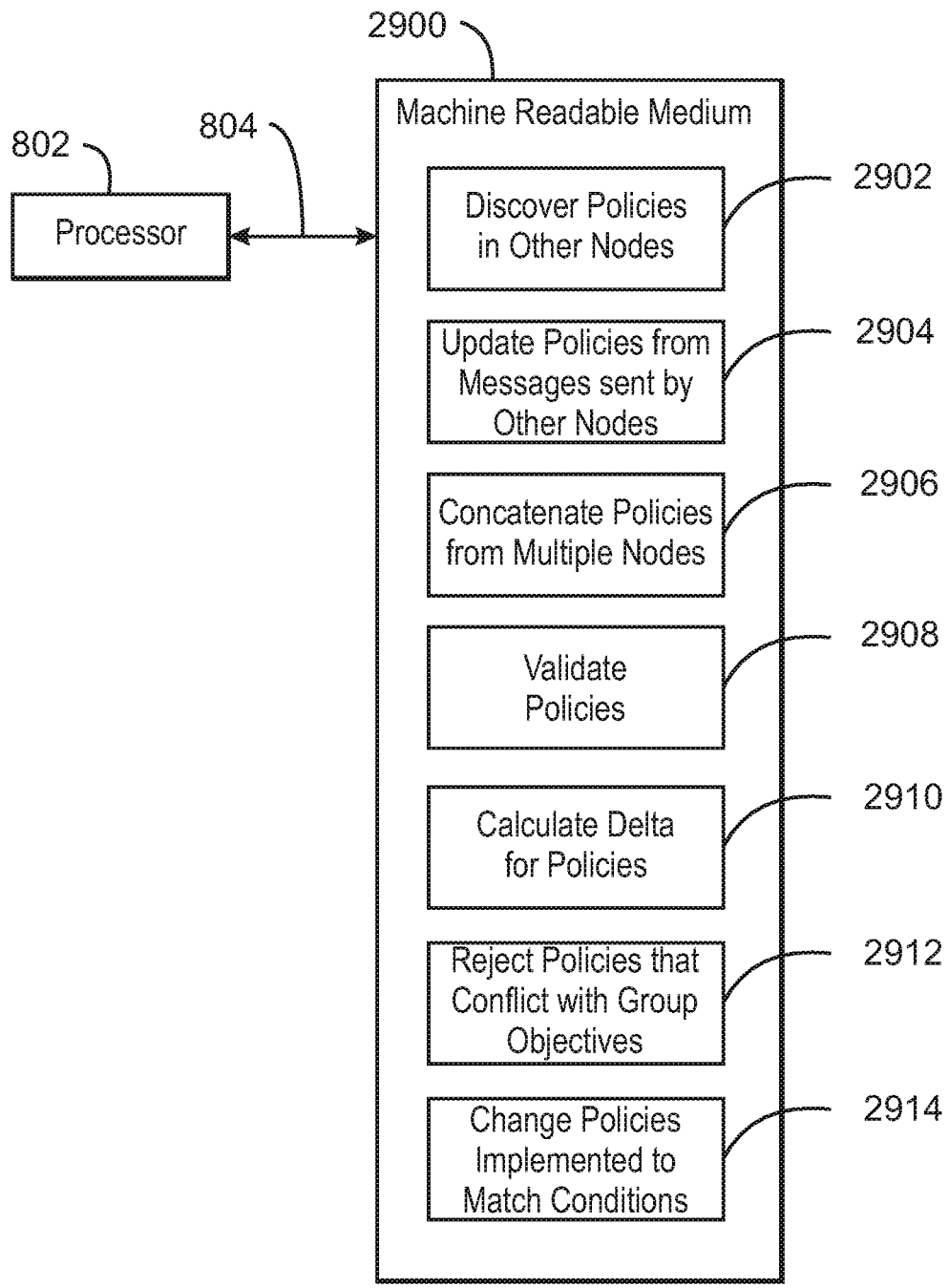
FIG. 29 is a block diagram of a non-transitory, machine readable medium including code to direct a processor to manage policies in an IoT network in cooperation with other IoT devices in accordance with some embodiments.

FIG. 29 is a block diagram of a non-transitory, machine readable medium 2900 including code to direct a processor 802 to manage policies in an IoT network in cooperation with other IoT devices in accordance with some embodiments. The processor 802 may access the non-transitory, machine readable medium 2900 over a bus 804. The processor 802 and bus 804 may be as described with respect to FIG. 8. The non-transitory, machine readable medium 2900 may include devices described for the mass storage 708 of FIG. 7 or may include optical disks, thumb drives, or any number of other hardware devices.

The non-transitory, machine readable medium 2900 may include code 2902 to direct the processor 802 to discover policies in other nodes. Code 2904 may be included to direct the processor 802 to update policies from messages sent by the other nodes. Code 2906 may be included to direct the processor 802 to concatenate the policies obtained from multiple nodes. Code 2908 may be included to direct the processor 802 to validate the policies obtained from the other nodes. Code 2910 may be included to direct the processor 802 to calculate a Delta, or change, for policies from current policies.

Code 2912 may be included to direct the processor 802 to reject policies that conflict with group objectives. The code 2912 may be included to direct the processor 802 to negotiate partial implementation of policies that conflict with group objectives. Code 2914 may be included to direct the processor 802 to change policies implemented to match current conditions.

In addition to distributing policies and performing functions, maintaining the availability of IoT devices is relevant, for example, to helping to prevent the loss of data collected by the IoT devices. A technique that may increase the availability of IoT devices could use out-of-band mechanisms to ensure their availability.

In addition to ensuring the availability of IoT devices, techniques for dealing with the failure of IoT devices are provided. These techniques may include alerting other IoT devices to the failure, for example, through the use of block chains as described herein. The IoT devices that are alerted to the failure may include an IoT device similar enough to the failed device to take over the functionality from that device.

Figure 30:
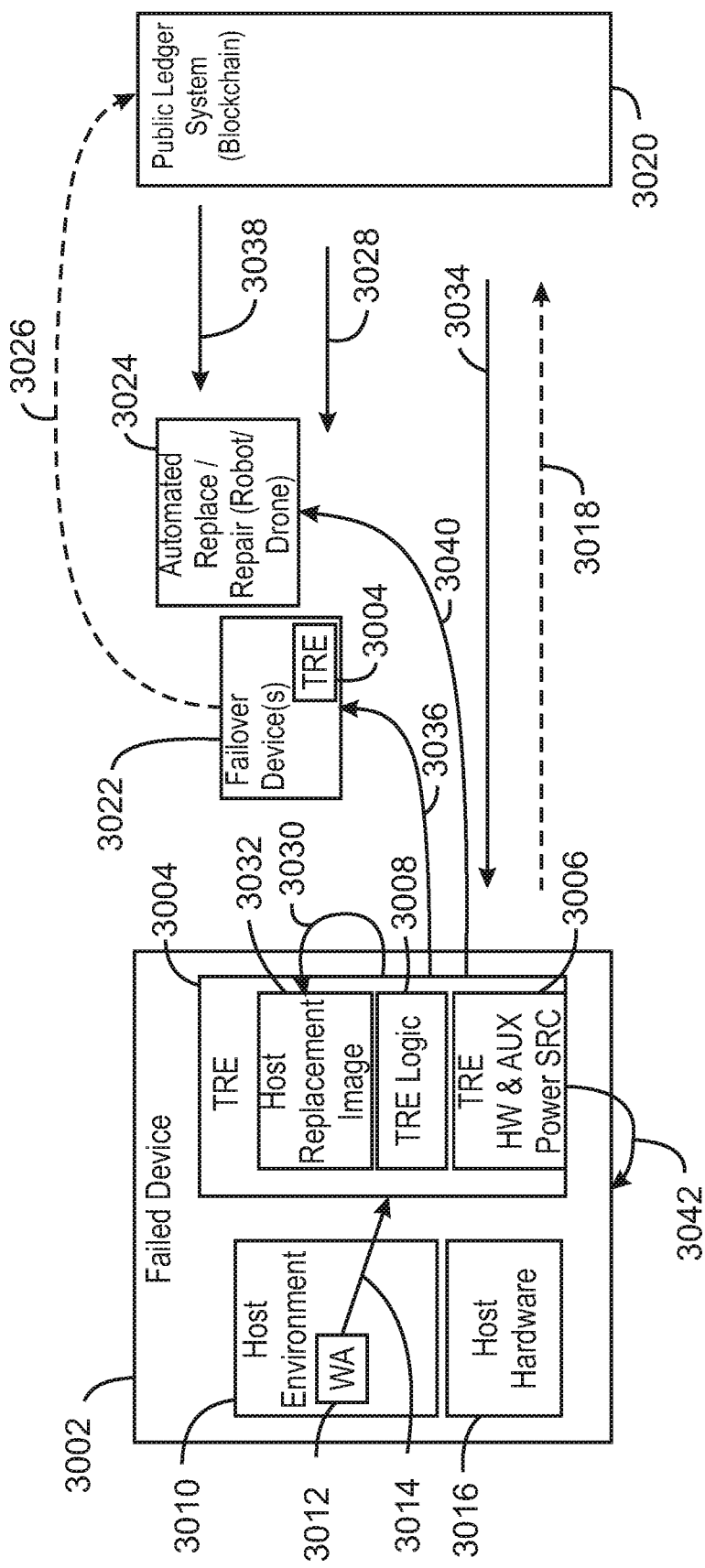
FIG. 30 is a schematic diagram of a failover mechanism for a failed device in accordance with some embodiments.

FIG. 30 is a schematic diagram of a failover mechanism 3000 for a failed device 3002 in accordance with some embodiments. The failed device 3002 may include a trusted reliability engine (TRE) 3004 that has an independent power supply 3006. The TRE 3004 may implement blockchain logic 3008 in hardware, such as ASIC, FPGA, or EC, among others.

A host environment 3010 may include a watchdog agent (WA) 3012 that generates watchdog messages 3014 that report on the health and operation of the host environment 3010 to the TRE 3004. The host environment 3010 may run on host hardware 3016 separate from the hardware of the TRE 3004.

The TRE may be a MESH network, for example, including multiple instances of 3004, that cooperate to perform a last-ditch failover function when expected watchdog reports stop coming in from the local host. A lack of a watchdog messages 3014 may be an indication the host environment 3010 has died or otherwise is inoperable. An aspect at this point is to get a failover message delivered before the node goes dark. The TRE 3004 is designed with a small amount of reserve power, for example, enough to perform the failover actions with a peer TRE.

The WA 3012 may independently deliver watchdog messages 3014 to a blockchain where blockchain observers may analyze the pattern of received watchdog events to draw conclusions about the health of the host. Intermittent losses may be an indication of potential failures in the host environment 3010 or a network environment. These may be health conditions that can be proactively corrected, but may not prompt failover actions.

The watchdog messages 3014 may be written to a block chain 3020, through block chain transactions 3018 from the block chain logic 3008. Writing the watchdog messages 3014 to the blockchain 3020 may synchronize them across other IoT devices, for example, in a mesh or fog network.

Some of the other IoT devices in the mesh network may possess similar functionality as the failed device and may have spare cycles, enabling them to act as a fail-over target. For example, a failover device 3022 or a repair/replacement drone 3024, may assess functional compatibility with the failed device 3002 using composite object identities, for example. In those examples, the blockchain 3020 may include a history of similar object types, which may be authenticated as such.

When a failover condition exists, IoT devices having similar object types, such as the failover device 3022, may compete to become the target device by periodically registering their candidacy with the TRE records, for example, through a transaction 3026 to the block chain 3020. The TRE 3004 may maintain a list of viable failover candidates, obtained 3028 from the block chain 3020, as it receives periodic registrations.

When a failure is observed by the TRE 3004, for example, the loss of watchdog messages 3014 from the watchdog agent 3012 in the host environment 3010, a failover action may be applied. To begin, the TRE 3004 may first perform a local strategy 3030 to recover the host. This may be applied assuming the TRE 3004 is not damaged by the failure event. The local strategy 3030 by the TRE 3004 may involve restoring a host replacement image 3032 to the host environment 3010.

A TRE 3004 on a suitable failover target, such as the failover device 3022, may observe 3034 watchdog activity in the block chain 3020, and may note the absence of it. If the local strategy 3030 is unsuccessful, for example, if the local strategy 3030 is not realized within a window of time, a suitable failover peer, such as the failover device 3022, may assume 3036 the role of the failed device 3002. This may be achieved by posting a transaction to the blockchain 3020 claiming failover target rights. The synchronization of the block chain 3020 among IoT devices ensures a first claimant is selected and does not race with a second.

Although the failover device 3022 may take over for the failed device 3002 temporarily, a permanent solution may be obtained. A repair or replacement drone 3024 may be dispatched 3038 to either repair or replace the failed device 3002. The repair or replacement drone 3024 may automatically dispatch itself, for example, by monitoring the block chain 3020 to determine that a device has failed. A replacement drone may be a direct replacement, moved into place by a repair drone or a service technician. In some examples, the replacement drone may be an autonomous unit that moves itself into place. Once the repair or replacement drone 3024 is in place, it may take over 3040 functionality for the failed device 3002, allowing the failover device 3022 to return to normal operations. At that point, the TRE 3004 in the failed device 3002 may decommission 3042 the failed device 3002. Observers of activity in the blockchain 3020 may monitor failures and plan a strategy for repairing, removing or replacing the failed device 3002.

Figure 31:
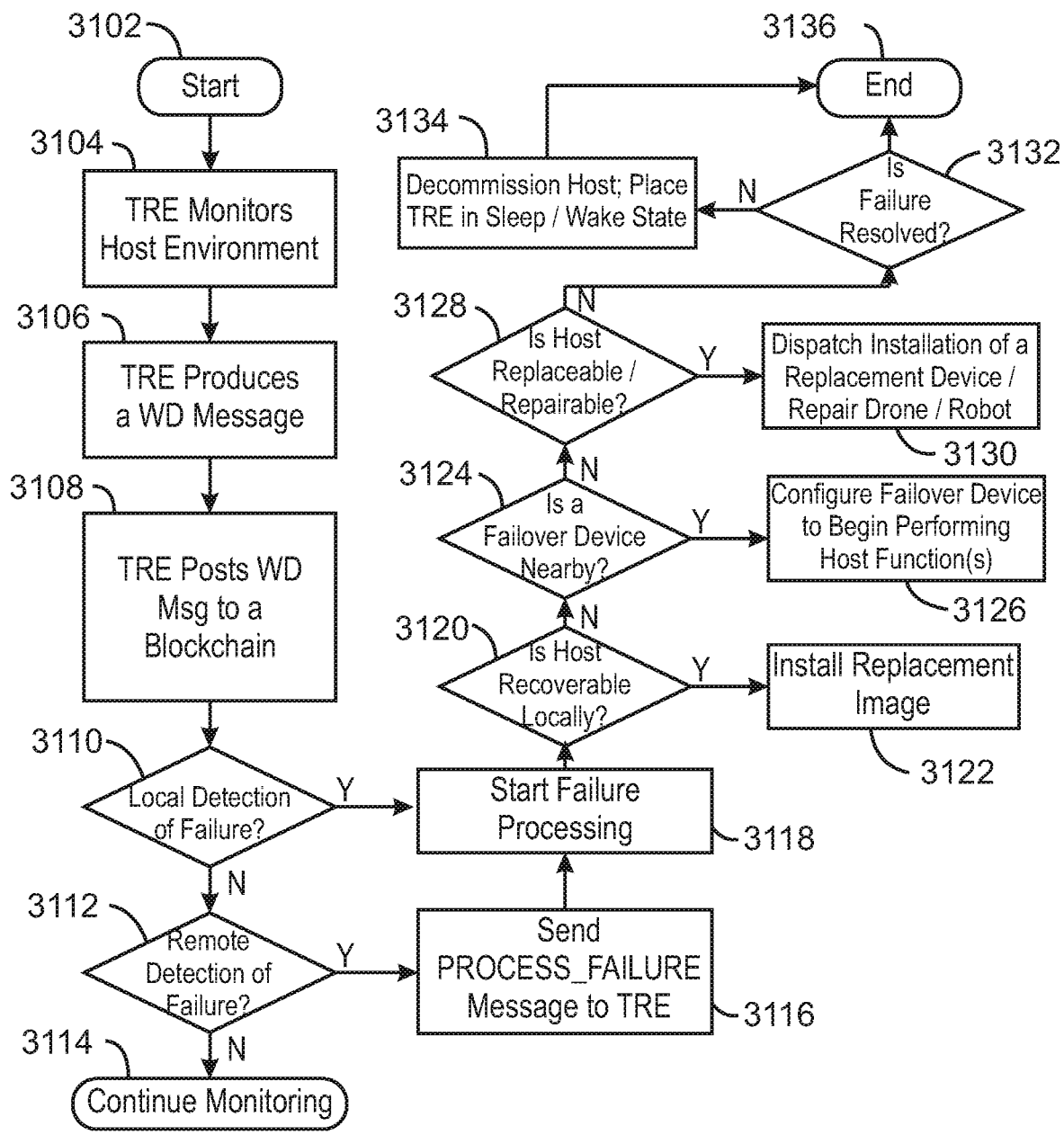
FIG. 31 is a process flow diagram of an example method for implementing a failover mechanism using a trusted reliability engine (TRE) in accordance with some embodiments.

FIG. 31 is a process flow diagram of an example method 3100 for implementing a failover mechanism using a trusted reliability engine (TRE) in accordance with some embodiments. The method 3100 of FIG. 31 may be implemented by the IoT device 3200 described with respect to FIG. 32. The TRE may implement a self-reliant strategy by first monitoring for host failure using the TRE while also informing a blockchain regarding device health state. The first self-reliant strategy may use a replacement image to recover the damaged or failed host, for example, replacing a corrupted image in a failed device. A second strategy may detect a failover device and transfer the device workload from the failed device to the failover device. A third strategy may dispatch a replacement device using an automated dispatch device, such as a replacement or repair drone. A fourth strategy decommissions the failed device to decrease the probability of unknown behaviors and lowering a risk of causing failures in surrounding network devices. The TRE may also perform trusted execution environment (TEE) functions including storage and management of keys, attestation and cryptographic operations. The method 3100 starts at block 3102, when the IoT device including the TRE is powered.

At block 3104, the TRE monitors the host environment. This may include monitoring operations and functionality of the memory, bus, or CPU, among others. Further the TRE monitors the host environment for watchdog messages, or pings, confirming that the host environment is operational. For example, the IoT/device attestation measurement includes the heartbeat reporting, generated by the watchdog (WD) pings. This may include a historical record of multiple heartbeats or the most recently reported heartbeat. If no pings are received over a selected period of time, for example, a millisecond (ms), 5 ms, 15 ms, or longer, the TRE may determine that there is been a failure of the host environment.

At block 3106, the TRE produces a WD message including the WD pings. The TRE attestation key may be used to sign the WD message in response to an attestation request or to sign the WD message. At block 3108, the WD message may be sent to a monitoring entity, for example, committing the WD message as a transaction to a block chain. The WD message generation logic may remain protected within the TRE, which provides greater assurance and resistance to being impacted by host failures. Nodes monitoring the WD messages in the block chain may observe the block chain updates across a variety of subnets, devices, and networks.

At block 3110, a failure of the IoT device may be detected locally, for example, by the TRE. If no local failure is detected at block 3110, a remote device may detect failure at block 3112. If no remote detection of failure is made at 3112, at block 3114 the monitoring resumes at block 3104.

If a remote failure is detected at block 3112, a process failure message is sent to the TRE in the local device at block 3116, for example, by the remote device that detected the failure. In the event the process failure message is received or a local failure is detected at block 3110, at block 3118 failure processing is begun.

At block 3120, a determination is made as to whether the host is recoverable locally. This may be determined, for example, by noting that the host is still powered and may have just hung up at a particular code segment. If so, at block 3122 a host replacement image may be installed, for example, overwriting the current operational memory of the failed device. The TRE may then attempt a restart of the host device in the code of the host replacement image. The TRE may attempt an initial restart of the host environment prior to installing the host replacement image. This may save time when the failure is not due to a corruption of the operating code, but is due to, for example, a software crash or hang.

If the host device is not locally recoverable, at block 3124 a determination may be made by the TRE that a failover device is nearby. If a failover device is nearby, at block 3126, the failover device is configured to begin performing the host functions.

If a failover device is not nearby at block 3124, at block 3128 a determination is made as to whether a host is replaceable or repairable. If so at block 3130, a replacement device or repair drone may be dispatched to perform the repair or replacement of the failed device. Even if a failover device has been identified and has taken over the functions of the failed device, at block 3126, a repair or replacement drone may still be dispatched at block 3130 to allow the failover device to return to normal operations.

At block 3132, a determination is made as to whether the failure is resolved, for example, if the functions of the failed device are being performed. If so, the method 3100 ends at block 3136, for example, by returning to normal monitoring operations at block 3104. If the failed device has not returned to normal operations at block 3132, at block 3134, the failed device is decommissioned. The TRE in the failed device may be placed in a sleep state. In this example the failover device or the replacement device has taken over the function of the failed device, and continues to provide the services of the failed device. The method 3100 then ends at block 3136.

In a scenario where host failure is malicious, the compromising event may not be distinguishable from normal anomalies or unexpected behavior. The TRE environment may improve security of an endpoint device and increase the probability that an attacker will be unable to prevent release of a WD 'sos' message. Further, an attacker may be limited in the ability to cover up audit trail evidence that may have been collected during the normal course of a security audit.

Figure 32:
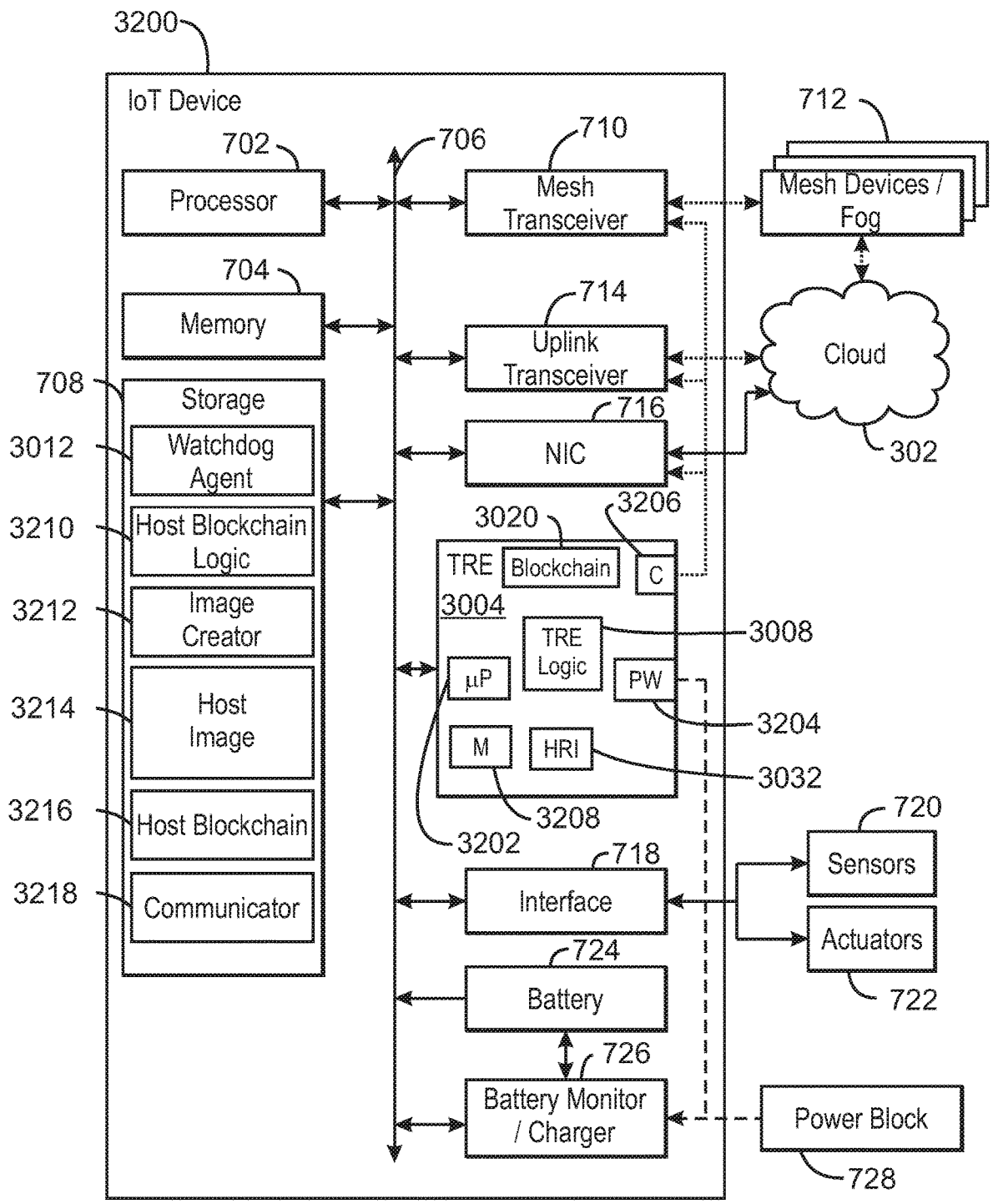
FIG. 32 is a block diagram of an example of components that may be present in an IoT device for implementing a failover mechanism using a trusted reliability engine in accordance with some embodiments.

FIG. 32 is a block diagram of an example of components that may be present in an IoT device 3200 for implementing a failover mechanism using a trusted reliability engine in accordance with some embodiments. Like numbered items are as described with respect to FIGS. 3, 7, and 30. It can be noted that different components may be selected and used for the IoT device 3200 than for those selected for the IoT device 700 discussed with respect to FIG. 7, and other IoT devices discussed herein.

The trusted reliability engine (TRE) 3004 may provide a trust execute environment (TEE) containing reliability logic and isolation, for example, implemented by a trusted platform module (TPM). Accordingly, the TRE 3004 may include a number of functional units that are protected from general access. These functional units may duplicate other functional units in the IoT device 3200. These may include the TRE logic 3008, the host replacement image 3032, and the block chain 3020, as discussed herein. In addition, the TRE 3004 may include a microprocessor 3202, and independent power supply 3204, a TRE communicator 3206, and a memory 3208. The power supply 3204 may couple to the power from the power block 728, or may have an independent power supply, for example, a battery linked to a charger.

The mass storage 708 may include a number of modules to implement the failover mechanism using the trusted reliability engine described herein. Although shown as code blocks in the mass storage 708, it may be understood that any of the modules may be fully or partially replaced with hardwired circuits, for example, built into an application specific integrated circuit (ASIC).

The mass storage 708 of the host may include a watchdog (WD) agent 3012 that sends WD messages to the TRE 3004 over the bus 706. As described herein, the TRE 3004 may create a watchdog message and commit the watchdog message to the block chain 3020. The TRE logic 3008 may propagate the block chain 3020 to mesh devices 712 or devices in the cloud 302 over one more communications links, for example, through a mesh transceiver 710, an uplink transceiver 714, and a NIC 716, among others. The TRE 3004 may access the communications links through the TRE communicator 3206, which may power the transceivers 710 or 714 or the network interface controller 716 as needed. This may ensure that the TRE 3004 maintains communications with external devices even if the host system in the IoT device 3200 has failed.

According to some aspects, not all of the functionality of the system is contained within the TRE 3004. In addition to the watchdog agent 3012, the storage 708 of the IoT device 3200 may contain a number of other blocks providing functionality to the system. For example, the mass storage 708 may include host block chain logic 3210 to maintain a host block chain 3212 outside of the TRE 3004. The host block chain 3212 may include all transactions in the block chain 3020 in the TRE 3004, and may include a more extensive set of transactions. For example, the block chain in the mass storage 708 may include identity blocks, peer device blocks, and other blocks that are not present in the block chain 3020 in the TRE 3004 due to memory constraints.

The mass storage 708 of the IoT device 3200 may include an image creator 3212 to copy a host image 3214 and send it to the TRE 3004 over the bus 706 to be saved as a host replacement image 3032. The host image 3214 may include the operating system, drivers, and functional code for the host environment of the IoT device 3200.

The mass storage 708 may include a communicator 3218 that accepts packets or frames from mesh devices 712 or devices in the cloud 302, and sends packets or frames to other mesh devices 712, devices in the cloud 302, and the like. The communicator 3218 may perform other functions, such as translation of packets between protocols, accepting micropayments, and the like.

Figure 33:
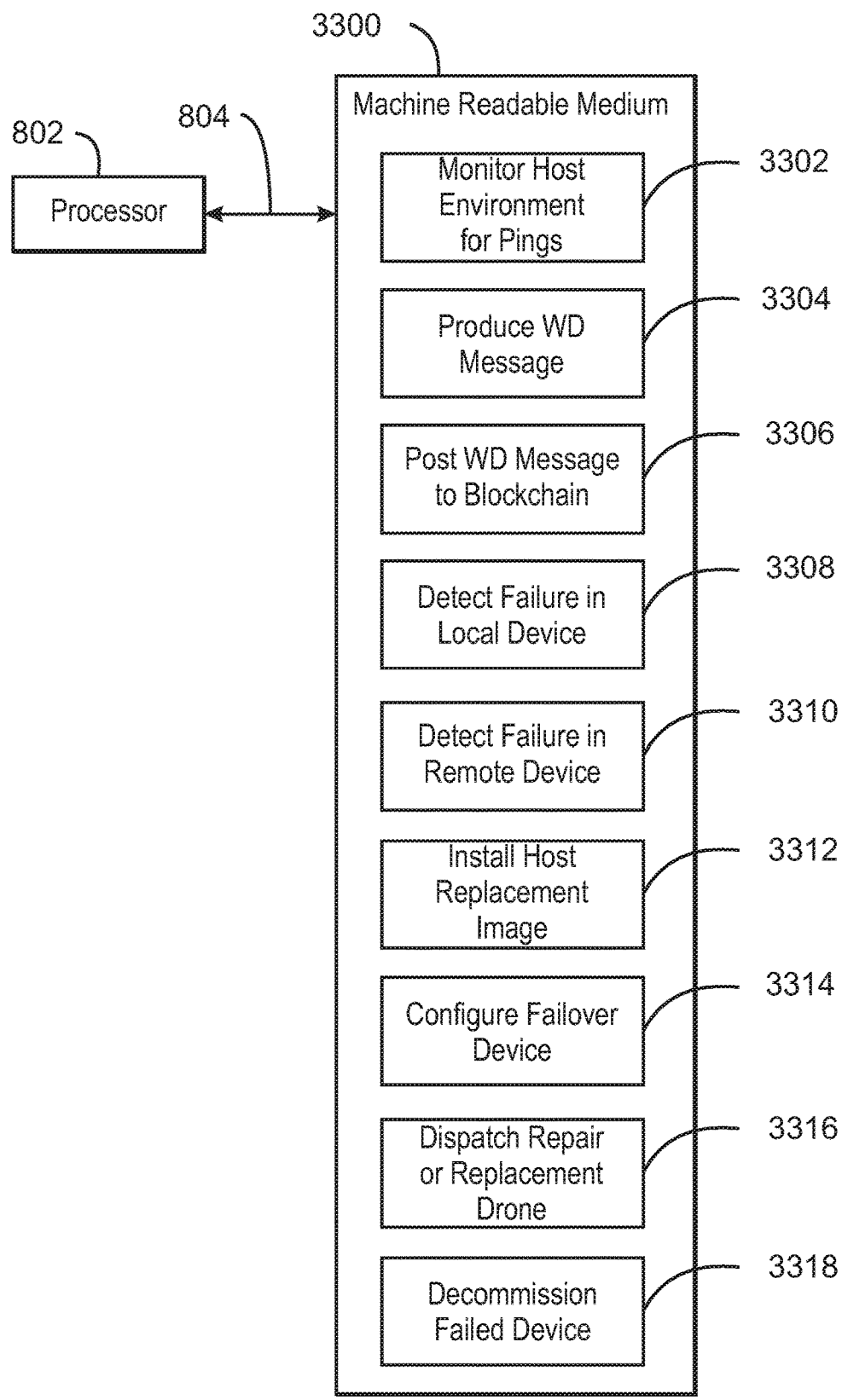
FIG. 33 is a block diagram of a non-transitory, machine readable medium including code to direct a processor to implement a failover mechanism using a trusted reliability engine in accordance with some embodiments.

FIG. 33 is a block diagram of a non-transitory, machine readable medium 3300 including code to direct a processor 802 to implement a failover mechanism using a trusted reliability engine in accordance with some embodiments. The processor 802 may access the non-transitory, machine readable medium 3300 over the bus 804. The processor 802 and bus 804 may be as described with respect to FIG. 8. The non-transitory, machine readable medium 3300 may include devices described for the mass storage 708 of FIG. 7 or may include optical disks, thumb drives, or any number of other hardware devices.

The non-transitory, machine readable medium 3300 may include code 3302 to direct the processor 802 to monitor host environment for heartbeat messages, or pings. Code 3304 may be included to direct the processor 802 to produce watchdog messages, for example, including the heartbeat messages. Code 3306 may be included to direct the processor 802 to post the watchdog messages to a block chain, for example, as a transaction. Code 3308 may be included to direct the processor 802 to detect failures in a local device associated with the TRE. Code 3310 may be included to direct the processor 802 to detect failures in a remote device, for example, by examining the watchdog messages in a block chain.

Code 3312 may be included to direct the processor 802 to install a host replacement image in place of that currently stored in a host environment. Code 3314 may be included to direct the processor 802 to configure a failover device. Code 3316 may be included to direct the processor 802 to dispatch a repair or replacement drone. Code 3318 may be included to direct the processor 902 to decommission a failed device.

Security in IoT networks is a consideration, especially as the networks grow in size. Private key storage, updates and in-transit interception, rogue key detection, and rapid new key generation are potential concerns. However, in many cases IoT devices are constrained by memory, processing power, and other issues, such as limited components. Further, IoT networks may have limited bandwidth to share data and all other functions. Thus, it is useful to maximize the efficiency of communications between the devices.

In the techniques described herein, IoT nodes in a network may not need to receive or dispatch a full private key, for example, with each message. Instead, they may dispatch and receive fractional parts of the key. In addition to improving the efficiency of communications, this may reduce the attack surface for a secure IoT network, as no individual node needs to store the full key sequences in persistent storage.

The key management and generation processes described herein provide a number of techniques for managing security in an environment that includes IoT devices. However, in some instances, managing the generation, lifespan, termination, and reissuing of keys may be complex in an IoT network environment.

Figure 34:
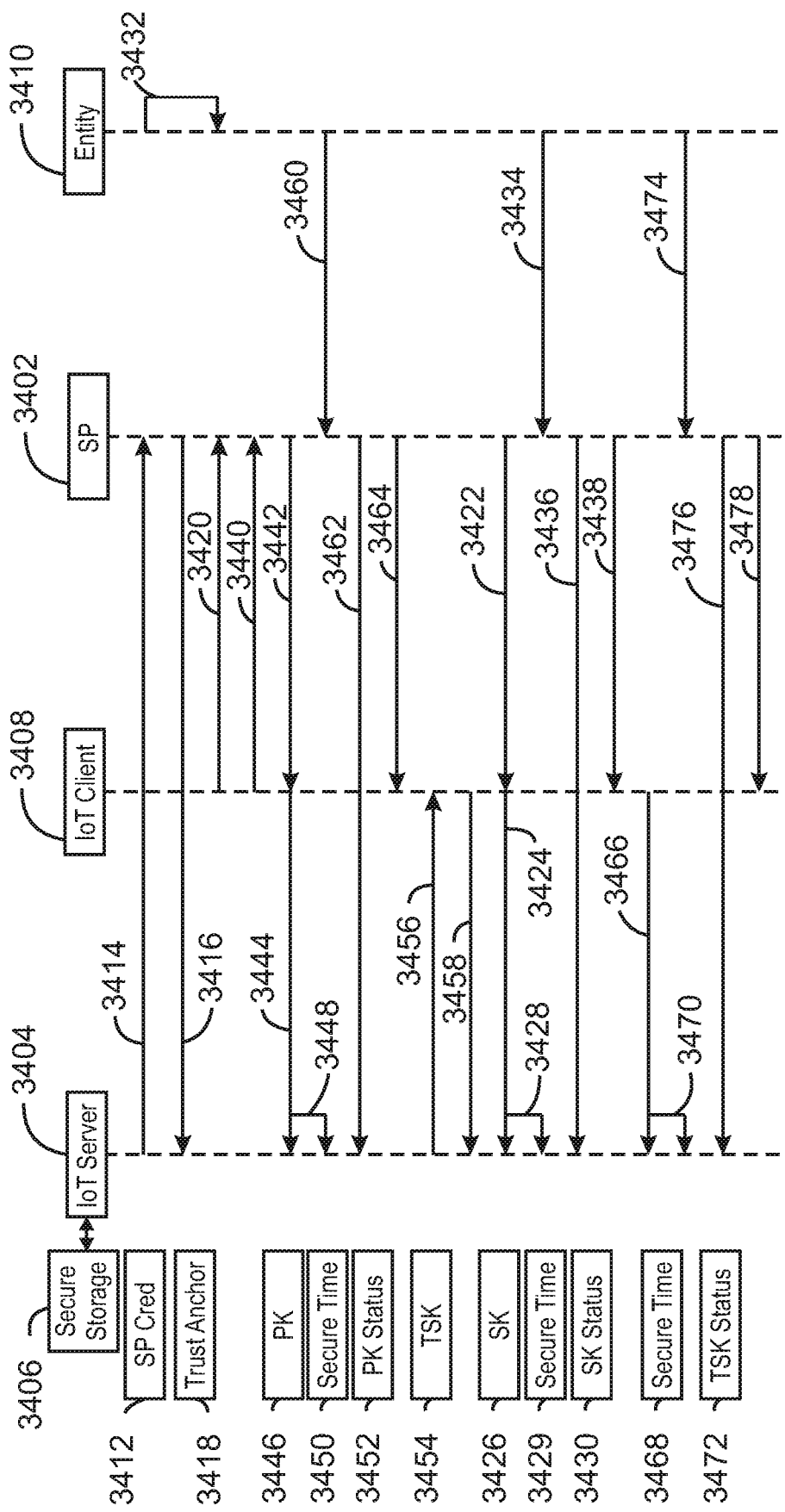
FIG. 34 is a ladder diagram of an example method for unified key management in an IoT network environment in accordance with some embodiments.

FIG. 34 is a ladder diagram of an example method 3400 for unified key management in an IoT network environment in accordance with some embodiments.

Figure 35:
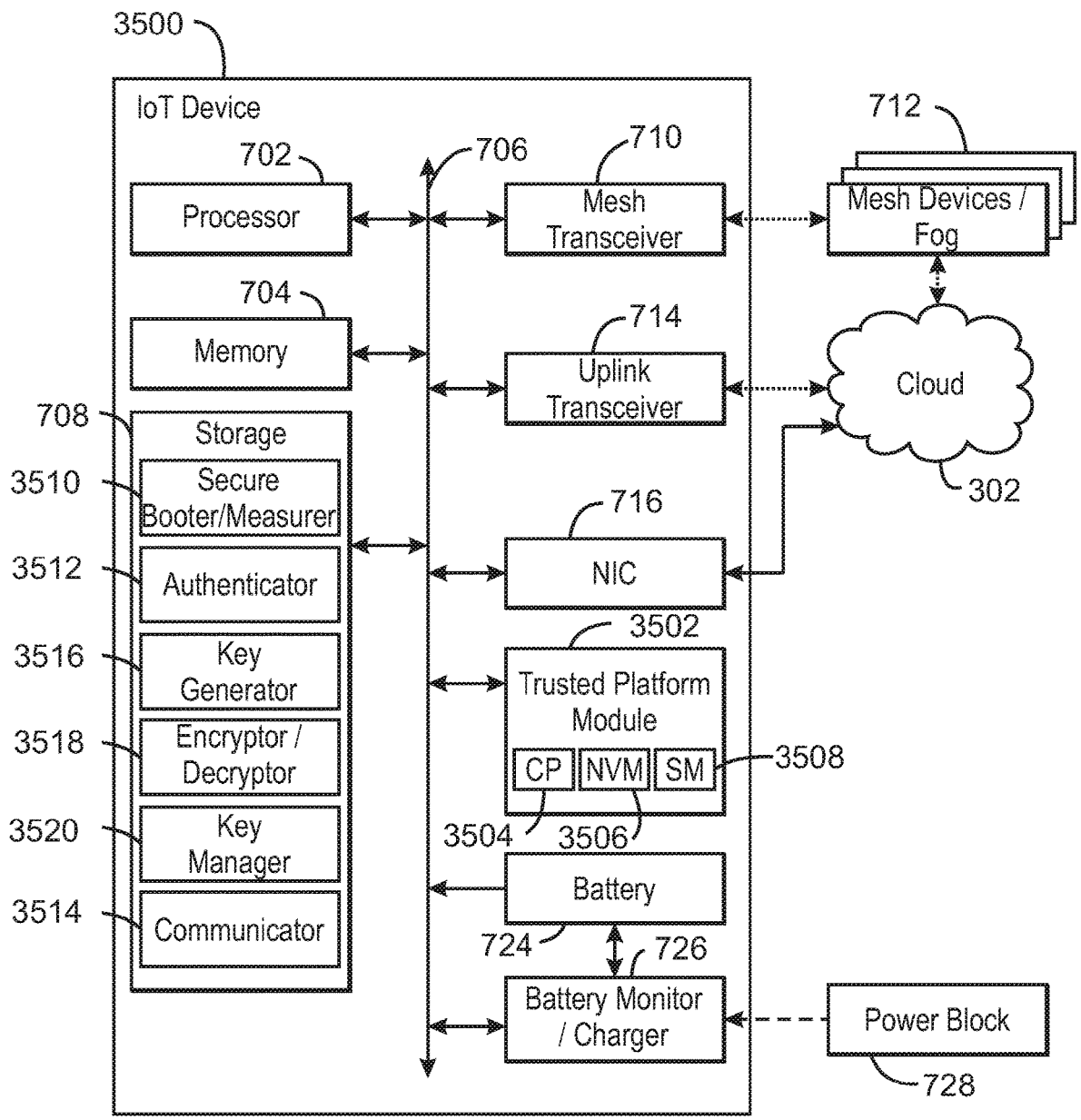
FIG. 35 is a block diagram of an example of components that may be present in an IoT device for managing keys in a network of IoT mesh devices in accordance with some embodiments.

The method 3400 of FIG. 34 may be implemented by the IoT device 3500 described with respect to FIG. 35. In this example, a service provider (SP) 3402 may be used to provide the overall roots of trust. This service provider 3402 may be a blockchain managed by a group of IoT devices, in the IoT network. In another example, the service provider 3402 may be an external device providing security services to the IoT network.

An IoT server 3404 may manage the local security for an IoT network, for example, storing secure information in a secure storage location 3406 accessible from the IoT server 3404. The secure storage location 3406 may be in a trusted execute environment (TEE), for example, managed by a trusted platform module (TPM).

An IoT client 3408 may interact with both the service provider 3402 and the IoT server 3404 to obtain keys for encryption and decryption of data and communications. Another entity 3410 may participate in the communications, for example, determining that a key has been compromised and triggering the revocation of the keys and generation of new keys. The entity 3410 may be another IoT device in the IoT network, may be a user at administrative console, or may be a manufacturer of IoT devices in the IoT network, among others.

The method 3400 may be used to manage both symmetric keys and asymmetric keys. For certain communications, all data may be protected using symmetric keys. The method 3400 may begin when the IoT server 3404 is onboarded into an IoT network and receives a service provider credential 3412. The service provider credential 3412 may be used to validate the IoT server 3404 to the service provider 3402 in an authentication message 3414. The authentication message 3414 may request that the service provider 3402 provide credentials for secure communications. The service provider 3402 may respond with a trust message 3416 that includes a trust anchor 3418. The trust anchor 3418 may include a hash of a public key, or a certified path, or chain to a trusted root of authority.

An IoT client 3408 may send symmetric key message 3420 to the service provider 3402, requesting that symmetric keys be provided for communications. The symmetric key message 3420 may be signed by a public or private key from the IoT client 3408.

If the symmetric key message 3420 is validated by the service provider 3420, the service provider 3402 may respond with a message 3422 that includes a symmetric key, or ticket. The message 3422 may be signed by the service provider 3402 using the same key provided by the IoT client 3408. The IoT client 3408 may then provide the symmetric key to the IoT server 3404 in a message 3424. The IoT server 3404 may save the symmetric key 3426 to the secure storage 3406. The IoT server may also determine if the secure key is expired by comparing a timestamp to a secure time 3429 in the secure storage 3406. The result of this comparison may be saved in a secure key status 3430.

The entity 3410 may make a determination that a key 3432 has been compromised. Ro example, the entity 3410 may find data that was protected by the key, or the key itself, in network searches. For the secure key 3426 this may result in a message 3434 to the service provider 3402 to revoke the secure key 3426. In response to the message 3434, the service provider 3402 may send a revoke message 3436 to the IoT server. Another message 3438 may be sent to the IoT client 3408, instructing the IoT client 3408. The IoT server 3404 may then re-authenticate with the service provider 3402 by sending an authentication message 3414 to repeat the process.

The IoT client 3408 is not limited to using symmetric keys, but may send an authentication message 3440 to the service provider 3402 using a private key. The service provider 3402 may then decrypt the authentication message 3440, confirming the identity of the IoT client 3408, using a public key belonging to the IoT client 3408.

If the authentication of the authentication message 3440 indicates the IoT client 3408 is valid, the service provider 3402 may send a message 3442 including a certificate. The message 3442 may be signed with the public key for the service provider 3402. The IoT client 348 may then send a message 3444 to the IoT server 3404 including the certificate. The message 3444 may be signed with a public key for the IoT client 3408. The public key 3446 may be saved by the IoT server to secure storage 3406. The IoT server 3404 may also determine 3448 if the certificate has expired, for example, by comparing a timestamp in the certificate to a secure time value 3450 stored in the secure storage 3406. The status of the private key 3452 may also be saved to the secure storage 3406.

The IoT server 3404 may then generate a temporal symmetric key (TSK) 3454 for communications. The IoT server 3404 may send a key exchange message 3456 including the TSK 3454 to the IoT client 3408. The IoT client 3408 may then communicate with the IoT server 3404 using the TSK 3454, for example, to encrypt a message 3458.

If the entity 3410 detects 3432 that the public key 3426 has been compromised, it may send a revocation message 3460 to the service provider 3402. The service provider 3402 may then send a revocation message 3462 to the IoT server 3404 instructing revoke the public key 3446. The service provider 3402 may also send a message 3464 to the IoT client 3408 instructing it to delete the private key generated for the public key 3446 sent on to the IoT server 3404.

The TSK 3454 does not last indefinitely, and may have a lifespan shorter than the public keys. For example, a message 3466 may be sent by the IoT client 3408 to the IoT server 3404 after being encrypted using the TSK 3454. A secure time value 3468 in the secure storage 3406 may be used by the IoT server 3404 to determine 3470 whether the TSK 3454 has expired. The TSK status 3472 may then be stored in the secure storage 3406 and, if expired, the TSK 3454 may be refreshed with the new value that is exchanged 3456 with the IoT client 3408.

Further if the entity 3410 determines that the TSK 3454 has been compromised, the entity 3410 may send a revocation message 3474 to the service provider 3402. The service provider 3402 may then send a revocation message 3476 to the IoT server 3404 instructing it to change the TSK status 3472 to invalid. The service provider 3402 may also send a message 3478 to the IoT client 3408 instructing it to delete the TSK 3454. At this point, the IoT server 3404 may attempt to re-authenticate to the service provider 3402 by sending the authentication message 3414, restarting the process.

The symmetric key 3426 may have a lifespan, as determined by a secure time value 3482 stored in the secure storage 3406. The IoT server 3404 may determine 3484 that the secure key, or ticket, has expired by comparing the time of use to the secure time 3450. The IoT server 3404 may issue a refreshed key, SK'. The refreshed key, SK', may then be used until the secure time 3450 is exceeded. The entity 3410 may also monitor to determine if the key, SK', has been compromised, and send out a revocation message 3434 if needed.

As described herein, a key exchange or key management protocol may result in temporary, or temporal, symmetric keys that are used to protect data, including confidentiality, integrity, or both. The temporal keys presume the authentication and trust properties established by the authentication/key exchange event based on an assumption that the temporal keys have not be compromised since they were initially established.

Temporal keys may, however, may have variable lifetimes. Lifetime may be dynamically adjusted based on context and situation. For example, a node that is entering and exiting a sleep mode may not diminish key lifetime while it is sleeping.

Further, key revocation of any keys, symmetric and asymmetric, may be performed by sending a revocation message to both the Client and the Server. In the case where a key is revoked, the credential (certificate or ticket) may be deleted by sending a key deletion message that instructs the Clients and Servers possessing the certificate or the ticket to delete them. Deletion may differ from revocation in that revocation may only instruct the Clients or Servers to refuse verification of revoked keys while deletion may instruct the keys to be physically expunged from the system. Both revocation and deletion messages may take effect immediately, whereas the certificate or ticket expiration may allow the key to be used up to the date of expiry—and subsequent to a key compromise event.

Key lifecycle management further applies to symmetric key cache systems where a temporal key may be reused for a second or third message even though the key is deemed to be temporal. Temporality of cached keys is determined by the cache expiry policy. Hence a key cache policy doubles as a ticket structure where the cache policy configuration message may be specified using a 'ticket' structure that does not contain a symmetric key.

Unified key management leverages key management messages and flows for both symmetric and asymmetric keys allowing reuse efficiencies in implementation that benefits constrained IoT environments.

FIG. 35 is a block diagram of an example of components that may be present in an IoT device 3500 for managing keys in a network of IoT mesh devices 712 in accordance with some embodiments. Like numbered items are as described with respect to FIGS. 3 and 7. The IoT device 3500 may be the IoT server 3404 or the IoT client 3408, described with respect to FIG. 34. It can be noted that different components may be selected and used for the IoT device 3500 than for those selected for the IoT device 700 discussed with respect to FIG. 7, and other IoT devices discussed herein.

In this example, the IoT device 3500 may function as either the IoT server 3404 or the IoT client 3408, described with respect to FIG. 34. In other examples, the IoT device 3500 may function only as an IoT client 3408, for example, if the IoT device 3500 is more constrained. In further examples, the IoT device 3500 may function only as an IoT server 3404.

The IoT device 3500 may include a trusted platform module (TPM) 3502, for example, compliant with the specification promulgated by the Trusted Computing Group as ISO/IEC 11889 in 2009. The TMP 3502 may include a cryptographic processor (CP) 3504, non-volatile memory (NVM) 3506, and secure memory (SM) 3508. The CP 3504 may provide a random number generator, an RSA hash generator, a SHA-1 hash generator, and an encryption-decryption engine, among others. The NVM 3506 may include keys programmed at the time of manufacture that include, for example, an RSA key, among others. The SM 3508 may hold measurements taken on software in platform configuration registers. As used herein, a measurement is a hash code calculated on a code or data segment stored in the storage 708 or memory 704. Starting from a measurement of a boot code segment, the measurements may be used to establish a trusted execution environment (TEE), by creating a chain-of-trust from the initial booting. The SM 3508 may provide the secure storage 3406 described with respect to FIG. 34.

The mass storage 708 may include a number of modules to implement the key management functions described herein. Although shown as code blocks in the mass storage 708, it may be understood that any of the modules may be fully or partially replaced with hardwired circuits, for example, built into an application specific integrated circuit (ASIC).

The mass storage 708 may include a secure booter/measurer 3510 that performs measurements on code or data.

An initial boot measurement may be performed by the processor 702, or the TPM 3508, to set up the secure booter/measurer 3510 to perform additional measurements. This may create a trusted execute environment (TEE) to provide security to the IoT device 3500. Succeeding measurements in the TEE may be performed by the TPM 3508 as code segments are prepared for operation.

An authenticator 3512 may be used to authenticate communications with other mesh devices 712, or devices in the cloud 302. The authenticator 3512 may use a packet communicator 3514 to send and receive encrypted packets from the other mesh devices 712, or devices in the cloud 302. The authenticator 3512 may authenticate the communications using a symmetric key provided by a service provider 3402, or a temporal symmetric key (TSK) generated in the IoT device 3500.

A key generator 3516 may be used to generate the temporal symmetric keys (TSKs) for communications with other devices. The authenticator 3512 may exchange the TSKs with other devices. The key generator 3516 may also generate new TSKs, or new symmetric keys (SKs), after the keys have expired, for example, when a secure time for the life of the key has been exceeded. An encryptor/decryptor 3518 may encrypt or decrypt communications using the TSKs or S Ks.

A key manager 3520 may be included to monitor and manage the keys. This may include determining if a key has expired and using the key generator 3516 to generate a new key for reissue. The key manager 3520 may monitor communications received through the communicator 3514 for a revocation message from another mesh device 712, or a device in the cloud 302, that indicates that a key has been compromised. Upon receiving the revocation message, the key manager 3520 may change a status of the key to indicate that the key is no longer valid. The key manager 3520 may then re-trigger authentication through the authenticator 3512 to regenerate the keys.

Figure 36:
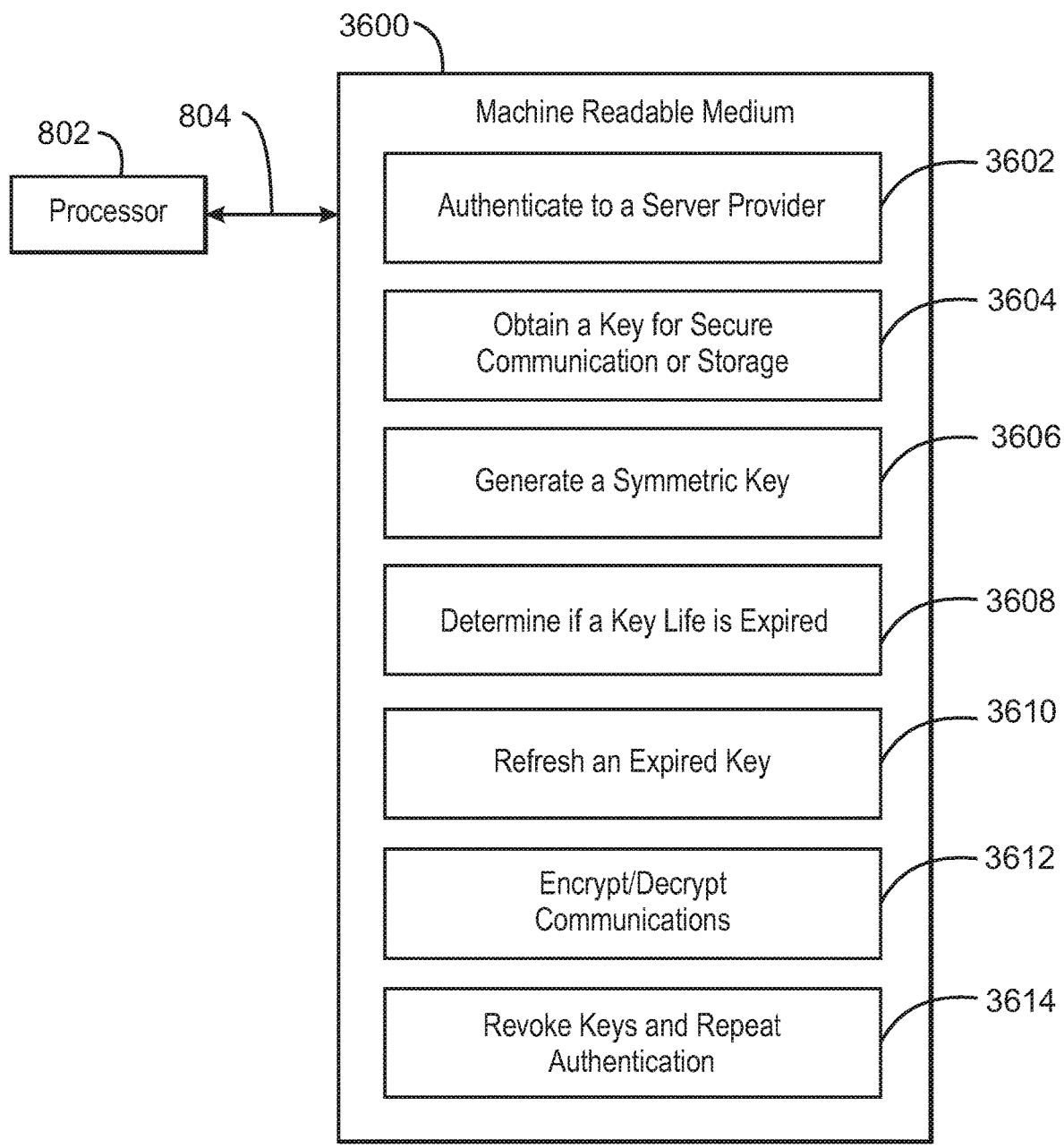
FIG. 36 is a block diagram of a non-transitory, machine readable medium including code to direct a processor to manage keys for secure communications in accordance with some embodiments.

FIG. 36 is a block diagram of a non-transitory, machine readable medium 3600 including code to direct a processor 802 to manage keys for secure communications in accordance with some embodiments. The processor 802 may access the non-transitory, machine readable medium 3600 over a bus 804. The processor 802 and bus 804 may be as described with respect to FIG. 8. The non-transitory, machine readable medium 3600 may include devices described for the mass storage 708 of FIG. 7 or may include optical disks, thumb drives, or any number of other hardware devices.

The non-transitory, machine readable medium 3600 may include code 3602 to direct the processor 802 to authenticate to a service provider. Code 3604 may be included to direct the processor 802 to obtain a key for secure communication or storage. The code 3604 may direct the processor 802 to request a symmetric key, such as a ticket, or an asymmetric key, such as a certificate, from a service provider.

Code 3606 may be included to direct the processor 802 to generate a symmetric key for communications. The symmetric key may be a TSK that is exchanged with another device after authentication through exchange of a public/private key pair. The symmetric key that is generated by the code 3606 may also be a new key generated to refresh a key that has expired.

Code 3608 may be included to direct the processor 802 to determine if the key has reached a preset key lifetime. Code 3610 may be included to direct the processor 802 to refresh an expired key. Code 3612 may be included to direct the processor 802 to encrypt and decrypt communications from other devices. Code 3614 may be included to direct the processor 802 to revoke keys and repeat the authentication to the service provider, for example, if a revocation message is received.

The key management techniques described herein may be used in any number of contexts. For example, when an object activates and needs to connect, it may use information from a registrar about other services or agents running in the network about how to register itself and to find other services and agents. However, public registrars are prone to distributed denial-of-service (DDoS) attacks. If it is feasible, implementing a registrar based on a decentralized protocol may be useful. In a decentralized protocol, a blockchain or ledger may act as a replacement for a public key infrastructure (PKI) to assess device or agent identities by means of their blockchain addresses. The blockchain may be used as a name space that is secure, memorable, and decentralized. Names in a namespace are a limited resource that may be managed in some decentralized manner. Further, lower level addresses that are usually regulated by leases, such as Internet protocol (IP) in a dynamic host configuration protocol (DHCP), may be charged and regulated by micropayments or other credit or currency.

Example 1 includes an apparatus. The apparatus includes a trusted communications environment, including a primary participant including a group creator to initiate creation of a trusted group, and a distributed ledger to store identities and credential for group members. The apparatus also includes a secondary participant including communication credentials for the trusted group provided by the primary participant.

Example 2 includes the subject matter of example 1. In example 2, the communications credentials include a private key for the trusted group, and a transaction key obtained from the distributed ledger.

Example 3 includes the subject matter of either of examples 1 or 2. In example 3, the primary participant includes a join request for a distributed ledger enumeration authority (DLEA), wherein the join request includes a trusted group name signed with a private key for the primary participant.

Example 4 includes the subject matter of any of examples 1 to 3. In example 4, the apparatus includes a distributed ledger enumeration authority (DLEA) accessor to determine if a trusted group name was created.

Example 5 includes the subject matter of any of examples 1 to 4, including the distributed ledger to 5. In example 5, the distributed ledger includes a public key for the trusted group and a permissioning policy.

Example 6 includes the subject matter of any of examples 1 to 5. In example 6, the primary participant includes a key creator to create a key based, at least in part, on a trusted group name.

Example 7 includes the subject matter of any of examples 1 to 6. In example 7, the apparatus includes an attestation validator to validate a join request from the secondary participant.

Example 8 includes the subject matter of any of examples 1 to 7. In example 8, the apparatus includes a group joiner to issue the communication credentials to the secondary participant.

Example 9 includes the subject matter of any of examples 1 to 8. In example 9, the apparatus includes a tertiary participant including secondary communication credentials for the trusted group provided by the secondary participant.

Example 10 includes the subject matter of any of examples 1 to 9. In example 10, the secondary communication credentials include a private key for the group and a secondary transaction key.

Example 11 includes the subject matter of any of examples 1 to 10. In example 11, the apparatus includes a plurality of secondary participants including communication credentials issued by the primary participant.

Example 12 includes the subject matter of any of examples 1 to 11. In example 12, the apparatus includes a plurality of tertiary participants each including secondary communication credentials issued by the primary participant.

Example 13 includes the subject matter of any of examples 1 to 12. In example 13, the distributed ledger includes transaction data signed by a group key and a private key for a participant.

Example 14 includes a method for securing communications transactions in an IoT network. The method for securing communications transactions in an IoT network includes determining by a first participant that a group of participants can communicate with integrity assurances, reserving a name for the group from a distributed ledger enumeration authority (DLEA), establishing a distributed ledger for the group using the name, and providing a private key for the group to a second participant.

Example 15 includes the subject matter of example 14. In example 15, reserving the name includes sending the name and a public key for the first participant to the DLEA in a message signed using a private key for the first participant, determining that the group has been created when the DLEA commits the name to a public distributed ledger, and establishing a group public key using an enhanced privacy identification (EPID) system.

Example 16 includes the subject matter of either of examples 14 or 15. In example 16, establishing the distributed ledger for the group includes committing a transaction from the first participant to the group distributed ledger, wherein the transaction includes a group public key and a permissioning policy, signed by a transaction key for the first participant.

Example 17 includes the subject matter of any of examples 14 to 16. In example 17, providing a private key includes receiving a join request from the second participant requesting permission to join the group, and validating trustworthiness of the second participant.

Example 18 includes the subject matter of any of examples 14 to 17. In example 18, validating trustworthiness includes verifying a manufacturers key used to sign the join request.

Example 19 includes the subject matter of any of examples 14 to 18. In example 19, the method includes generating a second private key for the group in the second participant, wherein the second private key is under a group public key, sending a message to the first participant, wherein the message is a public key for the second participant, signed by the second private key, and committing a transaction to the group distributed ledger, wherein the transaction includes the second participant's public key, signed by the private key.

Example 20 includes the subject matter of any of examples 14 to 19. In example 20, the method includes creating a join request in a third participant, wherein the join request includes a third participant transaction key signed by a private key for the third participant, sending the join request to the second participant, signing the join request by the second participant with a public key for the third participant, a transaction key for the second participant, and the group key to create a signed transaction, and sending the signed transaction back to the third participant.

Example 21 includes the subject matter of any of examples 14 to 20. In example 21, the method includes including transaction data from the second participant in the signed transaction.

Example 22 includes the subject matter of any of examples 14 to 21. In example 22, the method includes signing the signed transaction with a private group key for the third participant, and committing the signed transaction to the group distributed ledger.

Example 23 includes the subject matter of any of examples 14 to 22. In example 23, the method includes signing transaction data at the second participant using the private group key for the second participant, and committing the transaction data to the group distributed ledger.

Example 24 includes a non-transitory, machine readable medium. The non-transitory, machine readable medium includes instructions to direct a processor to determine that a group has integrity assurances, reserve a group name with a distributed ledger enumeration authority (DLEA), create a group public key and a permissioning policy, and commit the group name and group public key to a group distributed ledger.

Example 25 includes the subject matter of example 24. In example 25, the non-transitory, machine readable medium includes instructions to direct the processor to validate a join request from a second participant, and send a join message to the second participant, wherein the join request includes a group private key.

Example 26 includes the subject matter of either of examples 24 or 25. In example 26, the non-transitory, machine readable medium includes instructions to direct the processor to sign transaction data with a group private key, and commit the signed transaction data to the group distributed ledger.

Example 27 includes an apparatus. The apparatus includes an IoT network, wherein the IoT network includes a trusted execution environment (TEE). This also includes a chain history for a blockchain, wherein the chain history includes a whitelist of hash signatures, a root-of-trust for chaining (RTC) to provide the chain history to local computing roots-of-trust, and a root-of-trust for archives (RTA) to provide an archive function to constrained devices in the IoT network.

Example 28 includes the subject matter of example 27. In example 28, the TEE includes a root-of-trust measurer (RTM) to verify a first loadable object in a system.

Example 29 includes the subject matter of either of examples 27 or 28. In example 29, the TEE includes a root-of-trust for reporting (RTR) to attest to values in a root-of-trust for storage, and the root of trust for storage (RTS) to store values for root-of-trust devices.

Example 30 includes the subject matter of any of examples 27 to 29. In example 30, the TEE includes blockchain logic to migrate the chain history to other devices and verify chain histories from other devices.

Example 31 includes the subject matter of any of examples 27 to 30. In example 31, the TEE includes a whitelist history including current configurations, past configurations, or anticipated configurations or any combinations thereof.

Example 32 includes the subject matter of any of examples 27 to 31. In example 32, the TEE includes including a measurement history to record measurements made during a boot process.

Example 33 includes the subject matter of any of examples 27 to 32. In example 33, the measurement history includes measurement logs from multiple boot sequences.

Example 34 includes the subject matter of any of examples 27 to 33. In example 34, the apparatus includes a mesh network of devices that boot into a trusted environment.

Example 35 includes the subject matter of any of examples 27 to 34. In example 35, the chain history includes a blockchain block that includes a plurality of values from platform control registers (PCRs) that are each signed by an attestation key.

Example 36 includes the subject matter of any of examples 27 to 35. In example 36, the blockchain block includes a block-signing key.

Example 37 includes the subject matter of any of examples 27 to 36. In example 37, the apparatus includes an image repository storing whitelist values.

Example 38 includes the subject matter of any of examples 27 to 37. In example 38, the chain history includes a blockchain block that includes a plurality of manifests of whitelist images that are each signed by a manufacturers attestation key.

Example 39 includes the subject matter of any of examples 27 to 38. In example 39, the blockchain block includes a block-signing key.

Example 40 includes a method for securely booting a device in an IoT network. The method for securely booting a device in an IoT network includes measuring a code object before running the code object, comparing the measurement to a known good image retrieved from a blockchain, and running the code object if the measurement matches the known good image.

Example 41 includes the subject matter of example 40. In example 41, the method includes comparing the measurement to a known bad image retrieved from a blockchain, quarantining the device if the measurement matches the known bad image, and remediating the code if the measurement matches the known bad image.

Example 42 includes the subject matter of either of examples 40 or 41. In example 42, the method includes following a predefined policy if the measurement does not match a known good image or a known bad image.

Example 43 includes the subject matter of any of examples 40 to 42. In example 43, the predefined policy instructs the device to boot into an untrusted state and not communicate with trusted devices.

Example 44 includes the subject matter of any of examples 40 to 43. In example 44, the method includes obtaining the image for a measurement from a cloud repository, confirming that a signature for the image is valid, confirming that the image is a hash of a bootchain, signing a manifest for the image, adding the image to a whitelist, and committing the whitelist to a blockchain.

Example 45 includes the subject matter of any of examples 40 to 44. In example 45, the method includes determining that an image is not of a bootchain, determining that the image is an attack image, adding the attack image to a blacklist, and committing the blacklist to a blockchain.

Example 46 includes the subject matter of any of examples 40 to 45. In example 46, the method includes determining that an image is not of a bootchain, determining that the image is an unknown image, adding the unknown image to an unclassified list, and committing the unclassified list to a blockchain.

Example 47 includes the subject matter of any of examples 40 to 46. In example 47, the method includes creating a block including an image of a successfully run code block, and committing the block to the blockchain.

Example 48 includes the subject matter of any of examples 40 to 47. In example 48, the method includes creating a block including an image of a rejected code block, and committing the block to the blockchain.

Example 49 includes a non-transitory, machine readable medium. The non-transitory, machine readable medium includes instructions to direct a processor to measure a code object before running the object to obtain a measurement, compare the measurement to a known good image retrieved from a blockchain, and classify the code object as good if there is a match between the measurement and the known good image.

Example 50 includes the subject matter of examples 49. In example 50, the non-transitory, machine readable medium includes instructions to direct the processor to compare the measurement to a known bad image, and prevent the code object from running if the measurement matches the known bad image.

Example 51 includes the subject matter of either of examples 49 or 50. In example 51, the non-transitory, machine readable medium includes instructions to direct the processor to maintain a blockchain including a chain history, and maintain root-of-trust measurements in the blockchain.

Example 52 includes an apparatus. The apparatus includes an Internet-of-Things (IoT) network, wherein the IoT network includes an IoT device. The IoT device includes a communication system to communicate with other IoT devices in a domain, an onboarding tool to discover a device in the domain and create resources for the device, a device discoverer to discover a remote device serviced by a remote onboarding tool located in a remote domain, a trust builder to establish trust with the remote onboarding tool, a shared domain creator to form a shared domain with the remote onboarding tool, and a shared resource directory storing resources for both the device and the remote device.

Example 53 includes the subject matter of example 52. In example 53, the device in the domain is represented by resources in a first resource block, the remote device in the remote domain is represented by resources in a second resource block, and a virtual domain stores a third resource block, wherein the third resource block includes the resources from the first resource block and the second resource block.

Example 54 includes the subject matter of either of examples 52 or 53. In example 54, the communication system includes a mesh transceiver, an uplink transceiver, or a network interface controller, or any combinations thereof.

Example 55 includes the subject matter of any of examples 52 to 54. In example 55, the apparatus includes a plurality of devices in a plurality of domains that form a fog device, wherein a common resource block in a virtual domain stores resources for all of the plurality of devices.

Example 56 includes the subject matter of any of examples 52 to 55. In example 56, the apparatus includes an orchestrator to provide information on a plurality of remote devices to the onboarding tool.

Example 57 includes the subject matter of any of examples 52 to 56. In example 57, the trust builder includes an attestation key, an identification key, or an assigned trust from an administrator, or any combinations thereof.

Example 58 includes the subject matter of any of examples 52 to 57. In example 58, the trust builder includes a blockchain system to form a blockchain root-of-trust.

Example 59 includes a method for sharing resources across domains. The method for sharing resources across domains includes joining a device to an IoT network in a first domain, adding resources for the device in the first domain to a local resource block, discovering a remote device in a remote domain, creating trust with the remote domain, and creating a shared resource block including resources for the device and the remote device.

Example 60 includes the subject matter of example 59. In example 60, the method includes creating a local resource block if not already in existence.

Example 61 includes the subject matter of either of examples 59 or 60. In example 61, discovering the remote device includes receiving information from an orchestrator about the remote device.

Example 62 includes the subject matter of any of examples 59 to 61. In example 62, discovering the remote device includes discovering an onboarding tool in the remote domain, and exchanging device information with the onboarding tool in the remote domain.

Example 63 includes the subject matter of any of examples 59 to 62. In example 63, creating trust with the remote device includes exchanging attestation information with the remote device.

Example 64 includes the subject matter of any of examples 59 to 63. In example 64, creating trust with the remote device includes looking up the remote device in a blockchain.

Example 65 includes the subject matter of any of examples 59 to 64. In example 65, creating trust with the remote device includes accepting an assigned trust setting from an administrator.

Example 66 includes the subject matter of any of examples 59 to 65. In example 66, the method includes renaming a sub-domain ID if the sub-domain ID matches a previous sub-domain ID in the shared resource block, and propagating the new sub-domain ID to all devices that use the sub-domain ID.

Example 67 includes the subject matter of any of examples 59 to 66. In example 67, the method includes renaming an object ID if the object ID matches a previous object ID in the shared resource block, and propagating the new object ID to all devices that use the object ID.

Example 68 includes the subject matter of any of examples 59 to 67. In example 68, the method includes renaming a device ID if the device ID matches a previous device ID in the shared resource block, and propagating the new device ID to all devices that use the device ID.

Example 69 includes the subject matter of any of examples 59 to 68. In example 69, the method includes accessing the resources of the remote device from the first domain.

Example 70 includes the subject matter of any of examples 59 to 69. In example 70, creating the shared resource block includes forming a union between the local resource block and a remote resource block.

Example 71 includes a non-transitory, machine readable medium. The non-transitory, machine readable medium includes instructions that, when executed, direct a processor to join a device to an IoT network, create a local resource for the device in a local resource block, discover devices in other domains, create a shared domain, create a shared resource block in the shared domain, and merge the local resource and remote resources for devices in the other domains in the shared resource block.

Example 72 includes the subject matter of example 71. In example 72, the non-transitory, machine readable medium includes instructions that, when executed, direct the processor to discover an onboarding tool in a remote domain, create trust with the onboarding tool in the remote domain, and exchange information on a plurality of devices in a local domain and the remote domain.

Example 73 includes the subject matter of either of examples 71 or 72. In example 73, the non-transitory, machine readable medium includes instructions that, when executed, direct the processor to discover an onboarding tool in a remote domain, and access a blockchain to validate the onboarding tool in the remote domain.

Example 74 includes the subject matter of any of examples 71 to 73. In example 74, the non-transitory, machine readable medium includes instructions that, when executed, direct the processor to detect a name overlap in the shared resource block, correct the name overlap by changing an overlapping entry to a new name, and propagating the new name to all devices that use that name.

Example 75 includes the subject matter of any of examples 71 to 74. In example 75, the non-transitory, machine readable medium includes instructions that, when executed, direct the processor to form a fog device including a device in a local domain and a remote device in a remote domain.

Example 76 includes an apparatus. The apparatus includes an Internet-of-Things (IoT) network, wherein the IoT network includes an IoT device. The IoT device includes a communication system to communicate with other IoT devices in the IoT network, a policy decision engine to determine which policies are going to be enforced, a policy repository to store the policies and state information reported by a network monitor, a policy enforcement engine to enforce the policies determined by the policy decision engine, and a peer monitor to monitor policies enforced by the IoT device, and by other IoT devices in the IoT network.

Example 77 includes the subject matter of example 76. In example 77, the communication system includes a mesh transceiver, an uplink transceiver, or a network interface controller, or any combinations thereof.

Example 78 includes the subject matter of either of examples 76 or 77. In example 78, the IoT network includes a plurality of devices forming a fog device.

Example 79 includes the subject matter of any of examples 76 to 78. In example 79, the policy decision engine is to base a determination of which policies are going to be enforced on a parameter for the IoT device.

Example 80 includes the subject matter of any of examples 76 to 79. In example 80, the parameter includes a remaining capacity of a battery in the IoT device, other IoT devices coupled through a mesh transceiver, or a status of an uplink transceiver to devices in a cloud, or any combinations thereof.

Example 81 includes the subject matter of any of examples 76 to 80. In example 81, the policy decision engine changes the policies being enforced based, at least in part, on a change in the parameter.

Example 82 includes the subject matter of any of examples 76 to 81. In example 82, the policy decision engine distributes policies to non-configured nodes.

Example 83 includes the subject matter of any of examples 76 to 82. In example 83, the peer monitor collects information and stores it in a database.

Example 84 includes the subject matter of any of examples 76 to 83. In example 84, the information includes current device configuration, a capability of a peer node, a service being offered, a node requirement for a network, a resource availability estimation, or a triggered event, or any combinations thereof.

Example 85 includes the subject matter of any of examples 76 to 84. In example 85, the apparatus includes a coordinator to distribute policies to peer nodes in the IoT network.

Example 86 includes the subject matter of any of examples 76 to 85. In example 86, the coordinator includes a gateway between the IoT network and a cloud device.

Example 87 includes the subject matter of any of examples 76 to 86. In example 87, the IoT device is to distribute policies to nearest neighboring nodes.

Example 88 includes the subject matter of any of examples 76 to 87. In example 88, the policy decision engine communicates with peer nodes to access policies.

Example 89 includes a method for distributing policy management across IoT devices in an IoT network. The method for distributing policy management across IoT devices in an IoT network includes receiving a discover message at a node, wherein the discover message is intended to identify new policies, change policies, or both, responding to the discover message with an offer message, wherein the offer message identifies policies, receiving an accept message, wherein the accept message requests the policies, and responding with a message that includes the policies.

Example 90 includes the subject matter of example 89. In example 90, the method includes installing policies received from a peer node, and updating a status to a configured node.

Example 91 includes the subject matter of either of examples 89 or 90. In example 91, the method includes receiving an updated policy in an update message.

Example 92 includes the subject matter of any of examples 89 to 91. In example 92, the method includes performing a validation on the updated policy received in the update message, and installing the updated policy.

Example 93 includes the subject matter of any of examples 89 to 92. In example 93, the validation includes determining whether the new policy conflicts with a current policy, and, if so, rejecting the new policy.

Example 94 includes the subject matter of any of examples 89 to 93. In example 94, the validation includes determining whether the new policy conflicts with a current policy, and, if so, partially implementing the new policy.

Example 95 includes the subject matter of any of examples 89 to 94. In example 95, the method includes sending a conflict alert message to a peer node to alert the peer node to a policy conflict.

Example 96 includes the subject matter of any of examples 89 to 95. In example 96, the method includes receiving a discover message from the peer node for the policy update, replying with an offer message, receiving an accept message from the peer node to indicate that the policy update may be sent, and sending an update message including the new policy.

Example 97 includes the subject matter of any of examples 89 to 96. In example 97, the method includes performing a validation on the updated policy received in the update message, and installing the updated policy.

Example 98 includes the subject matter of any of examples 89 to 97. In example 98, the method includes generating a file including a delta between a current policy and a new policy, and sending the file to a peer node.

Example 99 includes the subject matter of any of examples 89 to 98. In example 99, the method includes determining if a peer node has hardware capacity for the policies, modifying the policies to match the hardware capacity of the peer node, and sending the modified policies to the peer node.

Example 100 includes the subject matter of any of examples 89 to 99. In example 100, the method includes determining changes between new policies and current policies, and sending the changes in policies to the peer node.

Example 101 includes a non-transitory, machine readable medium. The non-transitory, machine readable medium includes instructions that, when executed, direct a processor to direct the processor to discover policies in other nodes, and update policies from messages sent by other nodes in an IoT network.

Example 102 includes the subject matter of example 101. In example 102, the non-transitory, machine readable medium includes instructions that, when executed, direct a processor to concatenate policies from multiple nodes.

Example 103 includes the subject matter of either of examples 101 or 102. In example 103, the non-transitory, machine readable medium includes instructions that, when executed, direct a processor to validate policies received in messages from other nodes, and reject policies that conflict with group objectives.

Example 104 includes the subject matter of any of examples 101 to 103. In example 104, the non-transitory, machine readable medium includes instructions that, when executed, direct a processor to change implemented policies to match current device conditions.

Example 105 includes the subject matter of any of examples 101 to 104. In example 105, the non-transitory, machine readable medium includes instructions that, when executed, direct a processor to calculate a delta between policies.

Example 106 includes an apparatus. The apparatus includes an Internet-of-Things (IoT) network, wherein the IoT network includes an IoT device. The IoT device includes a host environment, including a watchdog agent to send watchdog messages that report on health and operation of the host environment, and a trusted reliability engine (TRE), including a power supply separate from the power supply for the host environment, TRE distributed ledger logic to write the watchdog messages to a TRE blockchain, and TRE logic to apply a failover action if the host environment fails.

Example 107 includes the subject matter of example 106. In example 107, the host environment includes an image creator to make an image of the host environment and send image copy to the TRE to be saved as a host replacement image (HRI).

Example 108 includes the subject matter of either of examples 106 or 107. In example 108, the host environment includes host blockchain logic to maintain a host blockchain.

Example 109 includes the subject matter of any of examples 106 to 108. In example 109, the host blockchain includes watchdog message blocks, peer device blocks, or identity blocks, or any combinations thereof.

Example 110 includes the subject matter of any of examples 106 to 109. In example 110, the host environment includes a communicator to communicate with other mesh devices, devices in a cloud, or both.

Example 111 includes the subject matter of any of examples 106 to 110. In example 111, the TRE includes a communication system to allow the TRE to communicate with external devices if the host environment fails.

Example 112 includes the subject matter of any of examples 106 to 111. In example 112, the TRE includes a host replacement image (HRI).

Example 113 includes the subject matter of any of examples 106 to 112. In example 113, the HRI includes a copy of an operating system, drivers, and functional code for the IoT device.

Example 114 includes a method for implementing a failover mechanism using a trusted reliability engine (TRE). The method for implementing a failover mechanism using a trusted reliability engine (TRE) includes monitoring a host environment for a failure, posting a watchdog message to a blockchain, detecting a failure of the host environment, and implementing a failure process to recover from the failure of the host environment.

Example 115 includes the subject matter of example 114. In example 115, monitoring the host environment includes receiving pings from the host environment.

Example 116 includes the subject matter of either of examples 114 or 115. In example 116, when posting the watchdog message includes incorporating a ping into the watchdog message, and committing the watchdog message to the blockchain as a transaction.

Example 117 includes the subject matter of any of examples 114 to 116. In example 117, detecting the failure of the host environment includes determining that no pings have been received from the host environment for a selected period of time.

Example 118 includes the subject matter of any of examples 114 to 117. In example 118, detecting the failure of the host environment includes determining that no communications are taking place over a bus of the host environment.

Example 119 includes the subject matter of any of examples 114 to 118. In example 119, detecting the failure the host environment includes determining that a CPU has halted.

Example 120 includes the subject matter of any of examples 114 to 119. In example 120, detecting the failure of the host environment includes determining that a memory in the host environment has failed.

Example 121 includes the subject matter of any of examples 114 to 120. In example 121, the failure process includes determining if the host environment is locally recoverable, and, if so installing a host replacement image in the host environment, and restarting the host environment.

Example 122 includes the subject matter of any of examples 114 to 121. In example 122, the failure process includes determining if a failover device is nearby, and, if so configuring the failover device to begin performing a function of the host environment.

Example 123 includes the subject matter of any of examples 114 to 122. In example 123, the failure process includes determining if a device including the host environment is repairable, and, if so, dispatching a repair drone to repair the device.

Example 124 includes the subject matter of any of examples 114 to 123. In example 124, the failure process includes determining if a device including the host environment is replaceable, and, if so, dispatching a repair drone to replace the device.

Example 125 includes the subject matter of any of examples 114 to 124. In example 125, the failure process includes determining if the failure is resolved, and, if so, decommissioning the host environment, placing the TRE in a sleep state, or both.

Example 126 includes a non-transitory, machine readable medium. The non-transitory, machine readable medium includes instructions that, when executed, direct a processor to monitor a host environment for a heartbeat message, produce a watchdog (WD) message, post the WD message to a blockchain, and detect a failure in a host environment.

Example 127 includes the subject matter of example 126. In example 127, the non-transitory, machine readable medium includes instructions that, when executed, direct the processor to detect the failure in a local host environment, and install a host replacement image.

Example 128 includes the subject matter of either of examples 126 or 127. In example 128, the non-transitory, machine readable medium includes instructions that, when executed, direct the processor to detect the failure in a remote host environment, and configure a failover device to function as the remote host environment.

Example 129 includes the subject matter of any of examples 126 to 128. In example 129, the non-transitory, machine readable medium includes instructions that, when executed, direct the processor to detect the failure in a remote host environment, and dispatch a drone for repair or replacement of a device including the remote host environment.

Example 130 includes the subject matter of any of examples 126 to 129. In example 130, the non-transitory, machine readable medium includes instructions that, when executed, direct the processor to determine that the failure has been resolved, and decommission a failed device.

Example 131 includes an apparatus. The apparatus includes an Internet-of-Things (IoT) network, wherein the IoT network includes an IoT server. The IoT server includes a secure booter/measurer to use a trusted platform module (TPM) to create a trusted execute environment (TEE), a trust anchor for confirming an identity of a service provider, an authenticator to authenticate communications with an IoT client using a symmetric key (SK), a key manager to determine if a key has expired, and a key generator to generate the key.

Example 132 includes the subject matter of examples 131. In example 132, the trust anchor includes a hash of a public key, or a certified path, or chain to a trusted root of authority Example 133 includes the subject matter of either of examples 131 or 142. In example 133, the SK is a temporal symmetric key (TSK) generated by the key generator.

Example 134 includes the subject matter of any of examples 131 to 133. In example 134, the IoT server includes a public key (PK) for decrypting messages from a service provider.

Example 135 includes the subject matter of any of examples 131 to 134. In example 135, the IoT server includes an expiration time for the public key.

Example 136 includes the subject matter of any of examples 131 to 135. In example 136, the IoT server includes an SK received from the service provider.

Example 137 includes the subject matter of any of examples 131 to 136. In example 137, the IoT server includes an expiration time for the SK.

Example 138 includes the subject matter of any of examples 131 to 137. In example 138, the IoT server includes a service provider credential to validate the IoT server to the service provider.

Example 139 includes the subject matter of any of examples 131 to 138. In example 139, the apparatus includes the IoT client including an SK for communication.

Example 140 includes the subject matter of any of examples 131 to 139. In example 140, the apparatus includes the IoT server including a status for a public key.

Example 141 includes the subject matter of any of examples 131 to 140. In example 141, the apparatus includes an entity to detect that a public key has been compromised, and to send a revocation message to the IoT server.

Example 142 includes a method for unified key management in an IoT network environment. The method for unified key management in an IoT network environment includes sending a request from an IoT client to a service provider for a communication key, receiving the communication key at the IoT client from the service provider, sending the communication key to an IoT server from the IoT client, and communicating with the IoT server using a symmetric key to decrypt messages received from the IoT server.

Example 143 includes the subject matter of example 142. In example 143, the communication key includes the symmetric key.

Example 144 includes the subject matter of either of examples 142 or 143. In example 144, the communication key includes a certificate provided by the IoT server.

Example 145 includes the subject matter of any of examples 142 to 144, including receiving a temporal symmetric key at the IoT client from the IoT server to 145. In example 145, the temporal symmetric key includes the symmetric key.

Example 146 includes the subject matter of any of examples 142 to 145. In example 146, the method includes requesting credentials for the IoT server from a service provider for secure communications, and receiving a trust anchor at the IoT server from the service provider.

Example 147 includes the subject matter of any of examples 142 to 146. In example 147, the method includes generating a temporal symmetric key in the IoT server.

Example 148 includes the subject matter of any of examples 142 to 147. In example 148, the method includes receiving a revocation message at the IoT server to revoke the communication key.

Example 149 includes the subject matter of any of examples 142 to 148. In example 149, the method includes expiring the communication key, and requesting a new communication key to be provided by the service provider.

Example 150 includes a non-transitory, machine readable medium. The non-transitory, machine readable medium includes instructions that, when executed, direct a processor to authenticate to a service provider, obtain a key from the service provider, provide a communication key to a device, and communicate with the device using the key to encrypt and decrypt data.

Example 151 includes the subject matter of examples 150. In example 151, the non-transitory, machine readable medium includes instructions that, when executed, direct the processor to receive the key from the device.

Example 152 includes the subject matter of either of examples 150 or 151. In example 152, the non-transitory, machine readable medium includes instructions that, when executed, direct the processor to generate the communication key in response to the key received from the service provider.

Example 153 includes the subject matter of any of examples 150 to 152. In example 153, the non-transitory, machine readable medium includes instructions that, when executed, direct the processor to determine if the key has passed a predetermined lifespan.

Example 154 includes the subject matter of any of examples 150 to 153. In example 154, the non-transitory, machine readable medium includes instructions that, when executed, direct the processor to revoke the key and repeat authentication to the service provider.

Example 155 includes the subject matter of any of examples 150 to 154. In example 155, the non-transitory, machine readable medium includes instructions that, when executed, direct the processor to refresh a revoked or expired key. Example 156 includes the subject matter of any of examples 150 to 155. In example 156, the non-transitory, machine readable medium includes instructions that, when executed, direct the processor to receive a revocation message and revoke the key.

Example 157 includes an apparatus including means to perform a method as in any other Example.

Example 158 includes machine-readable storage including machine-readable instructions, when executed, to implement a method or realize an apparatus as in any other Example.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need to be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. A method for securing communications transactions in an IoT network, the method comprising:
   determining, by a first participant that a group of participants can communicate with integrity assurances;
   reserving a name for the group, the name from a distributed ledger enumeration authority (DLEA);
   establishing a distributed ledger for the group based on the name; and
   providing a private key for the group to a second participant.

2. The method of claim 1, wherein reserving the name includes:
   sending a public key for the first participant and the name to the DLEA in a message, the message signed using a private key for the first participant;
   determining that the group has been created in response to the DLEA committing the name to a public distributed ledger; and
   establishing a group public key using an enhanced privacy identification (EPID) system.

3. The method of claim 1, wherein establishing the distributed ledger for the group includes committing a transaction from the first participant to the distributed ledger, the transaction including a group public key and a permissioning policy, the transaction signed by a transaction key for the first participant.

4. The method of claim 1, wherein providing the private key includes:
   receiving a join request from the second participant, the join request requesting permission to join the group; and
   validating trustworthiness of the second participant.

5. The method of claim 4, wherein validating trustworthiness includes verifying a manufacturers key used to sign the join request.

6. The method of claim 1, wherein the private key is a first private key, and further including:
   generating, in the second participant, a second private key for the group, the second private key under a group public key;
   sending a message to the first participant, the message including a public key for the second participant, the message signed by the second private key; and
   committing a transaction to the distributed ledger, the transaction including a public key of the second participant, the transaction signed by the private key.

7. The method of claim 1, wherein the private key is a first private key, and further including:
   creating a join request in a third participant, the join request including a transaction key of the third participant, the transaction key signed by a second private key for the third participant;
   sending the join request to the second participant;
   creating a signed transaction by signing the join request by the second participant with a public key for the third participant, iii) a transaction key for the second participant, and (iii) a group key; and sending the signed transaction back to the third participant.

8. The method of claim 7, wherein the signed transaction includes transaction data from the second participant.

9. The method of claim 7, further including:
signing the signed transaction with a private group key for the third participant; and
committing the signed transaction to the distributed ledger.

10. The method of claim 1, further including:
signing transaction data at the second participant using the private key for the second participant; and
committing the transaction data to the distributed ledger.

11. At least one non-transitory machine readable medium comprising instructions that, when executed, cause processor circuitry to at least:
determine that a group has integrity assurances;
reserve a group name with a distributed ledger enumeration authority (DLEA);
create a group public key and a permissioning policy; and
commit the group name and group public key to a group distributed ledger.

12. The non-transitory machine readable medium of claim 11, wherein the instructions, when executed, cause the processor circuitry to:
validate a join request from a participant; and
send a join message to the participant, the join request including a group private key.

13. The non-transitory machine readable medium of claim 11, wherein the instructions, when executed, cause the processor circuitry to:
sign transaction data with a group private key; and
commit the signed transaction data to the group distributed ledger.

14. The non-transitory machine readable medium of claim 11, wherein the instructions, when executed, cause the processor circuitry to:
establish the group distributed ledger based on the group name; and
determine that the group has been generated in response to the DLEA committing the group name to the group distributed ledger.

15. The non-transitory machine readable medium of claim 11, wherein the instructions, when executed, cause the processor circuitry to create the group public key using an enhanced privacy identification (EPID) system.

16. The non-transitory machine readable medium of claim 11, wherein the instructions, when executed, cause the processor circuitry to:
receive a join request from a participant, the join request to request permission to join the group; and
validating trustworthiness of the participant by verifying a manufacturers key used to sign the join request.

17. An apparatus for securing communications transactions in an IoT network, the apparatus comprising:
at least one memory;
instructions in the apparatus;
and processor circuitry to execute the instructions to:
determine that a group of participants can communicate with integrity assurances, the group including a first participant and a second participant;
reserve a name for the group, the name from a distributed ledger enumeration authority (DLEA);
establish a distributed ledger for the group based on the name; and
provide a private key for the group to the second participant.

18. The apparatus of claim 17, wherein the processor circuitry is to execute the instructions to:
send a public key for the first participant and the name to the DLEA in a message, the message signed using a private key for the first participant;
determine that the group has been created in response to the DLEA committing the name to a public distributed ledger; and
establish a group public key using an enhanced privacy identification (EPID) system.

19. The apparatus of claim 17, wherein the processor circuitry is to execute the instructions to commit a transaction from the first participant to the distributed ledger, the transaction including a group public key and a permissioning policy, the transaction signed by a transaction key for the first participant.

20. The apparatus of claim 17, wherein the processor circuitry is to execute the instructions to:
receive a join request from the second participant, the join request requesting permission to join the group; and
validate trustworthiness of the second participant.

21. The apparatus of claim 20, wherein the processor circuitry is to execute the instructions to verify a manufacturers key used to sign the join request.

22. The apparatus of claim 17, wherein the private key is a first private key, and the processor circuitry is to execute the instructions to:
cause the second participant to generate a second private key for the group, the second private key under a group public key;
send a message to the first participant, the message including a public key for the second participant, the message signed by the second private key; and
commit a transaction to the distributed ledger, the transaction including a public key of the second participant, the transaction signed by the private key.

* * * * *